United States Patent [19]

Davids et al.

[11] Patent Number: 4,525,779
[45] Date of Patent: Jun. 25, 1985

[54] CONVERSATIONAL VIDEO SYSTEM

[75] Inventors: Martin Davids, Leigh-on-Sea; Peter Blackman, London; Lily Teo, Romford, all of England

[73] Assignee: Reuters Ltd., London, England

[21] Appl. No.: 480,301

[22] Filed: Mar. 30, 1983

[51] Int. Cl.$^3$ .............................................. G06F 3/14
[52] U.S. Cl. ................................... 364/200; 340/711; 340/717
[58] Field of Search ... 364/200 MS File, 900 MS File; 340/711, 717

[56] References Cited

U.S. PATENT DOCUMENTS

| | | | |
|---|---|---|---|
| 3,166,636 | 1/1965 | Rutland et al. | 340/717 X |
| 3,657,706 | 4/1972 | Horgan et al. | 364/900 |
| 3,971,000 | 7/1976 | Cromwell | 364/200 |
| 4,371,871 | 2/1983 | Adams et al. | 340/717 |
| 4,404,551 | 9/1983 | Howse et al. | 340/711 |
| 4,414,621 | 11/1983 | Bown et al. | 364/200 |
| 4,430,639 | 2/1984 | Bennett et al. | 340/711 |

Primary Examiner—Harvey E. Springborn
Attorney, Agent, or Firm—Hubbell, Cohen, Stiefel & Gross

[57] ABSTRACT

A video conversational data communication network (30) in which subscribers (34, 36) may conduct conversational video textual data communications with one or more keystations (70, 602,98) in the network (30). Each keystation (70, 602, 98) is associated with a keystation terminal controller interface (68, 96, 600) which is in turn connected to a message switching node (32) for routing calls throughout the network (30). The controller (68, 96, 600) locally stores (304, 306) video conversational textual data for its associated keystations (70, 82, 84, 98, 100, 602) and enables two different designated keystations to conduct two different video conversations with a common keystation in a split screen display (76). The split screen display (76) may also be used to display retrievable data from a data base (50, 52) for simultaneous display (76) along with a video conversation. The data is transmitted between connected controllers (96, 602) in packets which contain less than the total displayable data content of the video message input via the keyboard (72). Each keystation may create a unique CONTACT LIST as well as a unique INHIBIT LIST to accelerate and screen contacts to be made throughout the network (30). The CONTACT LIST may be used to place two calls from one subscriber at the same time to set up two conversations. In addition a DEAL KEY function may be employed to immediately confirm receipt of a sent message on the screen of the sender. These functions may be performed by the controller (68, 96, 600) without access to the host computer (38).

45 Claims, 70 Drawing Figures

FIG. 10A.
Call Headings

When a call has been Queued
    TO  CHBN                                              1350 FREE When the call is accepted and the counterparty is to transmit
    FROM BARL  BARCLAYS LONDON  -2    1350 RECEIVE When this desk unit is to transmit
    TO CHMN  CHASE MANHATTAN NY  -12    1350 SEND When a bell has been received
    TO CHMN  CHASE MANHATTAN NY  -12    1350 SEND 

When being scrolled
    TO CHMN  CHASE MANHATTAN NY  -12    1410 RECEIVE    SCROLL When the other party Ended Contact
    FROM BARL  BARCLAYS LONDON  -2    1350 ENDED

FIG. 10B.

_An Example of Conversations Printouts_

```
TO CHMN    CHASE MANHATTAN NY  -12     1350  16 SEP  2/0151      CNV
 ✦ CABLE PLEASE
   1.8077-84
 ✦✦ AT 84 I BUY STG 1 MILLION FOR DLRS
    OK AGREED NY DLRS TO BANK OF AMERICA N.Y.
 ✦ NY STG TO MIDLAND LDN
 ✦ ✱✱END✱✱
   (164 CHARS)
```

_A Left Message Printout at the Receiver_

FROM CHBN - 2 1420 16 SEP  SWISS FRANCS                    LLLLLLLLLLCNV

_The Same Left Message Printout at the Sender_

TO   CHBN - 2 1420 16 SEP  SWISS FRANCS                    LLLLLLLLLLCNV

FIG.10C.

Left Message Display

MSGE                    LEFT MESSAGES AT 1421

93 UBSZ -16 1421 DM PSE
94 DMBC - 1 1421 F.FRANCS DEP

FIG. 10D.

PAGE DISPLAY

TTBL12  FROM TOY TOWN BANK LTD.    SENT    2145  12 JUN 81  ▮ REUTER MONITOR

WE CAN ACCEPT 150 MILLION SWISS FRANCS 3 MONTHS AT 3 5/8
ANY OFFERS?

▮MON READY
▮SYS RDY-SIGN ON
▮SYS READY
▮CNV READY
xxxxxxxxxxxxxx xxxxxxxxxxxxxxxxxxxxxxxxxxxxxxxxxxxxxxx

0/ 0

SYS PSWRD                SIGN       REUTER MONITOR

FIG. 10E.

PAGE DISPLAY – DATA AND CONVERSATION

```
0000              CITIBANK-EUROPE-FOREIGN EXCHANGE                              CITX*REUTER MONITOR
                  SPOT          1 MONTH    2 MONTHS   3 MONTHS   6 MONTHS      *NEWS ALERT AAMM
1020 DM           2.0238/45     202/197    348/343    489/484    807/797       *SYS NOT READY
0951 STG          2.4060/67     120+130    205/215    280/290    475/485       *CNV NOT READY
1021 SF           1.8337/47     235/225    418/408    575/565    960/960       *SYS READY
1020 YEN          201.65/75     220/210    380/370    520/510    850/835       *CNV READY
1019 FF           4.6820/40     420/410    705/695    950/935    1250/1220     *xxxxxxxxxxxxxx
0908 LIT          961 00/50     300/200    310/210    340/200    75/275                       *
1021 DFL          2.2008/18     220/215    370/365    515/510    835/825                      *
1021 DFC          32.56/575     26/25      44.5/42.5  59/56      86/81                        *
1014 DKR          6.2245/60     375/325    450/400    700/650    825/725                      *
1015 ASH          14.3325/75    1300/1250  2240/2140  3150/3000  5100/4800                    *
0802                                                                                          *
xxxxxxxxxxxxxxxxxxxxxxxxxxxxxxxxxxxxxxxxxxxxxxxxxxxxxxxxxxxxxxxxxxxxxxxxxxxxxxxxxxxxxxxxxxxxxx*
FROM CTRL    REUTER CONTROL LDN    12 1020 ENDED                                              *
# 2.4160/67                                                                                   *
  I BUY 15 MILLION POUNDS AT 60                                                               *
# OK DONE                                                                                     *
# PAY TO ABCD BANK LNDN                                                                       *
  PAY TO XYZ BANK FLEET STREET                                                                *
  *END*                                                                                  0/ 0

SYS INSRT
AWAITING ADMINISTRATOR INPUT                                    SUBP,F      REUTER MONITOR
```

FIG. 10F.

CONVERSATION - INTERRUPT MESSAGE

```
TO    CTRL    REUTER CONTROL LDN    12   1025  RECEIVE        :REUTER MONITOR
♦ HI THERE CABLE PLEASE                                       :NEWS ALERT AMM
   1. 8335/56                                                 :SYS NOT READY
♦ AT 56 I SELL 56 MILLION                                     *CNV NOT READY
                                                              :SYS READY
                                                              :CNV READY
                                                              :xxxxxxxxxxxxxx
                                                              *
                                                              *
                                                              *
*xxxxxxxxxxxxxxxxxxxxxxxxxxxxxxxxxxxxxxxxxxxxxxxxxxxxxxxxxxxx *
FROM  CTRL    REUTER CONTROL LDN    12   1024  SEND           *
   BNK SPOT PLEASE                                            *
♦  2.0328/45                                                  *
♦  xINTERRUPTx                                                *                    0/0
♦  2.0382/98

SYS INSRT                                                SUBP,F R REUTER MONITOR
AWAITING ADMINISTRATOR INPUT
```

| | | |
|---|---|---|
| MM | = | MODE |
| FFFF | = | FUNCTION |
| CCCCCC | = | "MORE" IF MORE CALLS CANNOT BE SHOWN |
| QQ | = | NUMBER OF CALLS QUEUED |
| LL | = | NUMBER OF LEFT MESSAGES NOT CANCELLED |
| W | = | W WHEN WAITING FOR A LINE |
| | | T WHEN WAITING FOR A REPLY |
| RRRRRR | = | PAGE WHICH WOULD BE RETRIEVED BY A RECALL FUNCTION |
| YY | = | STATUS OF THE SECOND CONVERSATION |

| LD | Length of Data |
|---|---|
| LH | Length of Header |
| SP | Port Number and Start Flag |
| CP | Port Number and Continuation Flag |

```
L12                CONTACT LIST 12

ABCD  FGHT
BCDE  GHIF
CDEF  AAAA
DEFG  XXXX
EFGH  TYPQ
PQAB
IABC
PQRL
ABCC
CHAL
```

CONTACT LIST DISPLAY

FIG. 20.

```
INHB               CALLER INHIBITS
CALLS FOR TTBL ARE NOT ACCEPTED FROM -

AAAA  HABC
AAAB  PQRS
AABB  SAAB
ABAA  ZZZZ
BCDE
CDEF
EEEE
FZZZ
GAAA
GAAB
```

CALLER INHIBITS DISPLAY

FIG. 21.

```
L1          CONTACT LIST 1                              +REUTER MONITOR
                                                        +CNV READY
TABLE IS EMPTY                                           NEWS ALERT  AASS
                                                         NEWS ALERT  AAMM
                                                         NEWS ALERT  AASS
                                                         NEWS ALERT  AAEE
```

0/ 0

SYS VIEW L1                               SMST.L           MON/DEAL-AAAAA/AAAD  0

FIG. 23.

CONTACT LIST 1

L1

CTRL
FGRL
CTRP
CTRS
FGRP

*REUTER MONITOR
*CNV READY
*NEWS ALERT AASS
*NEWS ALERT AAMM
*NEWS ALERT AASS
*NEWS ALERT AAEE

1/0

*B TTBE

SYS VIEW L1                 SMST.L    MON/DEAL-AAAA/AAAD 0

FIG. 24.

```
L2              CONTACT LIST 2          *REUTER MONITOR                                      0/0
                                        *CNV READY
CLTL                                    .NEWS ALERT  AASS
CRTL                                    .NEWS ALERT  AAMM
CRLL                                    .NEWS ALERT  AASS
CTLL                                    .NEWS ALERT  AAEE
*SPO
T DM
PLS

SYS VIEW                                                                   L2      MON/DEAL-AAAA/AAAD 0

FIG. 25.
```

```
L2           CONTACT LIST 2                                                         *REUTER MONITOR
                                                                                    *CNV READY
CLTL                                                                                 NEWS ALERT AASS
CRTL                                                                                 NEWS ALERT AAMM
CRLL                                                                                 NEWS ALERT AASS
CTLL                                                                                 NEWS ALERT AAEE
*SPO
T DM
 PLS

TO    CLTL   REUTER CONTROL LDN    1  1006GMT RECEIVE
#  SPOT DM PLS

SYS VIEW                                              L2              MON/DEAL-AAAA/AAAD 0      0/ 0
```

FIG. 26.

```
                                    *REUTER MONITOR
                                    *CNV READY
                                    *NEWS ALERT  AASS
                                    *NEWS ALERT  AAMM
                                    *NEWS ALERT  AASS
                                    *NEWS ALERT  AAEE
TO    CRTL       1008GMT FREE
#  SPOT DM PLS

TO    CLTL       1008GMT FREE
#  SPOT DM PLS
                                                            0/0

SYS VIEW                                    L2    F MON/DEAL-AAAA/AAAD 0
```

FIG. 33.

```
+REUTER MONITOR
+MON READY
+SYS RDY-SIGN ON
 SIGNED ON
+MON READY
+CNV READY
```

0/0

INHB

INHB    CALLER INHIBITS
CALLS FOR SUBK ALL ACCEPTED
TABLE IS EMPTY

CNV VIEW INHB

```
                                                    *REUTER MONITOR
                                                    *MON READY
                                                    *SYS RDY-SIGN ON
                                                     SIGNED ON
                                                    *MON READY                        0/0
                                                    *CNV READY
```

INHB        CALLER INHIBITS
            CALLS FOR SUBK NOT ACCEPTED FROM—

TRBK                                                                                  INHB

CNV INSRT TRBK

FIG. 36.

```
*REUTER MONITOR
*CNV READY
*MON READY
SIGNED ON
SYS READY
CNV READY
```

```
INHB
CALLS FOR NOBL ARE NOT ACCEPTED FROM:-

NOBL

TO   NOBL   NORDIC BANK LONDON   1652GMT INHIBITED

SYS VIEW                              TCSC        0/ 0
```

FIG. 37.

```
TO    CTRL                 1654GMT OFF SYSTEM                    ±REUTER MONITOR
 #                                                               ±CNV READY
                                                                 -MON READY
                                                                 -SIGNED ON
                                                                 -SYS READY
                                                                 -CNV READY

TO    NOBL    NORDIC BANK LONDON    1652GMT INHIBITED
 #

SYS VIEW                                        TCST    0                    0/ 0
```

FIG. 38.

```
TO    NSWL                          1658GMT FREE                                    *REUTER MONITOR
#                                                                                   +CNV READY
                                                                                    +MON READY
                                                                                    +SIGNED ON
                                                                                    +SYS READY
                                                                                    +CNV READY
++++++++++++++++++++++++++++++++++++++++++++++++++++++++++++++++++++++++++++++++++++++++++++++++++

TO    NOBL   NORDIC BANK LONDON     1652GMT INHIBITED

SYS VIEW                                                      TCST    F          0/0
```

FIG. 39.

```
FROM  NCBL     NCNB LONDON           1 1452GMT SEND            *REUTER MONITOR
      HELLO                                                    **CNV READY
#                                                              ***MON READY
                                                               :SIGNED ON
                                                               :SYS READY
                                                               :CNV READY

TO    NCBL     NCNB LONDON           1 1452GMT RECEIVE

SYS VIEW                                                SIGN    S                0/0
```

FIG. 40.

1. CONTACT REQUEST
2. AUGMENTED CONTACT REQUEST
3. ✱ QUEUED CALL
4. AUGMENTED CONTACT REPLY
5. CONTACT REPLY (✱QUEUED CALL NOT DISPLAYED ON TERMINAL CONTROLLER)

1. CONNECT REQUEST INHIBITED
2. CONNECT REPLY INHIBITED
3. CALL ACCEPT
4. DEQUEUE CALL

1. STATISTICS RECORD

Text Statement Description

|  | Value | Size (bytes) |
|---|---|---|
| Length | Min:6, Max:76 | 1 |
| Type | 196 | 1 |
| Length of non packable data | 6 | 1 |
| Control Indicator | (see *) | 1 |
| Destination Conv. ref. |  | 1 |
| Text | Min:0, Max:71 |  |

\* Control Indicator

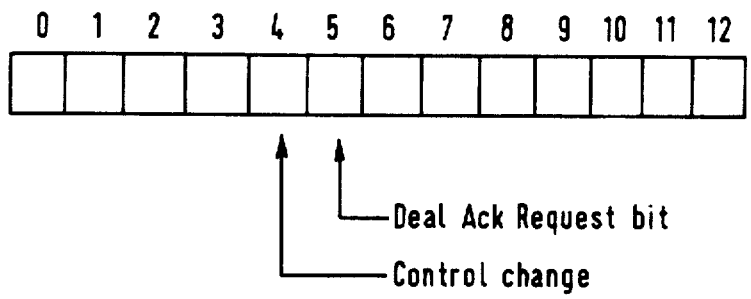

— Deal Ack Request bit
— Control change

Bits 0-3 — Not used

4 — Control change indicator

1 = control change
    0 = no control change

5 — Deal Ack Request bit

0 = normal transmission
    1 = Deal transmission 6-11 — Absolute line no.

FIG. 47.

CONVERSATIONAL VIDEO SYSTEM

CROSS-REFERENCE TO RELATED APPLICATIONS

This application is related to the following commonly owned copending U.S. patent applications, the contents of which are all specifically incorporated by reference herein in their entirety: copending U.S. patent application Ser. No. 230,341, filed Jan. 30, 1981, and entitled "Conversational Video System", now U.S. Pat. No. 4,388,489, naming Jack Wigan, John Richards and David Ure as joint inventors thereof; and the contemporaneously filed copending U.S. patent application Ser. No. 480,331, entitled "Conversational Video System Having Contact Selection Control", which is a continuation-in-part of said U.S. patent application Ser. No. 230,341 and names the same inventors as in said patent application as joint inventors thereof, and is an improvement thereon, and is related to U.S. patent application Ser. No. 480,211, entitled "Conversational Video System Having Local Network Control", naming Kenneth Baldry and Martin Davids as joint inventors thereof.

TECHNICAL FIELD

The present invention relates to two-way video communication systems and particularly to such systems capable of providing subscriber to subscriber video data communication in a conversational mode.

BACKGROUND ART

Communication systems for transmitting data point to point are well known, such as conventional telex systems and data base access systems. In addition, of course, telephone systems are well known two-way conversational communication media with the disadvantage being that a telephone system does not provide any hard copy nor does it allow you to, on the same device, obtain supplementary data while carrying on the conversation. Such supplementary data may be particularly important if the purpose of the conversation is commodity dealing such as in the money market. With respect to the telex communication, apart from its associated rate of speed, it does not enable you to readily carry on two different two-way telex communications alternatively so that you can carry on "telex conversations" with two different subscribers at substantially the same time. Moreover, neither the telex communication systems nor telephone communication systems provide a listing of incoming callers prior to acceptance of the message by the recipient. With respect to two-way data-base access systems, such prior art systems do not in reality provide a real time conversational communication in that they merely provide for remote storage of information which may subsequently be retrieved upon request by a subscriber or, in certain instances, can be provided to the subscriber if he is accessing the particular storage location to which the data is being provided. However, this is still not a real-time conversational type of video communication system in which a pair of subscribers or users can interact in real time in a conversational mode. With respect to prior art telephone and data-base access systems, a prior art system merging these two technologies is known as the Delphi system which is a telephone message management system in which speech messages may be pre-recorded and stored in a data base for subsequent automatic transmission to incoming callers and in which incoming messages may be stored for subsequent later transmission to prescribed recipients. However, this system is not a true conversational video communication system nor does it enable a particular user to carry on multiple conversations substantially simultaneously. Thus, there are no satisfactory prior art systems known to applicants which are capable of providing interactive conversational type of video data communications between pairs of users or subscribers nor such systems which enable multiple conversations to be carried out by a given user or subscriber in real-time and in association with data-base retrieval of supplementary data. These disadvantages of the prior art are overcome by the systems disclosed in the aforementioned copending U.S. patent applications. However the systems disclosed therein do not adequately provide for quick and secure confirmation of a transaction such as through use of a DEAL KEY, and moreover, require access to the SUBSCRIBER FILE in the host computer to retrieve the CONTACT LIST or the INHIBIT LIST before processing could continue of a CONTACT REQUEST. This could impose an unacceptably heavy overload on the host computer and affect the efficiency of the system. In the system of the present invention these disadvantages have been overcome.

DISCLOSURE OF THE INVENTION

A video conversational data communication network in which subscribers may conduct conversational video textual data communications with one or more keystations in the network. Each keystation is associated with a keystation terminal controller interface which is in turn connected to a message switching node for routing calls throughout the network. The keystation controller interface locally stores video conversational textual data for its associated keystations and enables two different designated keystations to conduct two different video conversations with a common keystation in a split screen display. The split screen display may also be used to display retrievable data from a data base for simultaneous display along with a video conversation. The video conversational textual data is transmitted between connected keystation controller interfaces in packets which contain less than the total displayable data content of the conversational video textual data message input via the keyboard. The keystation controller interface also enables preparation of responses prior to transmission to the other party and while receiving a transmission from that party. Prior to completion of a call, the keystation controller interface provides an incoming calls queue video display at the connected keystations. This video display may contain a unique identifier for each keystation initiating a call as well as an interest message. The receiving keystation may then randomly select any of the displayed incoming calls irrespective of position in the queue and the video conversation may then take place using the associated keyboards and video displays. A hard copy print out of the video conversation may then be obtained on a printer. Each subscriber in the network may dynamically list in advance those subscribers from whom he is not prepared to accept calls via a facility termed CALL INHIBIT in which instance the network will not establish a conversation with an inhibited subscriber while permitting a conversation to be established with a subscriber who is not contained in the stored INHIBIT LIST. In addition, through a facility termed CALL LIST, a subscriber may dynamically specify in advance, either through a stored CALL LIST, or via a command message, that the network is to establish a conversation either with the first free subscriber or the first two free subscribers (DUAL CALL LIST) in the CALL LIST, or with the first free subscriber in the CALL LIST while selectively skipping contact with predesignated ones of possible free subscribers for a given call, so that with one call the network has a plurality of chances of establishing a desired conversation with one or more of a plurality of preselected subscribers in a variable contact pattern preselected by the originating subscriber. This CALL LIST facility can also be used by the originating subscriber to simultaneously send a preestablished page to various subscribers in the CALL LIST, any of which may then select it for display. Thus, the CALL LIST and CALL INHIBIT facilities enhance the use time of the terminals in a dynamic conversational environment. Copies of the CALL LIST and INHIBIT LIST records are kept at the keystation terminal controller interfaces to enable these functions to be performed, where applicable, without the necessity of access to the host computer. In addition, through the use of a DEAL KEY at the sending keystation keyboard a dialogue confirmation and acknowledgement is rapidly received without requiring a loss of control of the conversation by the sender.

BRIEF DESCRIPTION OF DRAWINGS

FIGS. 10A-10F are diagrammatic illustrations of typical sample conversational video displays which may appear on the display portion of a typical keystation used in the system of FIG. 1;

FIG. 20 is a diagrammatic illustration of a typical sample CALL or CONTACT LIST video display which may appear on the display portion of a typical subscriber keystation used in the system of FIG. 1;

FIG. 21 is a diagrammatic illustration of a typical sample INHIBIT LIST video display which may appear on the display portion of a typical subscriber keystation used in the system of FIG. 1;

FIG. 23 is a diagrammatic illustration of a typical sample improved CALL LIST video display which may appear on the display portion of a typical originating subscriber keystation upon viewing of the CONTACT or CALL LIST when the CALL LIST table is empty;

FIG. 24 is a diagrammatic illustration of a typical sample improved CALL LIST video display which may appear on the display portion of a typical originating subscriber keystation in response to the user insertion of an entry to the subscriber's CALL LIST;

FIG. 25 is a diagrammatic illustration of a typical sample improved CALL LIST video display which may appear on the display portion of a typical originating subscriber keystation in respone to the user insertion of an interest message to the subscriber's CALL LIST;

FIG. 26 is a diagrammatic illustration of a typical sample improved CALL LIST video display which may appear on the display portion of a typical originating subscriber keystation in response to the CALL LIST call being accepted by a called subscriber on the CALL LIST;

FIG. 33 is a diagrammatic illustration of a typical sample improved CALL LIST video display which may appear on the display portion of a typical originating subscriber keystation in response to the acceptance of a DUAL CONTACT LIST call;

FIG. 34 is a diagrammatic illustration of a typical sample improved INHIBIT LIST video display which may appear on the display portion of a typical originating subscriber keystation upon viewing of the INHIBIT LIST when the INHIBIT LIST table is empty;

Figure 35:
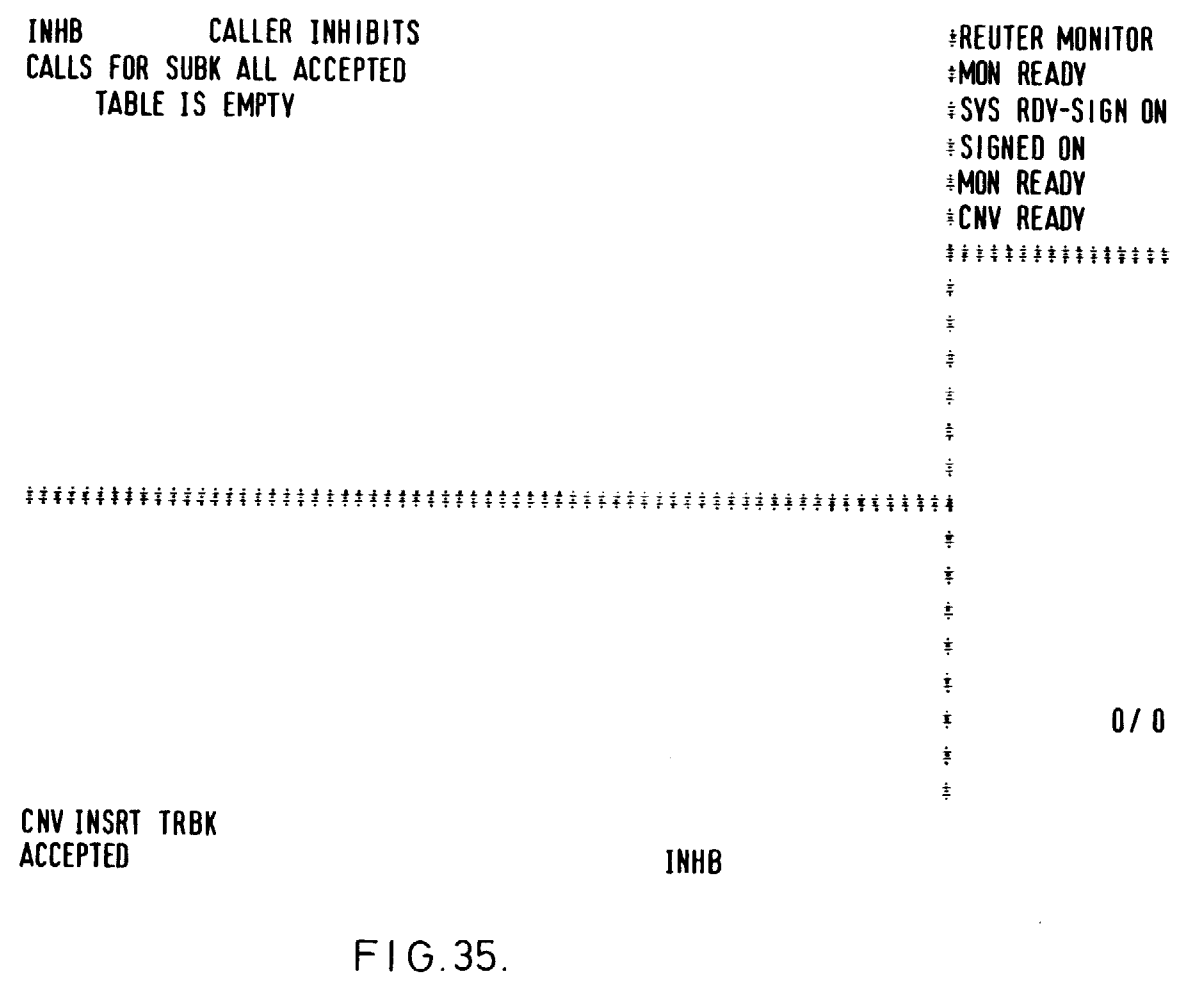

FIG. 35 is a diagrammatic illustration of a typical sample improved INHIBIT LIST video display which may appear on the display portion of a typical originating subscriber keystation in response to the user insertion of an entry to the subscriber's INHIBIT LIST;

FIG. 36 is a diagrammatic illustration of a typical sample improved INHIBIT LIST video display which may appear on the display portion of a typical originating subscriber keystation in response to the recall of the INHIBIT LIST page by the originating subscriber;

FIGS. 37-40 are diagrammatic illustrations of typical sample video displays which may appear on the display portion of a typical subscriber keystation utilizing the improved INHIBIT LIST facility of the present invention;

FIG. 47 is a diagrammatic illustration of a typical DEAL KEY text statement description in the improved system of the present invention.

BEST MODE FOR CARRYING OUT THE INVENTION

Figure 1:
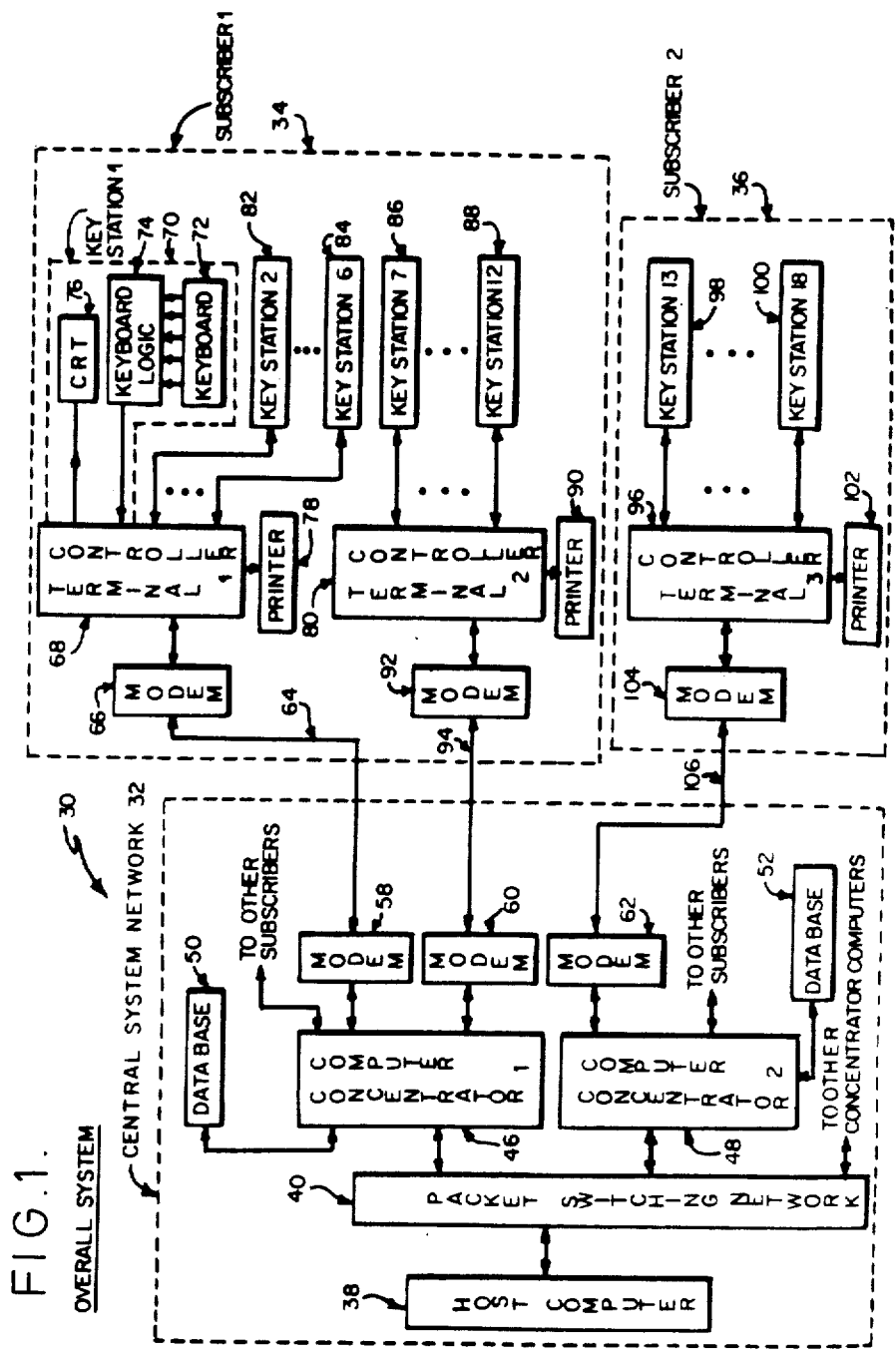
FIG. 1 is an overall system functional block diagram of a conversational video system in accordance with the present invention as shown in the aforementioned copending U.S. patent applications specifically incorporated by reference herein in their entirety.
Figure 2:
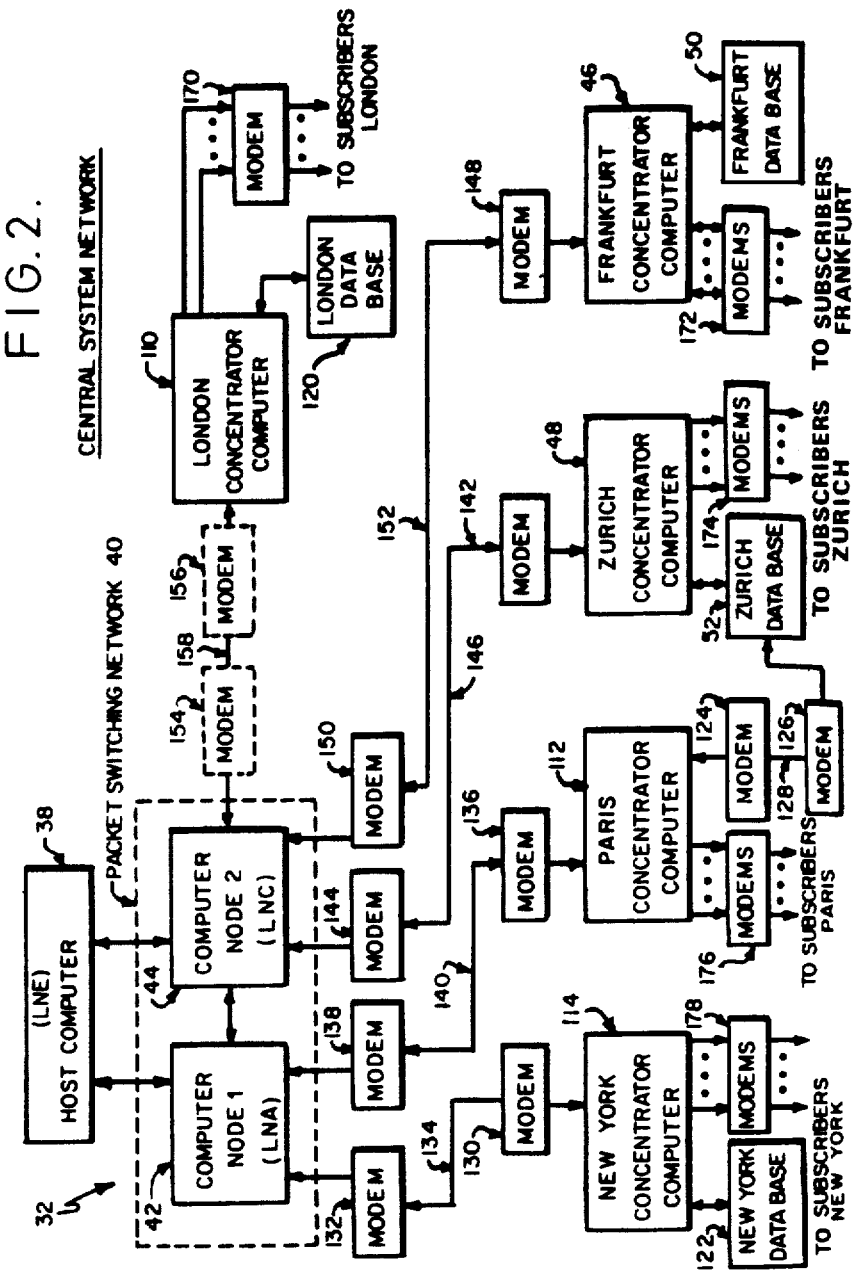
FIG. 2 is a functional block diagram of a typical central system network portion of the conversational video system of FIG 1.

Referring now to the drawings in details and initially to FIGS. 1 and 2 thereof, an overall system functional block diagram of a conversational video system, generally referred to by the reference numeral 30, in accordance with the present invention as described in the aforementioned copending U.S. patent applications which have been incorporated by reference herein is shown. As shown and preferred in FIG. 1, the conversational video system 30 of the present invention preferably includes a central system network 32, to be described in greater detail hereinafter with reference to FIG. 2, and a plurality of subscriber locations with two such subscriber locations 34 and 36 being shown by way of example in FIG. 1 although, of course, any plurality of subscriber stations can be utilized in the conversational video system 30 of the present invention. As illustrated in FIG. 1, the central system network 32 preferably includes a host computer 38 which, as will be described in greater detail hereinafter, serves as the traffic control manager for the central system network 32 and is preferably a conventional computer such as a Digital Equipment Corporation PDP11/70. The host computer 38 is preferably connected to a packet switching network 40, which, as illustrated in FIG. 2, preferably comprises a plurality of computer nodes with two such nodes 42 and 44 being shown by way of example in FIG. 2. The packet switching network is preferably connected to concentrator computers located at the various geographic locations close to the various subscribers with two such concentrator computers 46 and 48 being illustrated in FIG. 1 as being associated with subscribers 34 and 36, respectively. As will be described with respect to FIG. 2, these concentrator computers 46, 48, if located at the same site as the associated computer node may be directly connected thereto; however, if located at a remote site from the computer node, then they will be connected to the particular computer nodes in the packet switching network 40 via conventional modems. The concentrator computers 46 and 48 also preferably receive retrievable data from a retrievable data-base such as data-bases 50 and 52, respectively, which provide supplementary data for retrieval and display at the various subscriber locations 34, 36 by way of example. The associated concentrator computers are preferably connected to the various subscriber stations, such as 34, 36 via conventional modems, such as modems 58 and 60 for concentrator computer 46 and modem 62 for concentrator computer 48, to the subscriber locations 34, 36, respectively, with modem 58 being connected via telephone land line 64 to another conventional modem 66 and therefrom to a terminal controller 68, to be described in greater detail hereinafter with reference to FIGS. 6 and 7, as well as with references to FIGS. 22-47 in connection with the improved CALL or CONTACT LIST, INHIBIT LIST, and DEAL KEY features of the improved system 30 of the present invention. As will be described in greater detail hereinafter with reference to FIGS. 22-47, the terminal controller, 68 by way of example, in the improved system 30, plays an important role in controlling the routing of messages to and from the subscribers for which it is responsible without having to rely each time on the SUBSCRIBER FILE stored in the host computer 38. The terminal controller 68 is in turn connected to a plurality of subscriber keystations with each terminal controller preferably being capable of servicing, by way of example, up to 6 such subscriber keystations. Each keystation, such as keystation 70 illustrated in FIG. 1, preferably includes a keyboard 72, associated keyboard logic 74 and a cathode ray tube display screen 76 for display of supplementary data and conversational data. As will be described in greater detail hereinafter, the keyboard 72, together with the keyboard logic 74 provides the conversational data to the terminal controller 68 which acts as the interface between the keystation and the central system network 32 to enable conversational video messages to be transmitted and received in a real-time interactive environment. As further shown and preferred in FIG. 1, each terminal controller, such as terminal controller 68, also includes an associated printer 78 for providing a hard copy of the video conversation which has been displayed at the particular keystation through which the conversation has been conducted, such as keystation 70 by way of example. By way of example, subscriber station 34 is shown as having two terminal controllers, terminal controller 68 and terminal controller 80, each of which preferably has 6 associated keystations, with only 3 such keystations being illustrated in FIG. 1 by way of example for terminal controller 68, namely keystations 70, 82 and 84 and with only 2 such keystations 86 and 88 being illustrated by way of example for terminal controller 80 which is also associated with a separate printer 90. Terminal controller 80, like terminal controller 68 is preferably connected to concentrator computer 46 via a conventional modem 92 and a telephone land line 94. Similarly, at subscriber station 36, at least one other separate terminal controller 96 is provided for controlling up to 6 keystations with, again, for purposes of illustration, only 2 such keystations 98 and 100 being shown in FIG. 1. In addition, a separate printer 102 is also associated with terminal controller 96 which is, in turn, connected to concentrator computer 48 via another conventional modem 104 and a telephone land line 106. As will be described in greater detail hereinafter, the concentrator computers 46, 48 for example, are preferably conventional computers such as Digital Equipment Corporation PDP11/34 and the respective terminal controllers, such as 68, 80 and 96 are preferably special purpose computers such as Digital Equipment Corporation PDP8/420A which preferably contain a special purpose conversational video control program to be described in greater detail hereinafter.

Referring now to FIG. 2, a more detailed block diagram of the central network 32 of FIG. 1 is shown. It should be noted that the central system network 32 illustrated in FIG. 2 is merely exemplary of one possible network configuration although many other possible network configurations for providing conversational video may be accomplished without departing from the spirit and scope of the present invention. Thus, as shown by way of example in FIG. 2, the packet switching network 40, as previously mentioned, preferably contains two computer nodes 42 and 44, such as conventional Digital Equipment Corporation PDP11/34 computers which are illustrated as being geographically situated at the same location although, of course, these nodes could be at different geographic locations and, moreover, any desired plurality of nodes at different locations could be provided in accordance with the conversational video system of the present invention. However, for the purposes of explanation, it shall be assumed that the central system network 32 has the configuration illustrated in FIG. 2. Moreover, it shall be assumed, for purposes of explanation, that the conversational video system 30 of the present invention is capable of providing world-wide conversational video to subscribers located at five different geographical country sites, such as London, New York, Paris, Zurich and Frankfurt, by way of example. In this regard, it shall be further assumed that the computer nodes 42 and 44 are located at one of these geographical country sites, such as London, as illustrated in FIG. 2. Each of these geographical sites preferably has its own associated concentrator computer and it shall be assumed that concentrator computer 46 is located at Frankfurt in the example of FIG. 2, concentrator computer 48 is located at Zurich in the example of FIG. 2 and that additional concentrator computers 110, 112 and 114 are located, respectively, at London, Paris, and New York in the example of FIG. 2. In addition, preferably each concentrator computer 46, 48, 110, 112 and 114 has its own associated data-base for providing retrievable supplementary data for display at the keystations associated with that particular concentrator computer. Thus, the London data-base is designated by reference numeral 120 and the New York data-base is designated by reference numeral 122. It should be noted that as illustrated in FIG. 2, the retrievable data-base may also be remotely located or shared such as in the instance where the Zurich data-base 52 is also accessed by the Paris concentrator computer 112 via conventional modems 124 and 126. The concentrator computers 46, 48, 112 and 114 are shown as being remotely located from the computer nodes 42 and 44 and thus, are preferably connected thereto via conventional modems and telephone land lines, with concentrator computer 114 being connected to computer node 42 via modems 130 and 132 and telephone land line 134, with concentrator computer 112 being connected to computer node 42 via conventional modems 136 and 138 and telephone land line 40, with concentrator computer 48 being connected to computer node 44 via conventional modems 142 and 144 and telephone land line 146, and with concentrator computer 46 being connected to computer node 44 via conventional modems 148 and 150 and telephone land line 152. With respect to concentrator computer 110, assuming it is located at the same physical location as the computer node 44, then it may be connected thereto by direct connection. However, if the concentrator computer 110 is remotely located from computer node 44, then it would preferably be connected thereto via another pair of conventional modems 154 and 156, shown in dotted form, and a telephone land line 158 which, of course, would be replaced by a conventional wire connection in the instance where the concentrator computer 110 is located at the same physical location as the computer node 44. The various modems associated with the connection of the respective concentrator computers 110, 46, 48, 112 and 114 are illustrated in FIG. 2 in one block corresponding to a plurality of such modems with these blocks being labelled, respectively, with reference numerals 170, 172, 174, 176 and 178. Modems 58, 60 and 62 in FIG. 1 are just an example of such modems and it should be noted that preferably one modem is provided for each telephone line connection such as preferably one per terminal controller, not taking into account a stand-by or back-up situation in which an additional modem would be provided.

Figure 3:
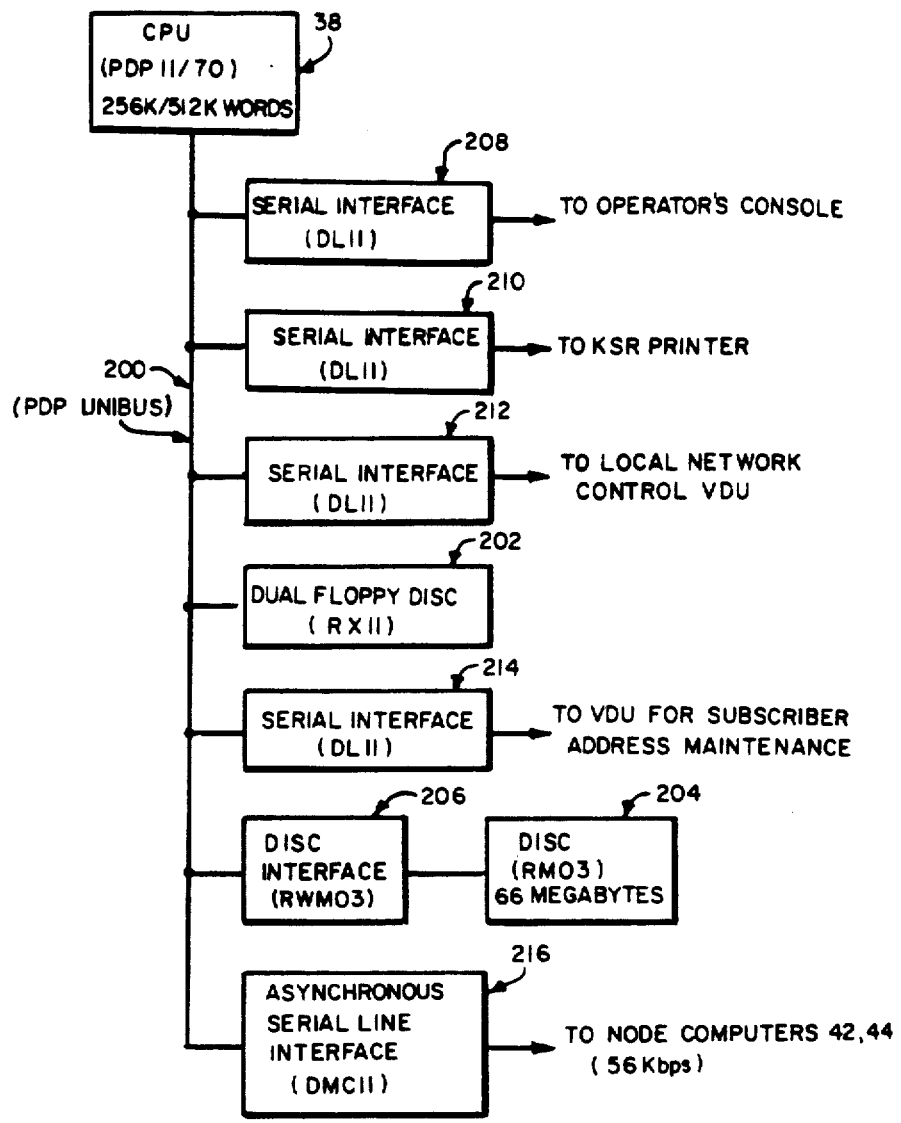
FIG. 3 is a block diagram of a typical host computer portion of the central system network of FIG. 2.

Referring now to FIG. 3, a typical hardware configuration for the host computer 38 is shown. Thus, as previously mentioned, the host computer may be a conventional PDP11/70 CPU having desired core, such as 256K or 512K words of core which, via a conventional Digital Equipment Corporation Unibus 200 is connected to associated direct access storage 202 and 204, such as an RX11 dual floppy disc and an RMO3 disc via a conventional interface therefor, such as an RWMO3 interface 206, for disc 204. In addition, a plurality of serial interfaces 208, 210, 212 and 214, such as a Digital Equipment Corporation DL11, are provided for interfacing the CPU 38 with various associated control consoles, such as interface 208 being utilized with the control console associated with start-up of the system, interface 210 being associated with the control console for the conversational video communication of the system, interface 212 being associated with the control of the packet switching network 40 and with interface 214 being associated with the control which enables identification of new subscribers to be put into the system so that they may be incorporated into the conversational video system 30. In addition, a conventional asynchronous serial line interface 216, such as a conventional Digital Equipment Corporation DMC11, is provided to connect the CPU 38 to the packet switching network 40 for transferring data and control information between the host computer 38 and the packet switching network 40 at a rate of preferably 56 kilobits per second. As shown in FIGS. 14–21, and as specifically described in greater detail in the aforementioned copending U.S. patent applications, the host computer 38 in conjunction with the associated terminal controllers 68, 80, 96, by way of example, is structured to provide the subscriber with the ability to specify in advance those other subscribers in the system 30 from whom the particular subscribers will not accept calls, termed INHIBIT LIST, as well as to specify in advance a plurality of subscribers to which a contact message is simultaneously sent with the first subscriber in the group which is free having contact established therewith, termed CALL LIST or CONTACT LIST. CONTACT LIST may also be employed by a subscriber to simultaneously transmit a subscriber prepared page to all of the subscribers on the CALL LIST. As will be described in greater detail hereinafter with reference to FIGS. 22–43, in the improved system 30 of the present invention, the various terminal controllers 68, 80, 96 preferably directly control the CONTACT LIST and INHIBIT LIST functions associated with their associated various subscriber keystations without having to access the SUBSCRIBER FILE stored in the host computer 38 each time as was required in the aforementioned patent applications employing the prior system of FIGS. 14–21. In addition, the terminal controllers provide a DEAL KEY function which, as will be described in greater detail hereinafter with reference to FIGS. 44–47, enables rapid confirmation of transmitted messges by the sending subscriber. For completeness, however, the prior system of FIGS. 14–21 will be described herein so as to facilitate a better understanding of the improvements obtained by the system of the present invention.

Figure 4:
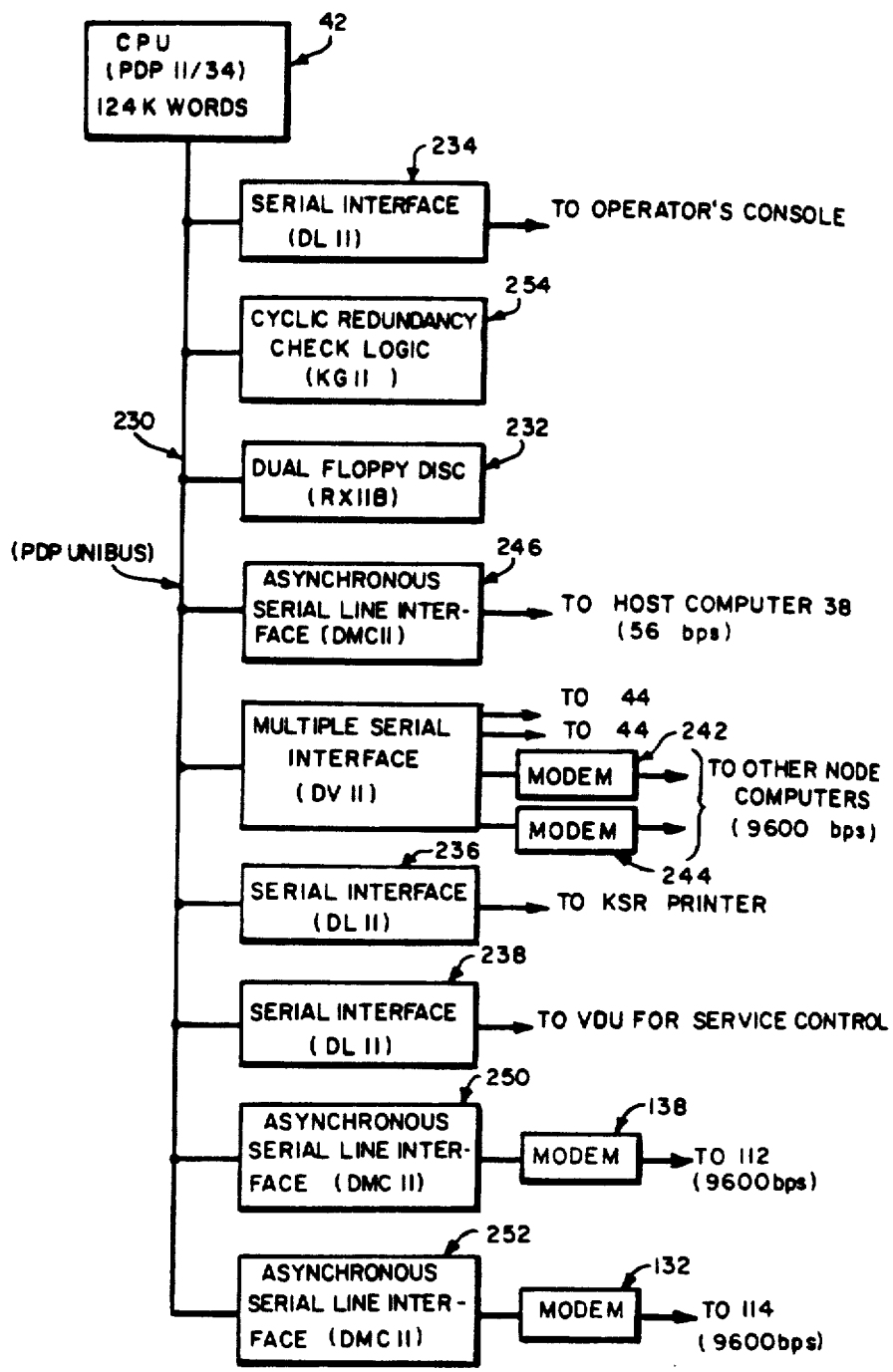
FIG. 4 is a block diagram of a typical computer node portion of the packet switching network of FIG. 2.

Referring now to FIG. 4, a typical hardware configuration for a typical computer node, such as node 42, for example, is shown. Thus, as previously mentioned, the CPU is preferably a conventional computer, such as a PDP11/34 having 124K words of store. The CPU 42 is preferably connected to associated storage and interface devices via a conventional bus 230, such as a Digital Equipment Corporation Unibus. As with the aforementioned host computer 38, the node computer 42 preferably includes additional storage 232 such as an RX11B dual floppy disc which is preferably used to boot the CPU42. In addition, a plurality of serial interfaces 234, 236 and 238, such as conventional Digital Equipment Corporation DL11 interfaces, are provided to interface with control peripherals such as the operator's console to start up the system, the printer primarily used for failure monitoring, and the operating control for the system, respectively. In addition, a multiple serial interface 240, such as a conventional Digital Equipment Corporation DV11 is provided for interfacing with other node computers such as node computer 44. Interface 240 is capable of servicing up to 8 lines and may be connected to remotely located computer nodes via modems, 242 and 244 for example, and telephone land lines. The transmission rate is 9600 bits per second to the other nodes. In addition, in the example of FIGS. 2 and 4, computer node 42 includes 3 asynchronous serial line interfaces 246, 250 and 252, such as a conventional Digital Equipment Corporation DMC11, for interfacing the CPU42 with the host computer 38, and concentrators 112 and 114, respectively to enable communication between the CPU42 and the interconnected computers. With respect to concentrators 112 and 114, as was previously mentioned, they are interconnected to the computer node 42 via modems 138 and 132, respectively. With respect to computer node 44, since the concentrator computer 110 is, by way of example, located at the same site as computer node 44, no modem would be required between the corresponding asynchronous serial line interface and the concentrator computer 110. In addition, with respect to the interface 246 to the host computer 38, the data rate is preferably 56 kilobits per second. Lastly, the node configuration illustrated in FIG. 4 also preferably includes a cyclic redundancy check calculation unit 254, such as a conventional Digital Equipment Corporation KG11, connected to the computer bus 230 for conventionally checking the integrity of the transmitted packets. It should be noted that with respect to the interface to the concentrators at interfaces 250 and 252, this is preferably at a data rate of 9600 bits per second.

Figure 5:
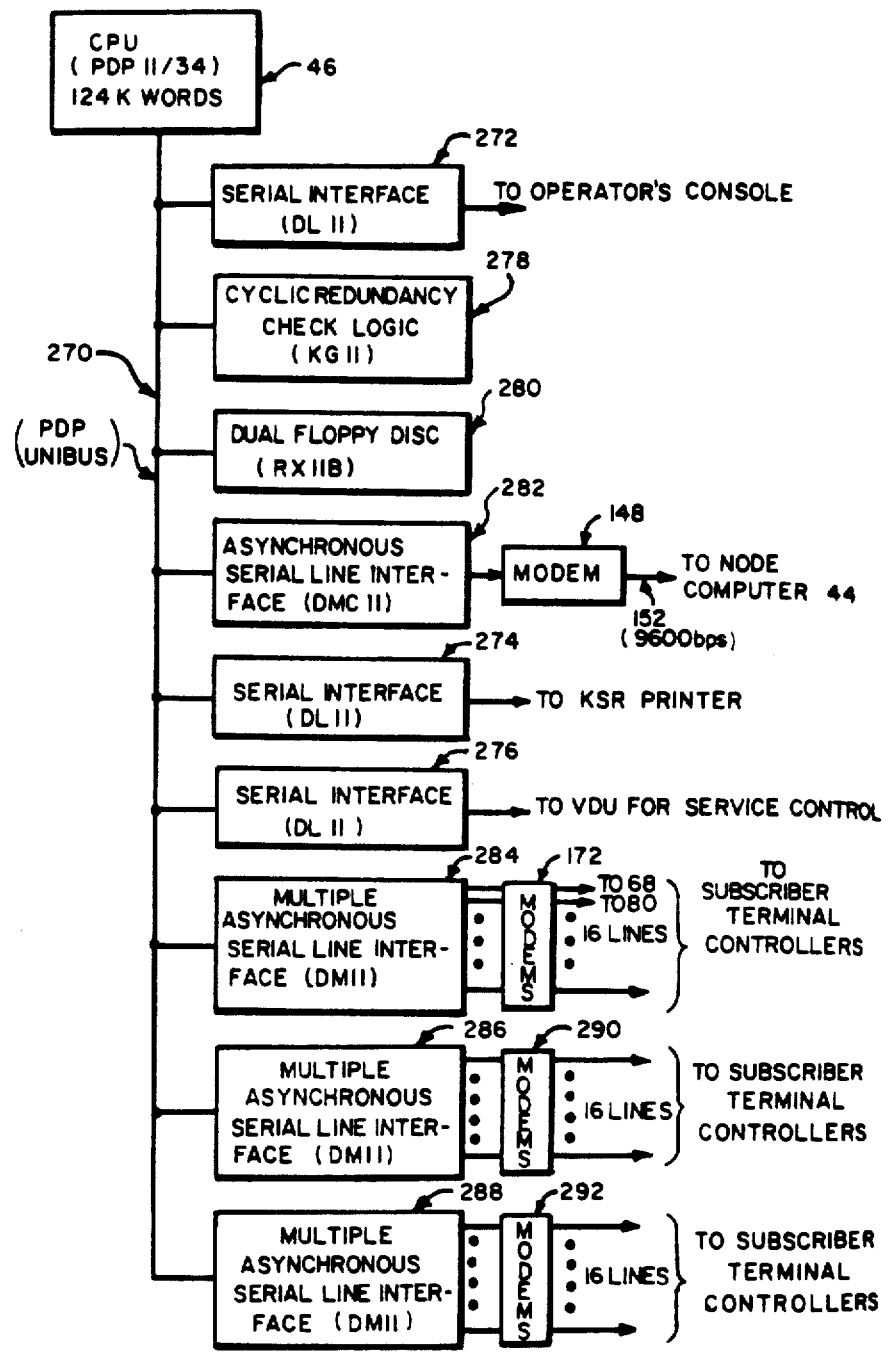
FIG. 5 is a block diagram of a typical concentrator computer portion of the central system network of FIG. 2.

Referring now to FIG. 5, a typical hardware configuration for a typical concentrator computer, such as concentrator computer 46 is shown by way of example. Thus, as previously mentioned, the concentrator computer 46 CPU is preferably a conventional computer such as a Digital Equipment Corporation PDP11/34 having 124K words of store and which is preferably connected to various associated interfaces and storage via a conventional bus 270 such as a Digital Equipment Corporation Unibus as was previously discussed with reference to the configurations of FIGS. 3 and 4. Again, as was true with respect to the configuration of FIG. 4 for a typical node computer 42, 3 serial line interfaces, 272, 274 and 276, such as conventional Digital Equipment Corporation DL11 interfaces are provided for essentially the same purposes as interfaces 234, 236 and 238 previously described with reference to FIG. 4. Similarly, a cyclic redundancy check calculation unit 278 is also provided for essentially the same purpose as cyclic redundancy check calculation unit 254 in FIG. 4, such as a Digital Equipment Corporation KG11, and dual floppy disc storage 280, such as an RX11B, is provided for essentially the same purpose as the storage 232 in FIG. 4. An asynchronous serial line interface 282 is connected to the bus 270 for interfacing the concentrator computer 46 with its associated computer node 44 through modem 148 and telephone line 152 with the data being provided at a data rate of 9600 bits per second. In addition, the concentrator configuration also preferably includes a plurality of multiple asynchronous serial line interfaces 284, 286, 288, such as conventional Digital Equipment Corporation DH11 interfaces, each capable of supporting 16 lines which, via conventional modems, such as the modem configurations represented by reference numerals 172, 290 and 292, connect the concentrator-CPU46 to the various subscriber terminal controllers, such as terminal controllers 68 and 80 for example. It should be noted that preferably one modem is provided for each of the 16 telephone lines associated with the respective interface 284, 286 or 288 and, in the example of FIGS. 1 and 5, modem configuration 172 includes modems 58 and 60 illustrated in FIG. 1. The data rate on each of the lines connected to the subscriber terminal controllers, such as controllers 68 and 80, is preferably 1200 bits per second.

Figure 6:
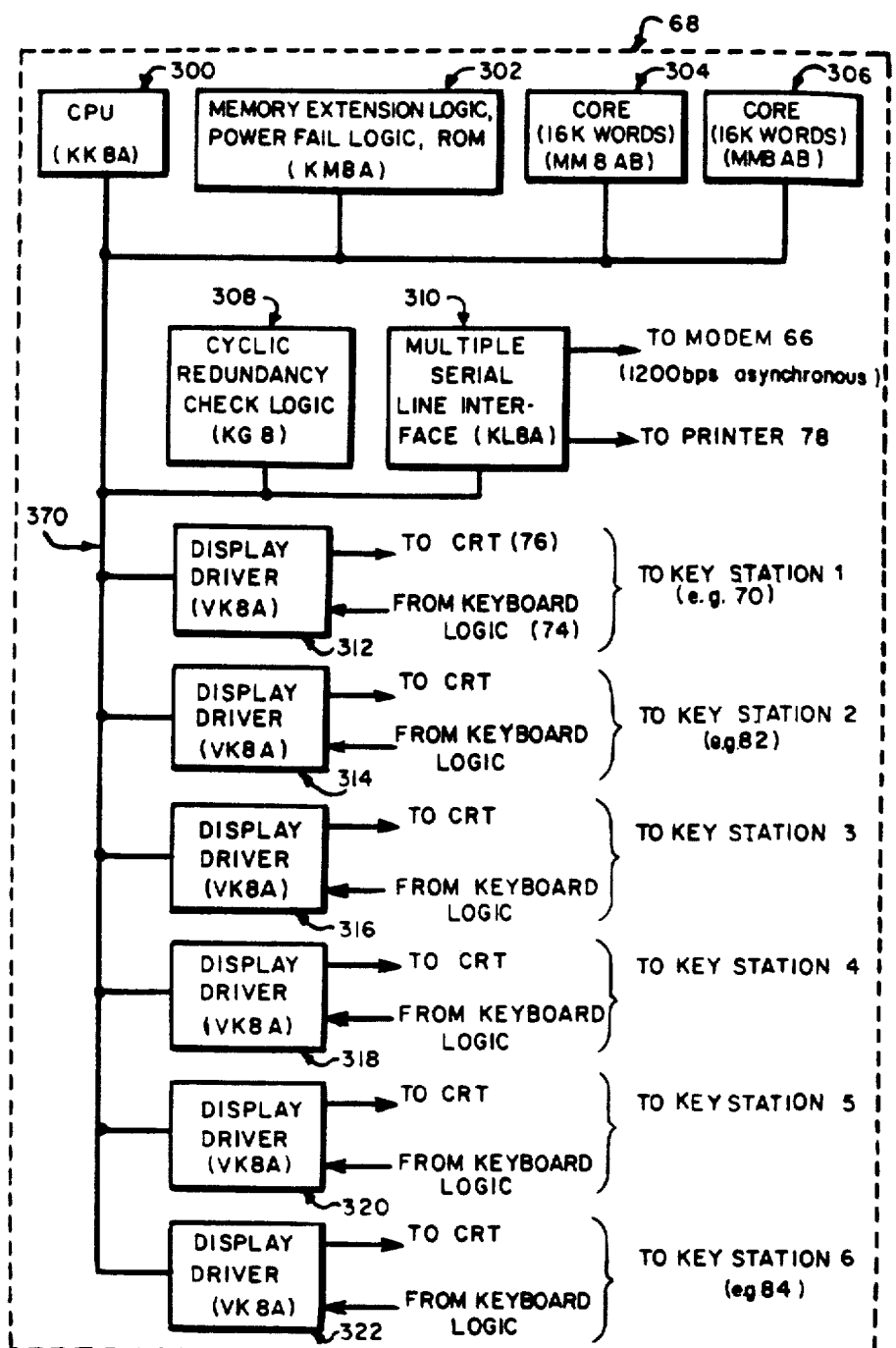
FIG. 6 is a functional block diagram of a typical terminal controller for use in the conversational video system of FIG. 1.

Referring now to FIG. 6, a functional block diagram of a typical preferred terminal controller configuration, such as a terminal controller 68 which acts as the conversational video communications interface between its associated keystations 70, 82 and 84, by way of example, and the concentrator computer 46 which interfaces the terminal controller 68 with the balance of the conversational video communication system 30 is shown. As shown and preferred in FIG. 6, the terminal controller 68 preferably includes a central processing unit 300, such as a Digital Equipment Corporation KK8A CPU and associated memory 302, 304 and 306. Memory 304 and 306 are preferably core, each comprising 16K words, such as provided by a conventional Digital Equipment Corporation MM8AB Core. Memory 302 preferably includes memory extension logic, power fail logic, and ROM, with this logic circuitry being conventional, such as Digital Equipment Corporation KM8A.

As will be described in greater detail hereinafter, the control program for the terminal controller 68 which controls the conversational video communication between the associated keystations 70, 82, 84 and keystations located throughout the conversational video communications network 30 is preferably downstream loaded into core storage 304, 306, although, if desired, this control program could be permanently stored in ROM, assuming the ROM was of the appropriate capacity to store the control program. An example of a typical conversational video communications control program which is downstream loaded into core 304, 306 or which, as previously mentioned, could be permanently stored in appropriate ROM at the terminal controller 68 is provided below in Table A, written in PAL8 assembler language. This control program is an improvement on the control program contained in TABLE A of the aforementioned copending U.S. patent application Ser. No. 230,341, and the aforementioned application entitled "Conversational Video System Having Contact Selection Control", the contents of which, including said prior TABLE A are specifically incorporated by reference herein in their entirety. As noted below, and as will be described in greater detail hereinafter with reference to FIGS. 22–47, the improved terminal controller control program enables the preferred improved CONTACT LIST, DUAL CONTACT LIST and INHIBIT LIST functions to be performed by the terminal controller, as well as the aforementioned preferred DEAL KEY function, without having to access the SUBSCRIBER FILE 1000 of the host computer 38 each time as was true with respect to the prior CONTACT LIST and INHIBIT LIST functions referred to in the aforementioned patent application entitled "Conversational Video System Having Contact Selection Control."

TABLE A (See Attached Listing which is part of the file but which has not been printed.)

In the present example, where the above improved control program of Table A is downstream loaded from the concentrator computer 46, a terminal bootstrap program is stored in ROM 302. As was previously mentioned, this ROM 302 is contained in a conventional KM8A module. The bootstrap program is preferably responsible for loading the improved conversational control program of Table A into core 304, 306 as well as for loading other conventional executive programs into core 304, 306 which enable the proper operation of the CPU 300. An example of a typical preferred terminal controller bootstrap program stored in ROM 302 is provided below in Table B with this program also being written in PAL8 assembler language and being a duplicate of the listing contained in Table B of the aforementioned copending U.S. patent application Ser. No. 230,341.

TABLE B

| | | | DEALING BOOTSTRAP PROGRAM LISTING | | |
|---|---|---|---|---|---|
| | 0000 | | FIELD | 0 | |
| | 5400 | *5400 SERVE | | | |
| 05400 | 5336 | | JMP | NEXTCH | Will only branch for transmit complete |
| 05401 | 5336 | | JMP | NEXTCH | on correct line so no need to test |
| 05402 | 0377 | KASK | 377 | | Can use last two transmit jumps for |
| 05403 | 7774 | KMFOUR | −4 | | data as these flags never become set |
| 05404 | 7000 | SERVR0 | NOP | | Timeout constant |

TABLE B-continued
DEALING BOOTSTRAP PROGRAM LISTING

| | | | | | |
|---|---|---|---|---|---|
| 05405 | 5350 | SERVR1 | JMP | GETRID | Check for correct line . . . |
| 05406 | 7640 | SERVR2 | SZA CLA | | (Assume ACC 0-9 clear) |
| 05407 | 5350 | SERVR3 | JMP | GETRID | This instruction is used to overlay SERVR1 |
| | | | Fall thru when we are awaiting input & input occurs on line 0 or 1 | | |
| 05410 | 6705 | | YMSRD | | Read CHAR |
| 05411 | 0202 | | AND | MASK | |
| 05412 | 7421 | | MQL | | Hold CHAR in MQ |
| 05413 | 7701 | | ACL | | Restore and check |
| 05414 | 1371 | | TAD | KMSOH | For SOH |
| 05415 | 7650 | | SNA CLA | | |
| 05416 | 5226 | | JMP | SOHGOT | Yes-Start data reception |
| 05417 | 2017 | | ISZ | | No-Update count of CHARS |
| 05420 | 5232 | | JMP | STORE | |
| | | | This section of code collects a packet and goes to load it if the CRC is valid | | |
| 05421 | 7327 | GETPKT | WP0006 | | Set up dummy packet |
| 05422 | 3377 | | DCA | LENGTH | Length . . . (Will be overlaid when packet is stored) |
| 05423 | 1276 | | TAD | OVRLAY | |
| 05424 | 3405 | | DCA | SERVR1 | Await input |
| 05425 | 7340 | | WM0001 | | Ignore all but SOH (CT = −1) |
| 05426 | 3017 | SOHGOT | DCA | ZAUTO7 | Save data (CT = 0) |
| 05427 | 6116 | | YRCCB | | Clear cyclic check register |
| 05430 | 1366 | | TAD | RCVPKT | Set PTR - 1 |
| 05431 | 3011 | | DCA | ZAUTO1 | |
| 05432 | 7701 | STORE | ACL | | Get CHAR from MQ and |
| 05433 | 6114 | | YRCGB | | accumulate GRC |
| 05434 | 7701 | | ACL | | |
| 05435 | 3411 | | DCA I | ZAUTO1 | Save data |
| 05436 | 1017 | | TAD | ZAUTO7 | See of all CHARS received . . . |
| 05437 | 7040 | | CMA | | (Length = total number of packet CHARS; |
| 05440 | 1377 | | TAD | LENGTH | Count = number of input CHARS −1) |
| 05442 | 5262 | | JMP | WAIT | Packet not fully in so get more CHARS |
| 05443 | 6112 | | YRCRL | | Check that CRC |
| 05444 | 7640 | | SZA CLA | | is correct |
| 05445 | 5221 | | JMP | GETPKT | Not O. K. |
| 05446 | 6111 | | YRCRH | | |
| 05447 | 7640 | | SZA CLA | | |
| 05450 | 5221 | | JMP | GETPKT | Not O. K. |
| 05451 | 1207 | | TAD | SERVR3 | Ignore input now |
| 05452 | 3205 | | DCA | SERVR1 | |
| | | | Assume packet if a load packet | | |
| 05453 | 1367 | | TAD | SDATA | Origin pair follows field byte |
| 05454 | 3013 | | DCA | ZAUTO3 | Use ZAUTO3, not ZAUTO1; we use the latter for packing pkts as it is already set to safe default value. |
| 05455 | 1203 | | TAD | KMFOUR | Set auto-index to number of |
| 05456 | 1017 | | TAD | ZAUTO7 | pairs of six bit CHARS to |
| 05457 | 7171 | | STD CIA RAR | | be processed. |
| 05460 | 9017 | | DCA | ZAUTO7 | |
| 05461 | 5332 | | JMP | LD2 | Go test for no RIM data in packet |
| | | | Wait always entered with clear AC | | |
| 05462 | 1204 | WAIT | TDA | SERVR0 | Set timeout for 10 secs (don't bother clearing ZA as will make little difference to timeout) |
| 05463 | 3012 | DCA | ZAUTO2 | | |
| 05464 | 6701 | BACK | YMSAB | | Wait for flag set |
| 05465 | 2010 | TIMEIT | ISZ | ZAUTO0 | and increment timeout |
| 05466 | 5264 | | JMP | BACK | if data not yet received |
| 05467 | 2012 | | ISZ | ZAUTO2 | |
| 05470 | 5264 | | JMP | BACK | |
| | | | If timeout error fall thru to retry (Will never get timeout error if entered wait from outpkt) This is bootstrap start address | | |
| | | RETRY | | | |
| 05471 | 7300 | TAP111 | WKLEAR | | |
| 05472 | 6710 | | YMSCD | | Initialise KL8-A |
| 05473 | 7203 | | WP0100 | | and set up KG8 |
| 05474 | 6115 | | YRCLC | | control register |
| 05475 | 7300 | | WKLEAR | | |
| 05476 | 1365 | OVRLAY | TAD | NEGLIN | |
| 05477 | 7040 | | CMA | | Swap lines (Alternates |
| 05500 | 3365 | | DCA | NEGLIN | 0, −1) |
| 05501 | 7332 | | WP2000 | | |
| 05502 | 1365 | | TAD | NEGLIN | Assert request to send on new line and clear |
| 05503 | 6711 | | YMSLC | | request to send on last line used |
| 05504 | 7300 | | WKLEAR | | |
| 05505 | 1364 | | TAD | XLOCN | Set up branch address . . . Only bits 0-8 used |
| 05506 | 6712 | | YMSLB | | |
| 05507 | 7300 | | WKLEAR | | |
| 05510 | 1207 | | TAD | SERVR3 | Ignore input by overlaying SERVR1 |

TABLE B-continued

DEALING BOOTSTRAP PROGRAM LISTING

| | | | | | |
|---|---|---|---|---|---|
| 05511 | 3205 | | DCA | SERVR1 | with a JMP GETRID insrtuction |
| 05512 | 2016 | | ISZ | ZAUTO6 | |
| 05513 | 5307 | JMP | −4 | | Wait 50ms for the clear to send |
| | | | | Send boot request | |
| 05514 | 1352 | | TAD | HELLO | Send HELLO message . . . |
| 05515 | 5335 | SENDPK | JMP | OUTPKT | (MSG includes CRC & terminating word) |
| | | Pack RIM | | | |
| 05516 | 1413 | LDNEXT | TAD 1 | ZAUTO3 | |
| 05517 | 7106 | | CLL RTL | | |
| 05520 | 7006 | | RTL | | |
| 05521 | 7006 | | RTL | | |
| 05522 | 1413 | | TAD 1 | ZAUTO3 | |
| 05523 | 1370 | | TAD | KM0201 | Assume 8th bit always set (also COMPS link) |
| 05524 | 7430 | | SZL | | |
| 05525 | 5331 | | JMP | LD1 | |
| 05526 | 1371 | | TAD | KMSOH | |
| 05527 | 3011 | | DCA | ZAUTO1 | |
| 05530 | 5332 | | JMP | LD2 | |
| 05531 | 3411 | LD1 | DCA 1 | ZAUTO1 | |
| 05532 | 2017 | LD2 | ISZ | ZAUTO7 | |
| 05533 | 5316 | LOAD | JMP | LDNEXT | |
| 05534 | 1357 | SENDAK | TAD | RIMACK | Send RIM ACK |
| | | | | | On entry ACC = MSG PTR −1 |
| 05535 | 3011 | OUTPKT | DCA | ZAUTO1 | MSG includes CRC & IS terminated |
| | | | | | by a constant in range 3000-6377 |
| 05536 | 7300 | NEXTCH | WKLEAR | | |
| 05537 | 1365 | | TAD | NEGLIN | −1 or 0 |
| 05540 | 7043 | | CIA BSW | | |
| 05541 | 7106 | | CLL RTL | | Form 0 or 400 for lines 0, 1 respectively |
| 05542 | 1411 | | TAD 1 | ZAUTO1 | |
| 05543 | 7510 | | SPA | | |
| 05544 | 5221 | ENDPKT | JMP | GETPKT | End of xmission - NB ACC not = 0 |
| 05545 | 6704 | | YMSXD | | Xmit |
| 05546 | 7300 | | WKLEAR | | |
| 05547 | 5262 | | JMP | WAIT | Wait for xmission gone (Returns to |
| | | | | | NEXTCH & ignores input, if any) |
| 05550 | 6705 | GETRID | YMSRD | | |
| 05551 | 5265 | | JMP | TIMEIT | |
| 05552 | 5552 | HELLO | HELLO | | |
| 05553 | 0001 | | SOH | | |
| 05554 | 0012 | HIYPE | 12 | | |
| 05555 | 0201 | | HCRC1 | | |
| 05556 | 0227 | | HCRC2 | | |
| 05557 | 5557 | RIMACK | RIMACK | | PTR & terminator of HELLO MSG |
| 05560 | 0001 | | SOH | | |
| 05561 | 0014 | | 14 | | |
| 05562 | 0001 | | RCRC1 | | |
| 05563 | 0225 | | RCRC2 | | |
| 05564 | 5400 | XLUCN | SERVE | | PTR & terminator of RIMACK MSG |
| 05565 | 0000 | NEGLIN | 0 | | |
| 05566 | 5574 | RCVPKT | PSTART | | |
| 05567 | 5601 | SDATA | LENGTH +2 | | |
| 05570 | 7577 | KM0201 | −201 | | |
| 05571 | 7777 | KMSOH | −SOH | | |
| 05572 | 0000 | | ZBLOCK | .+200 & 7600 −. | *Zero fill page |

As further shown and preferred in FIG. 6, the terminal controller 68 also preferably includes conventional cyclic redundancy check logic 308, such as a Digital Equipment Corporation KG8 and a conventional multiple serial line interface 310, such as a Digital Equipment Corporation KL8A, for interfacing the terminal controller CPU 300 with the concentrator computer 46 via modem 66 at a rate of 1200 bits per second asynchronous, and for interfacing the terminal controller CPU 300 with the printer 78. In addition, the terminal controller 68 also preferably includes a display driver for each of the keystations, such as keystations 70, 82 and 84, associated with the terminal controller. Thus, since as previously mentioned each terminal controller is preferably capable of servicing up to 6 keystations, 6 identical display drivers 312, 314, 316, 318, 320 and 322 are provided with, for example, display driver 312 being connected to keystation 70, display driver 314 being connected to keystation 82 and display driver 322 being connected to keystation 84. Each of these display drivers 312 through 322 may preferably be of the type commercially available from Digital Equipment Corporation under the designation VK8A. Each display driver preferably provides video signals to the CRT associated with the keystation, such as CRT 76 for keystation 70, and receives input signals from the keyboard logic associated with the keystation, such as keyboard logic 74 for keystation 70, with the display driver 312 through 322, inclusive, being the interface between the CPU 300 and the individual keystations.

Figure 7:
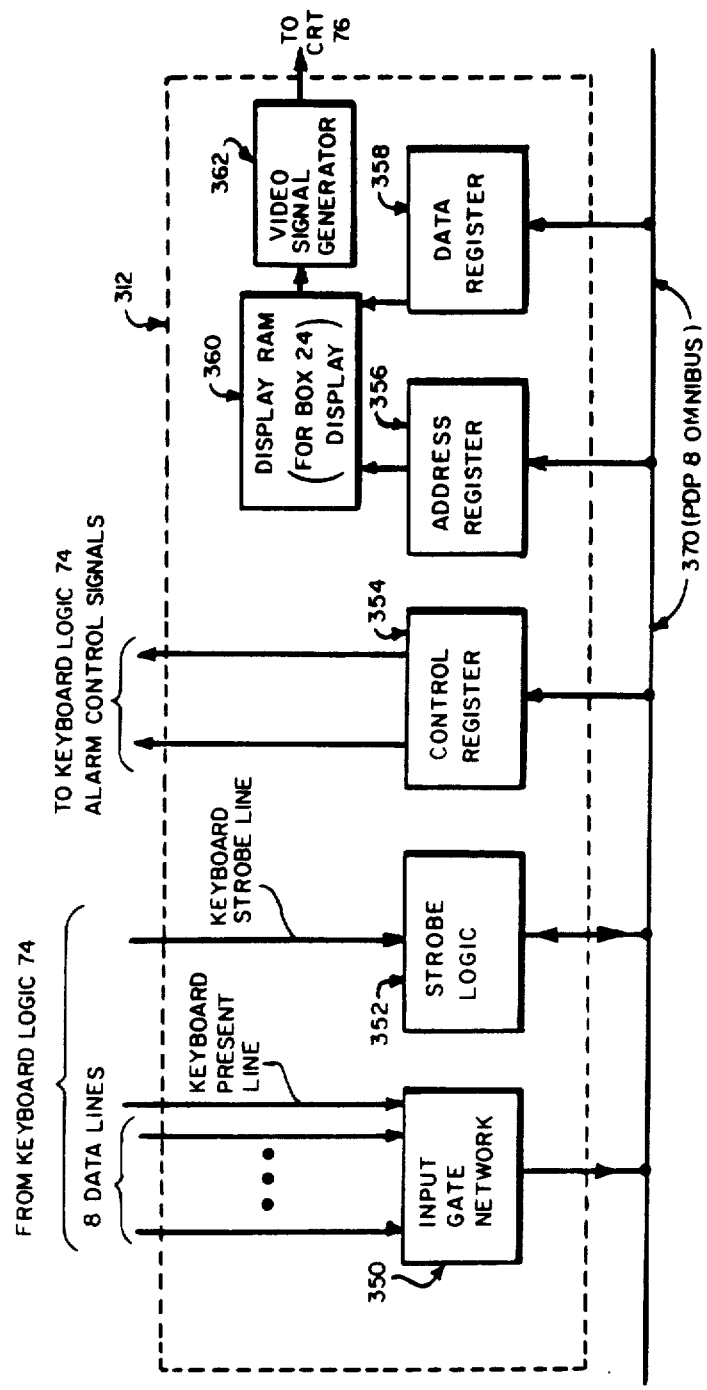
FIG. 7 is a functional block diagram of a typical display driver portion of the terminal controller of FIG. 6.
Figure 8:
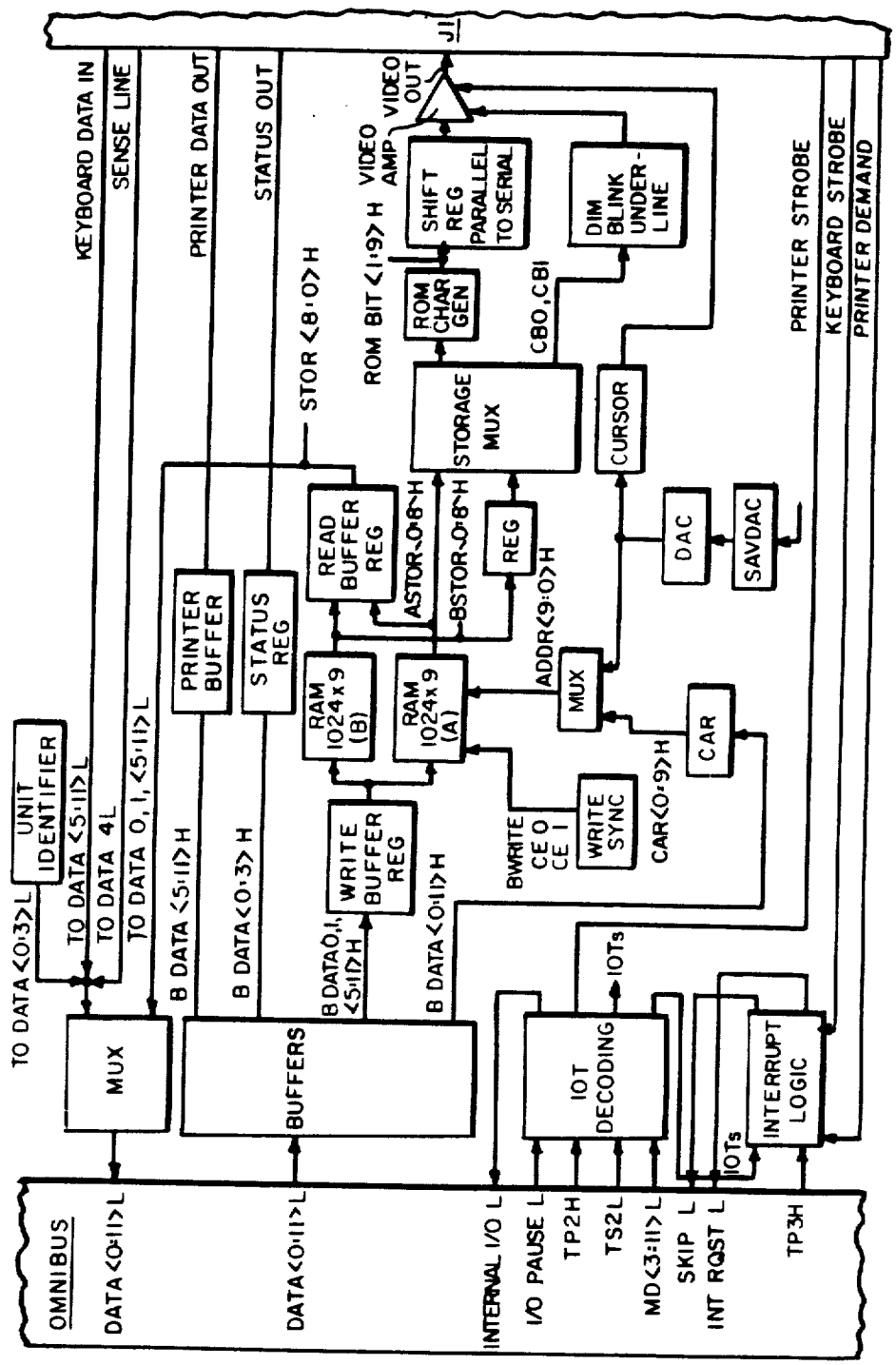
FIG. 8 is a more detailed functional block diagram of the VK8-A display driver of FIG. 7.

Referring now to FIG. 7, a typical video display driver 312 is illustrated in block form. Thus, the display driver 312 preferably includes a plurality of input gates 350 for receiving the eight data lines from the keyboard encoding logic 74, as well as for receiving a KEYBOARD PRESENT signal line also provided from the keyboard logic 74 to indicate to the terminal controller 68 that the keyboard has been switched on. In addition, the display driver 312 also includes conventional strobe logic 352, which receives a keyboard strobe signal from the keyboard logic 74, and control, address, and data registers 354, 356 and 358, respectively. Control register 354 preferably provides an alarm control signal to the keyboard for providing an alarm indication to the user. The address register 356 and the data register 358 are preferably associated with a display memory 360, such as a display RAM having 2048 bytes of memory. In reality, the display screen is preferably 80-by-24 and, accordingly, only the first 1920 bytes of the display RAM 360 are utilized to map 1-to-1 on to the display screen. The output of the display RAM 360 is provided to a conventional video signal generator circuit 362 which includes a character generator for providing a video display signal to the CRT 76 from the contents of the display RAM 360. As shown and preferred in FIG. 7, the input gates 350, strobe logic 352, control register 354 and address and data registers 356 and 358, respectively, are all connected to the CPU bus 370, such as a conventional PDP8 Omnibus. As was previously mentioned, the display driver 312 is preferably a conventional display driver such as a VK8A commercially available from Digital Equipment Corporation and a more detailed block diagram of such a VK8A display driver is illustrated in FIG. 8 and corresponds to FIG. 3-1 in the VK8A Maintenance Manual of January 1977 which may be referred to for further details on the operation of the VK8A display driver.

Figure 9:
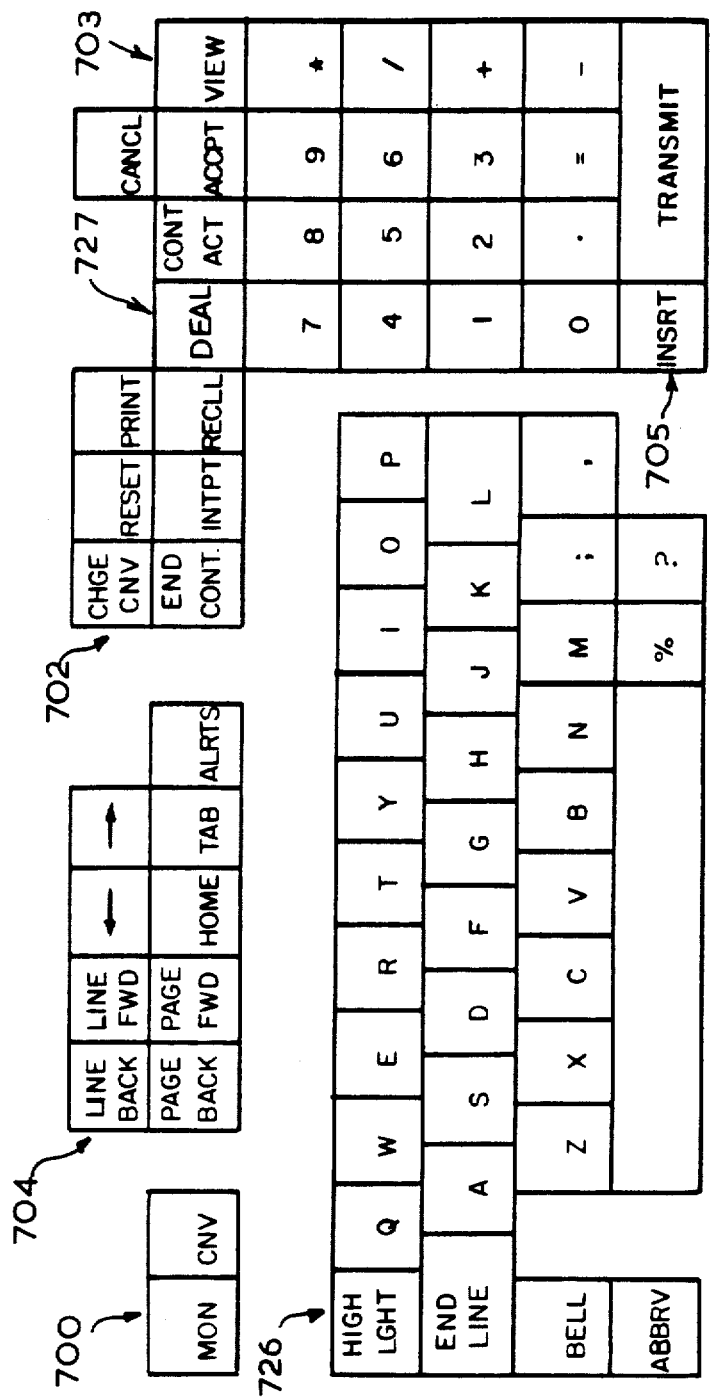
FIG. 9 is a diagrammatic illustration of a typical keyboard layout for the keyboard portion of a typical keystation for use in the system of FIG. 1.

Referring now to FIG. 9, a diagrammatic illustration of a typical keyboard layout for the keyboard portion 72 of a typical keystation 70 for use in the conversational video system 30 of the present invention is shown. Thus, as shown by way of example in FIG. 9, the various keys of keyboard 72 bear legends associated with the function or type of message which the user or keystation 70 wishes to transmit through the keyboard logic 74 to the terminal controller 68, for example, for appropriate processing. As further shown and preferred in FIG. 9 the keyboard function keys are preferably divided into several functional types; namely mode keys 700 which select between a data base display mode, such as for displaying conventional data of the type commercially available from Reuters under the service designated as Reuter Monitor, and the conversational video communication mode which enables a user to carry on a two-way conversation with other users in the system 30; function and control keys 702 which are responsible for certain functional control commands; display and cursor control keys 704 which are responsible for controlling the display 76; and character control keys 706 which include certain character control functions including insertion of character data. The depression of a mode key 700 preferably causes subsequent input to be interpreted by the terminal controller 68 as being associated with that selected mode. With respect to the function and control keys 702, the effect of each function key is to some extent preferably dependent upon the mode which has been selected. Thus, the key 703 labelled VIEW indicates to the terminal controller 68 that the characters which are subsequently being input via the character control keys 706 are to be interpreted as a request for a display. As will be described in greater detail hereinafter with respect to FIGS. 22–47, and particularly with respect to FIGS. 27 and 33, this VIEW key 703 is utilized in connection with the set-up of subscriber created CALL LISTS and INHIBIT LISTS which are locally stored in the terminal controller in the improved system 30 of the present invention.

The key labelled CONTACT indicates to the terminal controller 68 that the characters which are subsequently input via the character control key 706 specify the party or subscriber or CONTACT LIST members with whom a conversation or other contact is desired. The key labelled ACCEPT indicates to the terminal controller 68 that the character which is subsequently input via the character keys 706 specifies the call that the user wishes to accept from the incoming call list. The key 705 labelled INSERT indicates to the terminal controller 68 that the characters which are subsequently input via character keys 706 are to be interpreted as an insert whose function depends on the mode selected; for example, in the data or Monitor mode the characters would be interpreted as an insert to the data base 50 and in the conversational mode the characters which were input would be interpreted as an insert to the user line of the display 76 allowing preparation of conversational text without transmission at the time of preparation of these characters to the other party to the communication; whereas in the INHIBIT LIST or CONTACT LIST made, the characters which were input would be interpreted as an insert to the subscriber's INHIBIT LIST or CONTACT LIST, such as referred to in FIGS. 35 OR 29, respectively. This key 705 may also be used to prepare messages to be left or interest messages as will be described hereinafter. The key labelled CANCEL indicates to the terminal controller 68 that the characters which are subsequently input by character key 706 are describing an entity to be cancelled. The key labelled RESET resets a keystation within the current selected mode such as clearing the input characters displayed on the insert line and the associated message line. In addition, as is readily available from the Reuter Monitor system, news alerts can be provided, and, if such a data base is used to provide data to the system 30 of the present invention, the RESET key, if qualified by an earlier ALRTS key from key group 704, may be used to clear a news headline, with the display 76 reverting to the mode before the ALRTS key was depressed. The key labelled RECLL provides a control signal to the terminal controller 68 requesting the recall of the previous display. The key labelled INTPT initiates a control signal to the terminal controller 68 which, in the conversational mode, initiates an interrupt message giving control of the conversation over to the party who initiated the interrupt message. This function is to be described in greater detail hereinafter. The key labelled END CONT initiates a control signal which results in the termination of a current conversation in the conversational mode. The key labelled CHGE CNV initiates a control signal which causes transfer, in the conversational mode, between conversations if two conversations are being carried on simultaneously by a single user 70 in which instance, as will be described in greater detail hereinafter, the first conversation area 502 and the display area 504 are then utilized in the user display 76. In addition, as will be described in greater detail with reference to FIGS. 31–32, with respect to the ability to carry on two conversations simultaneously, the two conversations can be set-up with a single call using the improved DUAL CONTACT LIST function of the improved system of the present invention. The key labelled PRINT initiates a control signal to the terminal controller 68 which forces printing of the current display at printer 78.

With respect to the aforementioned key labelled ALRTS in key group 704, this key initiates a special sub-mode which allows control of the news headline area if present, the alerts area and the incoming calls area of the display 76. In this regard, when this key is initially depressed the alerts area is selected and control moved between the aforementioned three areas by pressing 1, 2 or 3 respectively. When the alerts or incoming calls area of the display 76 are selected the area may preferably be scrolled using the line and page control keys 704. With respect to these keys the LINE BACK and LINE FWD keys move the display up or down by one line and preferably affect only conversational dialogue displays, alerts and incoming calls, whereas the PAGE BACK and PAGE FWD affect the display of the next or previous page. With respect to the cursor control keys, these control the cursor, with the HOME key placing the cursor on the first position of the insert line and with the TAB key placing the cursor just after the last character on the insert line, with these keys only affecting the cursor in the insert line. The key labelled TRANSMIT, in the conversational mode, transfers control of the conversation to the other party. This key is also used to indicate the completion of entry of text into the insert line. With respect to the key labelled ABBRV, this key relates to the insertion of text on the user line, and particularly to the insertion of such text containing abbreviations. When this key has been depressed, the terminal controller 68 will examine the inserted message after it has been completed to determine if any of the character strings correspond to abbreviations contained in the look up table of the terminal controller 68. If so, these character strings are expanded into their corresponding full text prior to transmission. With respect to the key labelled END LINE, this key initiates the starting of a new line of conversational video text without transferring control to the other party to the conversation. With respect to the key 726 labelled HIGHLIGHT, in the conversational mode, depression of this key causes the previous line, or the current line if it has been started, to be highlighted by asterisks on the right of the text in the print out. With respect to the key 727 labelled DEAL, in the conversational mode, depression of this key 727 results in a double asterisk confirmation of receipt of the sent message or line transmission adjacent the message or line being confirmed and functions similarly to the END LINE key as will be described in greater detail hereinafter with reference to FIGS. 44–47. Lastly, the pressing of any of the graphic keys results in the character being displayed in the position indicated by the cursor and the cursor moves to the next position. It should be noted that the cursor normally remains in the insert line except during conversations when characters may be input directly into the display 76 for transmission to the other party.

Figure 11:
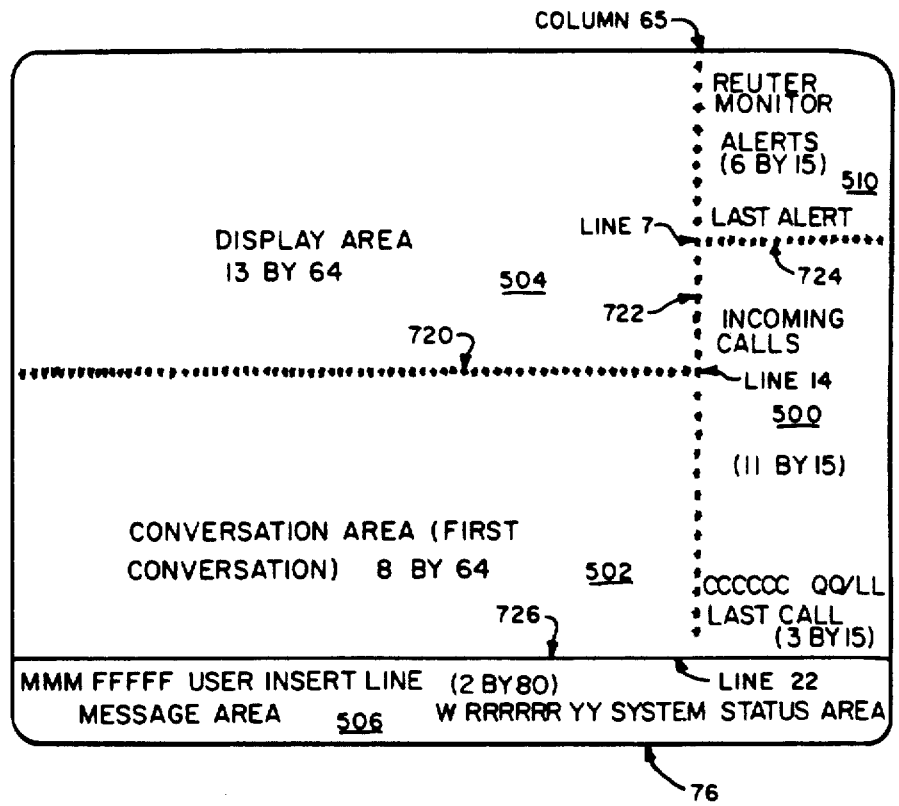
FIG. 11 is a diagrammatic illustration of a typical display area layout for the display portion of a typical keystation used in the system of FIG. 1.

Referring now to FIG. 11, a diagrammatic illustration of a typical display area layout for the display portion 76 of a typical keystation 70 is shown. The display 76 preferably displays 24 lines each of 80 characters. Preferably the display 76 is divided into a plurality of pre-defined areas with certain of these areas clearly designated by providing lines 720, 722, 724 and 726. Thus, the screen or display 76 is preferably divided into a first conversation area 502 defined by lines 722, 720 and 726, with line 722 being at column 65, with line 720 being at column 14 and with line 726 being at column 22 to define a first conversation area of 8-by-64. In addition display 76 also includes a display area 504 defined by lines 722 and 720 which display area is preferably 13-by-64 and may display either the contents of a second conversation or retrieved data. Another area of the display is the incoming calls area 500 defined by lines 724, 722 and 726. The incoming calls area is preferably 11-by-15, with the last three lines of the incoming calls area 500 being special areas relating to a display of a message *MORE* if more calls cannot be shown, a display of the number of calls queued, a display of the number of left messages not cancelled, and a display of the last call received. The display 76 also includes an alerts message area 510 for display of alerts messages, with this area preferably being 6-by-15 and being defined by lines 722 and 724. Lastly, the bottom display area 506 of the display 76 includes a user insert line, a message area and a system status area with the bottom area 506 displaying the mode, the function, and the user insert line, which user insert line preferably comprises positions 11 to 80 of row 23, and with the mode of the system being displayed relating to the conversational mode including the CN1 or CN2 designation where CN1 is the conversation displayed in the first conversation area 502 and CN2 is the conversation displayed in the display or second conversation area 504. With respect to the message area, positions 1 to 48 of row 24 provides space for responses to inputs to the system from the keyboard 72 with this message area being cleared when text on the insert line is transmitted. Typical responses appearing on the message line are ACCEPTED and INVALID. Position 50 of row 24 preferably shows the transmission state of the last message in the current mode with W indicating waiting for transmission and T indicating waiting for a reply. This transmission state is preferably blank in the CN1 and CN2 modes, except when leaving a message. Positions 52 to 57 of row 24 preferably show the first 6 characters of the last page requested in the current mode, which page can be requested again by pressing the RECLL function key on the keyboard 72. Positions 59 to 60 of row 24 preferably show the status of the second conversation in the event this second conversation is not then currently being displayed in display area 504, with the first character being a single letter representation of the status, such as busy, queued, free, receive, send, transfer, ended or off system. With respect to the aforementioned alerts contained in area 510, preferably five alerts of up to 15 characters can be displayed in chronological order, with the most recent five received by the controller 68 preferably being displayed although the controller 68 is preferably capable of retaining an additional 12 alerts which may be scrolled into view by pressing the ALRTS key on the keyboard 72 and the LINE or PAGE keys. Preferably, as illustrated in FIG. 11, the most recent or last alert is not scrolled and always occupies the bottom line or area 510. With respect to the aforementioned incoming calls area 500, this area preferably contains brief details of the incoming calls and their interest messages, with the calls being shown in chronological order, with the oldest at the top of the area and with the latest call being displayed in lines 21 and 22. It should be noted, however, that the incoming calls do not have to be selected by the called party in used to show the incoming call status. Preferably, if a news alert is received, it will be displayed in three lines below the display area 504, namely in rows 14 to 16 and positions 1 through 64. If a conversation is occupying this portion of area 502, then the heading of the conversation will be moved to row 17 to allow for display of the news alert. As was previously mentioned, this news alert may be reset.

Referring now to FIGS. 10A through 10F, these figures illustrate typical examples of conversational video displays which may appear on the display 76 of a typical keystation used in the conversational video system 30 of the present invention. As was previously mentioned, in order to conduct a conversational video communication, the keyboard 70 must be in the conversational mode. In this mode, each keystation is preferably capable of controlling two conversations simultaneously and, if the user decides to initiate such a second conversation, the details will be displayed on his display 76 in the display area 504 and will override and cancel any other display in this area 504. Displays, however, may be called up in any mode while a second conversation is in progress and will then temporarily suppress the display of the second conversation in area 504. These displays will themselves be overridden and cancelled when the second conversation is subsequently selected. The format of the display of the second conversation in area 504 is preferably identical to that of the first conversation and occupies lines 1 to 8 of the display area 504. If one conversation contact has been executed, a subsequent contact is assumed to be a request for a second conversation with control being passed back to the first conversation by depressing of the key labelled CHGE CNV on the keyboard 72 which key may thereafter be used to transfer at any time between the two conversations. If the first conversation is completed while a second one is still in progress, the second conversation still remains in the display area 504. Typical call headings which would be displayed under various conditions are illustrated in FIG. 10A with each of these call headings being appropriately labelled. Each subscriber is preferably assigned a unique four character short name and the user wishing to contact another subscriber merely presses the CNTCT key on his keyboard 72, then the short name of the subscriber and the TRANSMIT key. In making this contact, the calling party may use an abbreviated form of address, may add a two character reference code to the called name, which code is intended to indicate which of the called subscribers keystations the caller wishes to contact, or he may indicate a CONTACT or CALL LIST call with or without the requested skipping of selected subscribers in the CALL LIST for a given call, or he may add a 14 character interest message to his call to indicate the reason for his call. This interest message is displayed in his conversation display as his first message in the conversation and is shown in the incoming calls area 500 of the display 76 of the party being called and then in his conversation display once the incoming call is accepted. Calls which are received by a subscriber are preferably assigned a letter on receipt and are displayed in the incoming calls area 500 of all keystation screens associated with that subscriber. Calls normally occupy one line of the incoming calls area 500 and are preferably displayed, as previously mentioned, in time order with the letter assigned to the call, the four character short name of the calling subscriber and, if present, the two character reference code indicating the particular keystation that the caller wishes to contact. If an interest message is sent with the call, it preferably appears on the next line of the incoming calls area 500 indented one space. When the user accepts a call by pressing the ACCEPT function key on his keyboard 72 followed by the letter identifying the call which he wishes to accept and the key labelled TRANSMIT, the system displays, on his insert line, the message CNV ACCEPT A assuming that call A is accepted, and in the conversation area 502 for the first conversation or the display area 504 for a second conversation, the conversation heading in exactly the same format as for the contacting subscriber except for the substitution of the word "FROM" for the word "TO" to indicate that the calling party originated the call. If an interest message was included with the contact, this is preferably displayed as the first message of the conversation and the contacted party is then expected to reply with a second message. The status of the call will reflect this. The acceptance of the call is also signalled to the terminal controller of the calling party and the status of the called party's display is updated to indicate either that he should await a message, such as if he sent an interest message, or that he should start the dialogue or conversation. In addition, the accepted call is cleared from the incoming calls area 500 of all keystations associated with that subscriber. With respect to conversations dialogue, input messages are preferably displayed in the conversation area 502 for the first conversation, starting at position 4, with the user keying in the information at his own rate. The message is then transmitted in packets as it is being typed in, with the packets of the message preferably being transmitted if a space character is encountered after the input of the tenth character from the start of the line or end of the previous packet, if no space is encountered after the tenth character but the 15th character has been input, if the END LINE key has been depressed either in conversation text or to release prepared text in the insert line, if the 61st character of a line is typed, this character overflowing to the next line and automatically forcing an end of line condition, if the control is moved to the insert line by pressing the INSERT key or the ABBRV key, if the TRANSMIT key is pressed to indicate the end of the sender's message, if an interval of a predetermined period, such as 20 seconds, elapses since the last text transmission, or if the END CONT key is pressed. The completion of a message is preferably signalled by a change of status in the conversation header line of the sender's conversation from send to receive and vice versa for the recipient's conversation. While the user is awaiting receipt of a message he may prepare his next response on the insert line. He may also prepare a message for transmission when he is in control of the conversation. In either case, he enters the appropriate conversation mode CN1 or CN2 using the CNV mode and the CHNG CNV key if necessary and then presses INSERT. The system will then transmit any text up to this point and move the cursor to position 11 of the insert line. The user may then enter up to 70 characters in the insert line and edit them as required, with this text only being released if the user presses TRANSMIT, END LINE or END CONT while he has control of the conversation. The text when released in this manner is transferred to the conversation area 502 or 504 if it is a second conversation, and transmitted to the other party, with the insert line being cleared. If the TRANSMIT key has been pressed, the text is regarded as forming the complete message and the conversation status changes to receive. The use of the END LINE key indicates that the user's message is not complete. The cursor is moved into the dialogue text at an appropriate point for input to continue. Further text may be added in the conversation or in the insert area if the insert key is pressed again. A correspondent who was waiting for a response from the other party may preempt control by pressing the INTERRUPT key, as previously mentioned, and any portion of text which has been received by the receiving party's terminal controller before the INTERRUPT key has been pressed is regarded as binding and is displayed on the recipient's display 76 as a received message. The pressing of the key changes the status of his conversation from received to send and results in an interrupt message indicating how many characters have been received by the interrupted party. Receipt of this message changes the status from send to receive, clears any text after the interrupt point, and displays the message *INTERRUPT* on the next line. The interrupter is then in control of the conversation and can commence the transmission of his message. He may in turn be interrupted. The display of a conversation holds a heading and up to 7 lines of conversation, each of up to 60 characters, by way of example. The first character of each line indicates whether the line was transmitted or received. The text of lines sent preferably start at position 4, lines received being indented to position 5. The most recent message is preferably at the bottom of the area and the oldest at the top. When the area is full, the uppermost lines are preferably moved off the screen leaving space for newer messages. Earlier parts of the conversations may be examined by using the LINE and PAGE function keys on the keyboard 72. It should be noted that when a conversation is scrolled so that the current line is not on display, this is indicated on the display by display of the word SCROLL on the heading line. A user may print a current conversation using the PRINT function key on the keyboard 72 at any time. If he does so, the conversation up to that point is released for printing on the printer associated with the terminal controller and, effectively, a new conversation is started within the same call and with the same party, the user's screen is cleared, and portions of the conversation which took place before pressing the PRINT key cannot be recalled by use of the LINE and PAGE keys. It should be noted that preferably conversations of a normal length of 300 to 500 characters may be completed without the necessity of printing the conversation before it is completed.

By way of example, with respect to the aforementioned abbreviations function, standard abbreviations may be employed such as by using the symbol A for the word "AT" by using the symbol B for "I BUY", by using the symbol FF for "FRENCH FRANCS", and by using the symbol * for "MILLION", then the expression "AT 79 I BUY 10 MILLION FRENCH FRANCS" may be provided in the following abbreviation: "nA79B10*F". Simple conversational messages in accordance with the above principles are illustrated in FIGS. 10A through 10F and are essentially self-explanatory with the legends provided underneath. It should be noted that the above exemplary displays are assuming that the conversational video system 30 is being used in the money dealing market in which money dealing rates are proposed and accepted by the subscribers to complete transactions. Of course, the conversational video system 30 of the present invention may be employed in any type of rapid video communication between subscribers and particularly where more than one conversation is desired to be carried on at a given time or where it is desired to provide supplementary data which may be retrieved along with the conversational text, particularly where the data could be useful in connection with the transaction being carried out through the video conversation function of the system 30. As was previously mentioned, the display of retrievable data may preferably be conventionally accomplished by a conventional data retrieval system, such as the Reuter Monitor and need not be explained in any further detail. At this point, in order to provide a basis for comparison, the operation of the prior system described in the aforementioned copending patent application entitled "Conversational Video System Having Contact Selection Control" shall now be described in greater detail below, assuming for purposes of explanation that the conversational video system is being used in a money market dealing environment. Thereafter, the improved system 30 shall be described in greater detail with reference to FIGS. 22–47. As was previously described and as will be noted below one of the more apparent differences between the prior system and the improved system of the present invention, apart from addition capabilities such as DUAL CALL LIST and DEAL KEY, resides in the ability of the terminal controller of the present invention to control CALL LIST and INHIBIT LIST functions without having to access the SUBSCRIBER FILE 1000 of the host computer 38 as was required in the prior system operation.

As was previously described, the terminal controller, such as terminal controller 68, provides the interface between the users or subscribers and the central system network 32. Preferably, the terminal controller 68 interface to the network is based on a port table in the controller 68 control program enumerated above in Table A herein for the improved system of the present invention, and in Table A of the above application referring to the prior system. The various ports relate to communication with the associated concentrator 46, separate ports corresponding to communication with the data base 50, other ports relating to communication with the host computer 38 through the packet switching network 40, such as, by way of example, with respect to the aforementioned CALL LIST and INHIBIT LIST features or facilities to be described in greater detail hereinafter with reference to FIGS. 14–21 for the prior system and with respect to FIGS. 22–43 for the improved system of the present invention, and with 12 ports being reserved for the 12 possible video conversations that can be held on the 6 keystations supported by the terminal controller 68, such as keystations 70, 82 and 84, by way of example. As was previously mentioned, the packet switching network 40 is preferably a conventional type of packet switching network such as one conforming to the standardized X25 packet switching protocol, and is preferably used to provide logical connections between the various concentrator computers, such as 46 and 48, and between the concentrator computers 46, 48 and the host computer 38. The system is designed so that preferably one of the logical connections between the concentrator computer 46 and the host computer 38 through the packet switching network 40 also carries all of the communication information between the terminal controller 68 and the host computer 38 as well as, in the example of FIG. 1 all of the communication information between the terminal controller 80 and the host computer 38 and any other terminal controllers which are associated with that particular concentrator computer 46. Thus, all of the common ports of the terminal controllers which are connected to a given concentrator computer 46 and which are associated with the host computer 38 use the same channel across the packet switching network 40. Similarly, all of the video conversations that are directed from one concentrator, such as concentrator 46, to another concentrator, such as concentrator 48, are multiplexed across a common logical connection between the concentrators 46 and 48. The terminal controller, such as terminal controller 68, preferably contains answerback codes and user abbreviations which are employed in the conversational video system 30 of the present invention, as well as in the improved sytem of the present invention, copies of the INHIBIT tables or LISTS and CONTACT or CALL tables or LISTS. Thus, an answerback code would preferably be a 20 character text string identifying a particular subscriber, such as subscriber 34, and the user abbreviations are for abbreviated transmissions of various data so as to expedite the video communication, with a given terminal controller preferably containing up to a thousand characters relating user abbreviations to their corresponding full text expansion. The terminal controller 68 is preferably identified to the concentrator computer by a subscriber identifier and a unique controller number. During system 30 operation, the various multiple serial interface 284, 286 and 288, by way of example, associated with the concentrator computer 46 check a line whenever no traffic has been acknowledged for a predetermined period, such as five seconds. Each terminal controller acknowledgement confirms the identity of the line by preferably including a check byte in addition to the packet sequence number. If the checks fail, the connection is broken and an error condition is reported. The packets on the line to the terminal controller, such as terminal controller 68, may be at normal or high priority, to be described in greater detail hereinafter. Once a packet is being transmitted, it is preferably delivered before another is transmitted; however, the interface 284, 286 or 288 will preferably select high priority packets in preference to normal priority packets. The messages received by the concentrator computer 46 from the system 30 are preferably divided into 64 data byte packets for transmission to the terminal controllers, such as terminal controller 68, so that high priority packets can obtain access to the line in a reasonable time. The first byte of each packet to the terminal controller 68 preferably contains the port number of the connection and a bit indicating if this is the first packet of a message. In terms of the aforementioned priority, a video conversational message is preferably given a high priority in the system whereas data from the data base 50 is given a normal priority.

Figure 12:
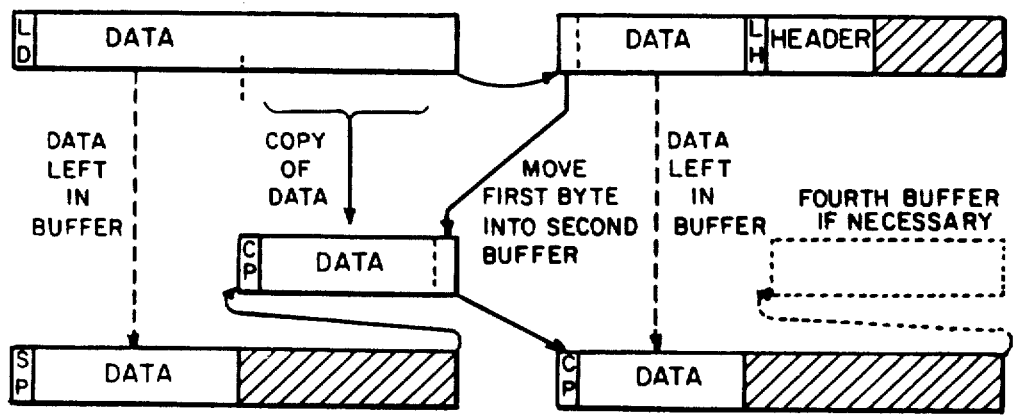
FIG. 12 is a diagrammatic illustration of the splitting of an input message to the concentrator computer into multiple packets.

Thus, an input message is normally divided into packets so as to enable a high priority packet to be inserted where necessary between normal priority packets so that the conversational video data may always take precedence over normal data transmission in the system 30. As shown in FIG. 12, which is a diagrammatic illustration of the splitting of data messages into several packets, when an inputting message is split, the first 64 bytes, by way of example, can be transferred in the buffer they arrived in and the port number can replace the data length byte. The rest of that buffer is preferably copied into a second buffer which is chained to the first buffer. This preferably contains 1 byte for the port, 63 bytes for the remaining data in the original buffer and 1 byte to copy from the first byte of the second buffer. If a second buffer exists, this is split into two buffers in a similar way. High priority messages are preferably handled in the same way although they are preferably restricted to messages of less than 64 bytes.

When a keystation, such as keystation 70, wants to initiate a call or video communication, the user depresses the CNTCT key on the keyboard 72, which, through the keyboard logic 74, provides a contact signal to the terminal controller 68. In the prior system described in the aforementioned copending U.S. patent application Ser. No. 230,341 and the continuation-in-part thereof, on detecting this contact signal, the terminal controller 68 preferably sends the contents of the user insert line for user 70 to the host computer 38 for analysis. As was previously mentioned, the message preferably includes a port number allocated for the conversation and a conversation reference byte. The user's keyboard 72 is preferably locked until the initial reply is received. Assuming that the initiating keystation 70 is not contained in the INHIBIT LIST of the keystation to be contacted, which in the aforementioned prior system requires access to the SUBSCRIBER FILE 1000, the host computer 38 then sends the contact request as an incoming call to the respective terminal controller with which the message is associated, such as controller 96 along with the text for display and additional data to enable the call to be established when it is accepted by the controller 96 or by one of the users 98, 100 associated with terminal controller 96. Prior to the acceptance of the incoming call by one of the keystations 98, 100, the call is placed in one of, by way of example, 16 positions in a dedicated buffer area in the terminal controller 96, with a separate list specifying the order of arrival of incoming calls which controls the display of the incoming calls on the CRT display 96 such as displayed in the incoming calls portion 500 of the display illustrated in FIG. 11. The display preferably shows the calls in order of arrival normally starting with the earliest received incoming call; however, preferably the latest call is always shown at the bottom of the incoming calls area 500 on the display. If the capacity of the incoming calls area 500 is exceeded so that not all incoming calls can be shown in the incoming calls area 500, then the incoming calls can be scrolled in this area; however, the latest call is always preferably left on display at the bottom of the incoming calls area 500. Any of the associated keystations 98, 100 can preferably accept any of the incoming calls displayed in the incoming calls area 500 and does not have to select the calls in the order of receipt. As was previously mentioned, the incoming calls may be displayed with the adjacent interest message which can be utilized by the users at the keystations 98, 100 to determine which call to accept first. When a user 98, 100 desires to accept one of the displayed incoming calls, the user depresses the ACCEPT key on his keyboard 72, which, through the associated keyboard logic 74, transmits an accept signal to the terminal controller 96. The user, such as keystation 98, then indicates which of the displayed incoming calls he wishes to accept by inputting a single letter identifier displayed adjacent to the particular incoming call in the incoming calls area 500. The terminal controller 96 determines from this information which of the incoming calls have been accepted and uses the related data in the call buffer to set up a display heading for the incoming call, to report to the host computer 38, and to request a connection to the caller initiating the contact by sending a request on a dedicated port to the concentrator 48. This request preferably includes the subscriber 36 answerback code and the number of the keystation 98 accepting the call. This connection may, of course, be successful or unsuccessful; however, if the connection is successful the relevant conversation area in the display such as the first conversation area 502 or the second conversation area 504 is initialized with a heading line. If, however, the connection is unsuccessful, a message is displayed in the message area 506. Assuming the connection is successful, the terminal controller 68 associated with the keystation initiating the contact will preferably reply with the subscriber 34 answerback code.

After the connection has been completed between the terminal controllers 68 and 96 and the associated calling and receiving keystations, such as keystation 70 and 98, respectively, the video communication conversation may then take place between these keystations 70 and 98. The conversation text is preferably held in 64 word buffers which are chained together in each of the respective controllers 68 and 96 with data for the printed heading preferably being held separately since it is placed in the text before printing of the displayed conversational video communication. The conversational control program provided by way of example in Table A, controls the text held in core 304, 306 and can provide scrolling of the display 76, regeneration of a conversation in the general display area 504 when required, and generation of displays in the conversation area 502 when this is affected by such things as alert messages such as corresponding to relevant supplementary data, such as important news stories which could affect the transaction being carried on between the callers 70 and 98, or corresponding to a subscriber created page sent to other subscribers on the CALL LIST. If the conversation is ended, or released for printing on printer 78 and 102, respectively, so as to provide a hard copy print-out of the communication between keystations 70 and 98, terminating information may be added before the text is queued to the printers 78, 102. In addition, as was previously mentioned in referring to the layout of keyboard 72, the keyboard 72 also preferably includes a HIGHLIGHT KEY 726 and a DEAL KEY 727 for highlighting a particular line on the display, such as to indicate that a transaction has been completed or confirmed if the video communication is used for such transactions as money market dealing, for example. With respect to HIGHLIGHT KEY 726, the HIGHLIGHT KEY control function preferably acts on the current or previous line and adds a row of asterisks to the conversation line. They are not displayed, as each line is limited to 64 characters, but rather appear in the hard copy print-out. However, as will be described in greater detail herein with reference to FIGS. 44-47, with respect to DEAL KEY 727, the DEAL KEY control function preferably causes asterisks to be displayed on the screen in order to provide a visual confirmation at the sending end of receipt of the transmission at the receiving end, such as to confirm a deal, with the DEAL KEY then acting like an END LINE KEY, retaining control of the conversation at the sending end. The keyboard 72 INTERRUPT key provides an interrupt control signal to the terminal controller 68 or 96, transferring control of the conversational dialogue from the party who is transmitting at that particular point in time to the party who is receiving, and causes the sending of a message to the then transmitting party to clear data from his screen which has not yet been transmitted to the receiving party. When the interrupt has taken place, the call buffers are modified appropriately and the conversation is again displayed with the deleted text removed from the display. In addition, a reply is sent acknowledging the interrupt so that an interrupt message appears on the screen or display of the party whose message has been interrupted.

Referring now to the user insert line which appears in display area 506 of the display 76, if either the insert key on the keyboard 72 or the abbreviation key on the keyboard 72 is depressed by the user during a conversation, this forces the cursor on the screen to move to the user insert line in display area 506 and provides a control signal through the terminal controller 68 or 96, depending on who is initiating the insert function, to indicate that this function has been selected. Similarly, depression of the abbreviation key places the abbreviation character in the user insert line. The user then types in the desired insert message which is displayed on his user insert line. When the insert line is released by the user, such as by depression of the TRANSMIT key, the END CONTACT key or the END LINE key on the keyboard 72, it is treated by the respective controller 68 or 96 as a series of characters input from the keyboard 72. If the abbreviation character is found, then subsequent processing of the insert line by the terminal controller 68 or 96 is preferably in the abbreviation mode, with each character string from the keyboard 72 preferably being tested by the controller to find if it corresponds to one of the abbreviations stored in the controller 68 or 96. Assuming it does correspond, then the abbreviation is replaced by its full text expansion and the expanded abbreviation is used as though the full text characters had been provided on the user insert line.

It should also be noted that preferably a message may be left by a caller when the conversation has not been accepted. This left message is preferably created on the user insert line and dispatched by the sending terminal controller, such as controller 68 with an insert function, as a left message to the host computer 38 from which it is then sent in a message to the controller 96 of the party to which it is directed. In the prior system, this left message is then preferably printed on printer 102 and is preferably accompanied by the number of left messages which are being held in the host computer 38 for that subscriber 36. This number is preferably displayed in the incoming calls area 500 of the display 76 and is preferably flashed for a predetermined period, such as 3 seconds, and is also maintained on a left message page of the subscriber 36 until it has been cleared or overwritten.

As was previously described, when a connection is made between the controllers 68 and 96, messages are sent over the line in packets which include cyclic redundancy checks and an acknowledgement protocol which gives a high probability of error free communication and ensures that packets are received in the order they were sent. Thus, packets which have been sent to the concentrator computer 46 or 48 preferably include a check byte specific to the controller 68 or 96, respectively, which enables any misconnected line to be detected, with the check byte being loaded into the controller when the connection is established so that the concentrator computer may ensure that it is connected to the correct terminal controller. Preferably, the maximum packet size into the concentrator computer will hold 83 bytes of data with packets out to the terminal controller being perferably limited to 64 bytes of data. A messge reaching the concentrator computer for the associated terminal controller may preferably contain up to 255 bytes with the messages thus being divided into up to four packets for transmission to the terminal controller. Preferably, the first packet in a message is marked to permit checks on message synchronization. As was previously mentioned, there are preferably two priorities of message which may be received by the controller, namely high priority messages and normal priority messages, with one or more high priority messages being insertable between two packets of a normal priority message. The two priorities are, therefore, preferably accepted by the controller as two independent packet streams.

Figure 13A:
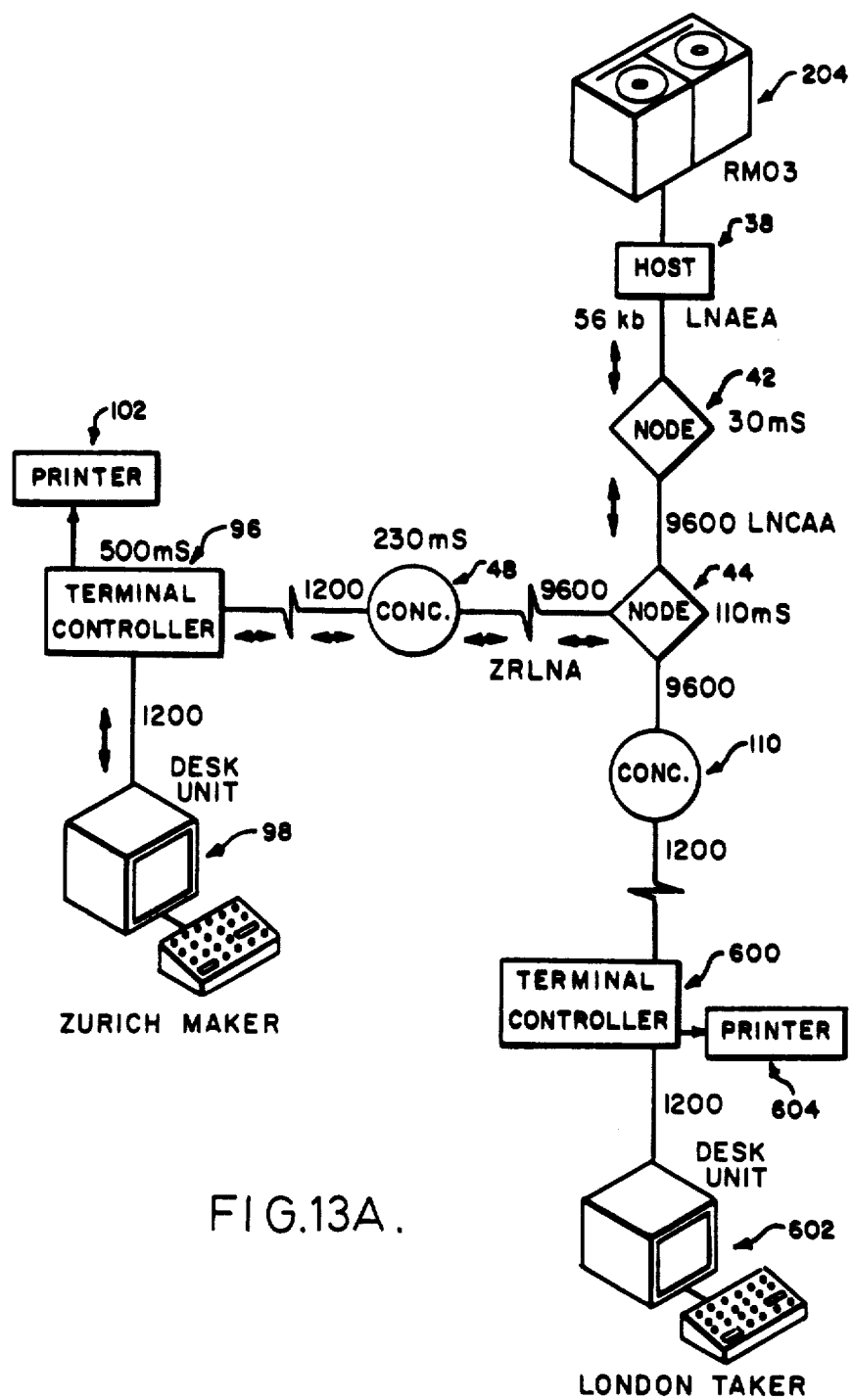
FIGS. 13A-13P, are diagrammatic illustrations of a typical conversational signal path in the system of FIG. 1 with FIGS. 13A-13F relating to setting up a call, FIGS. 13G-13I relating to ending a call, and with FIGS. 13J-13P relating to leaving a message.
Figure 13B:
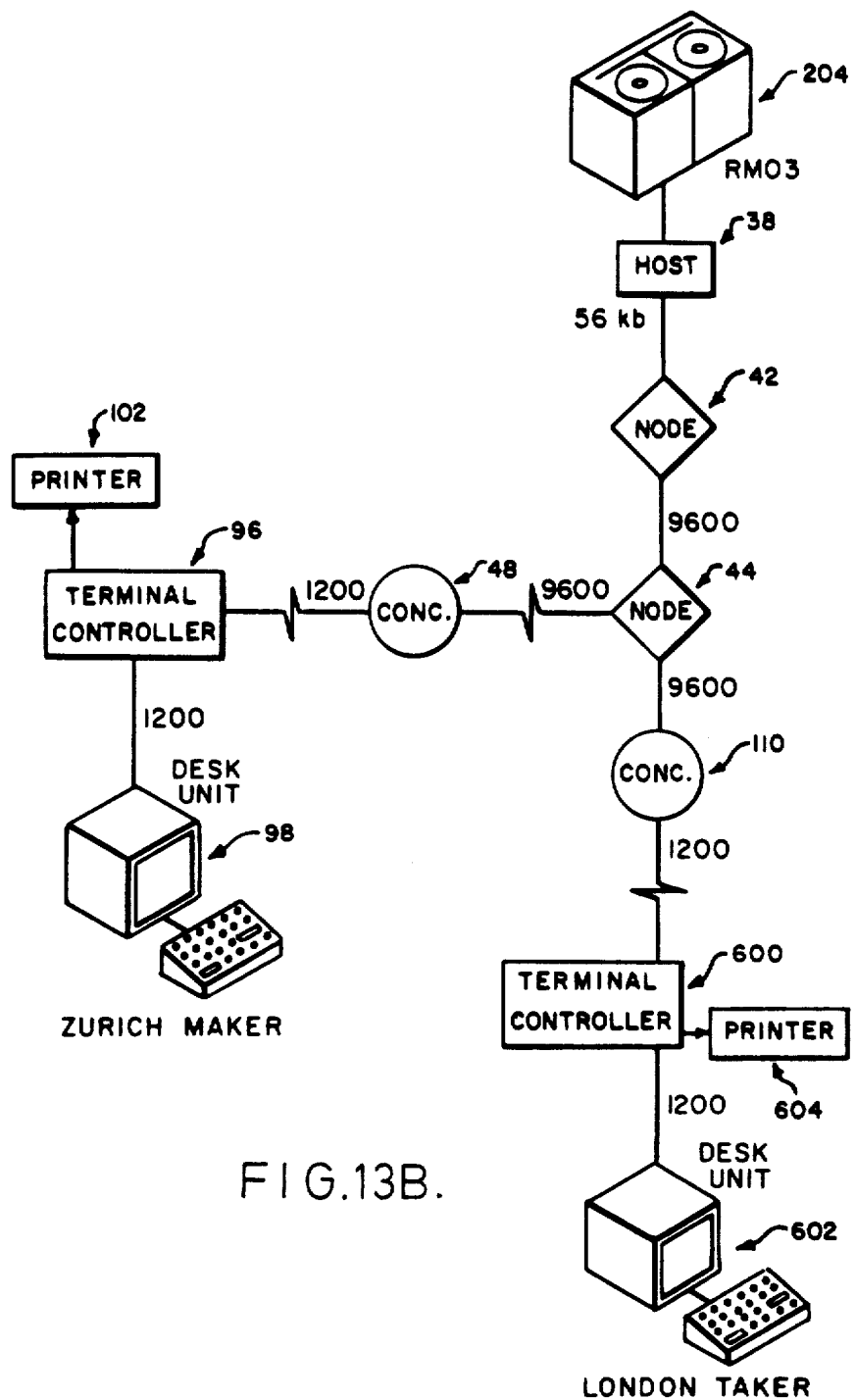
Figure 13C:
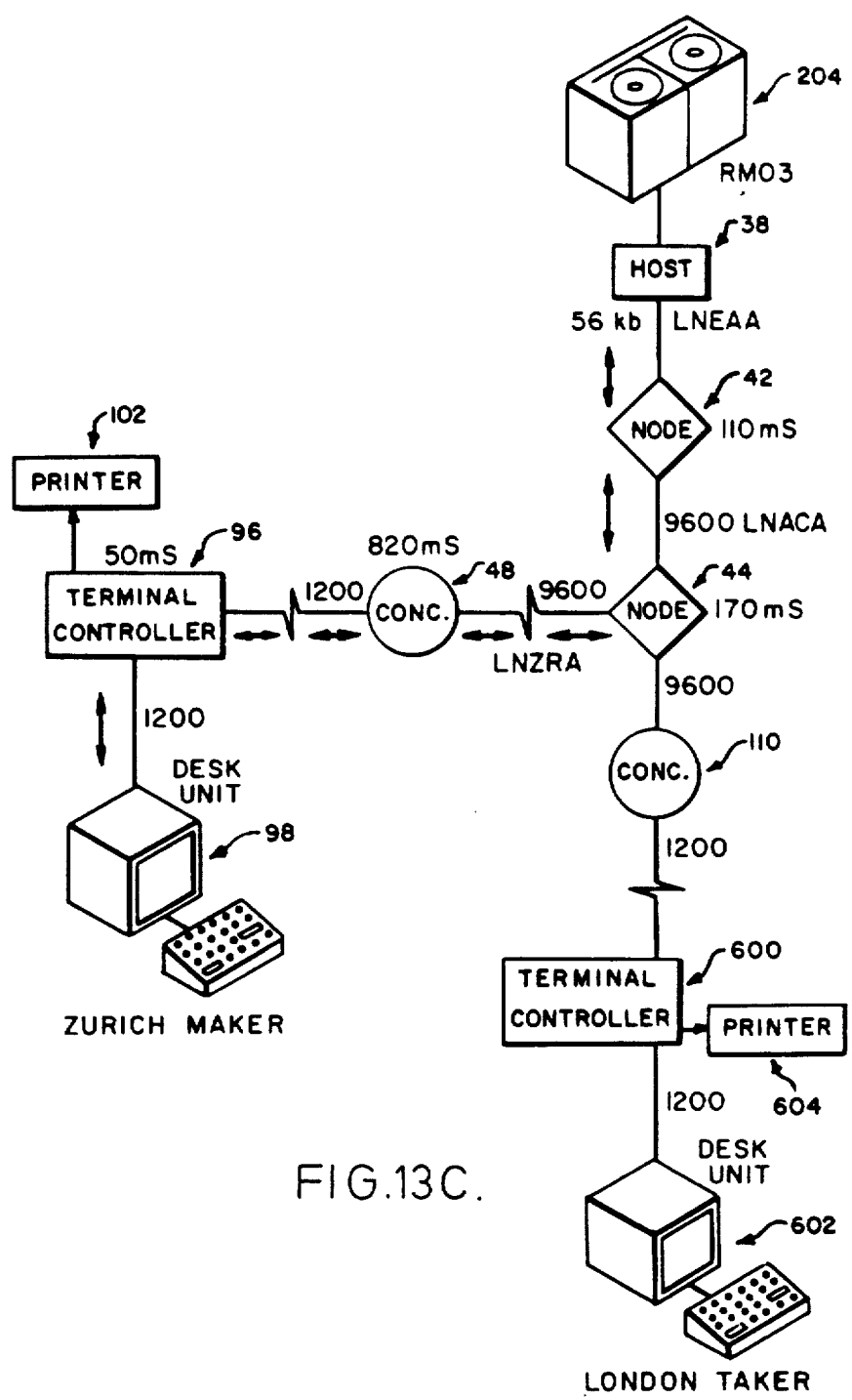
Figure 13D:
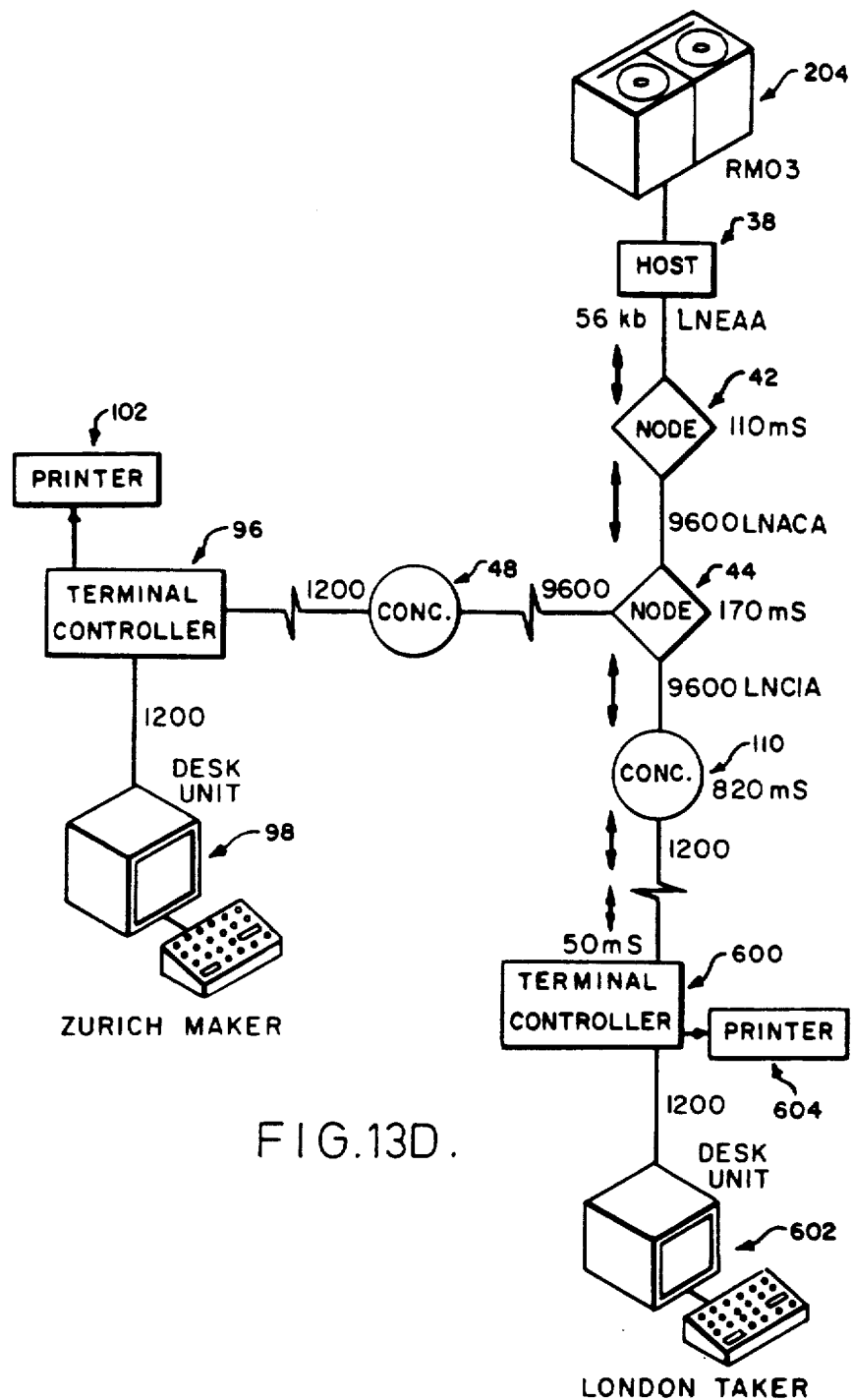
Figure 13E:
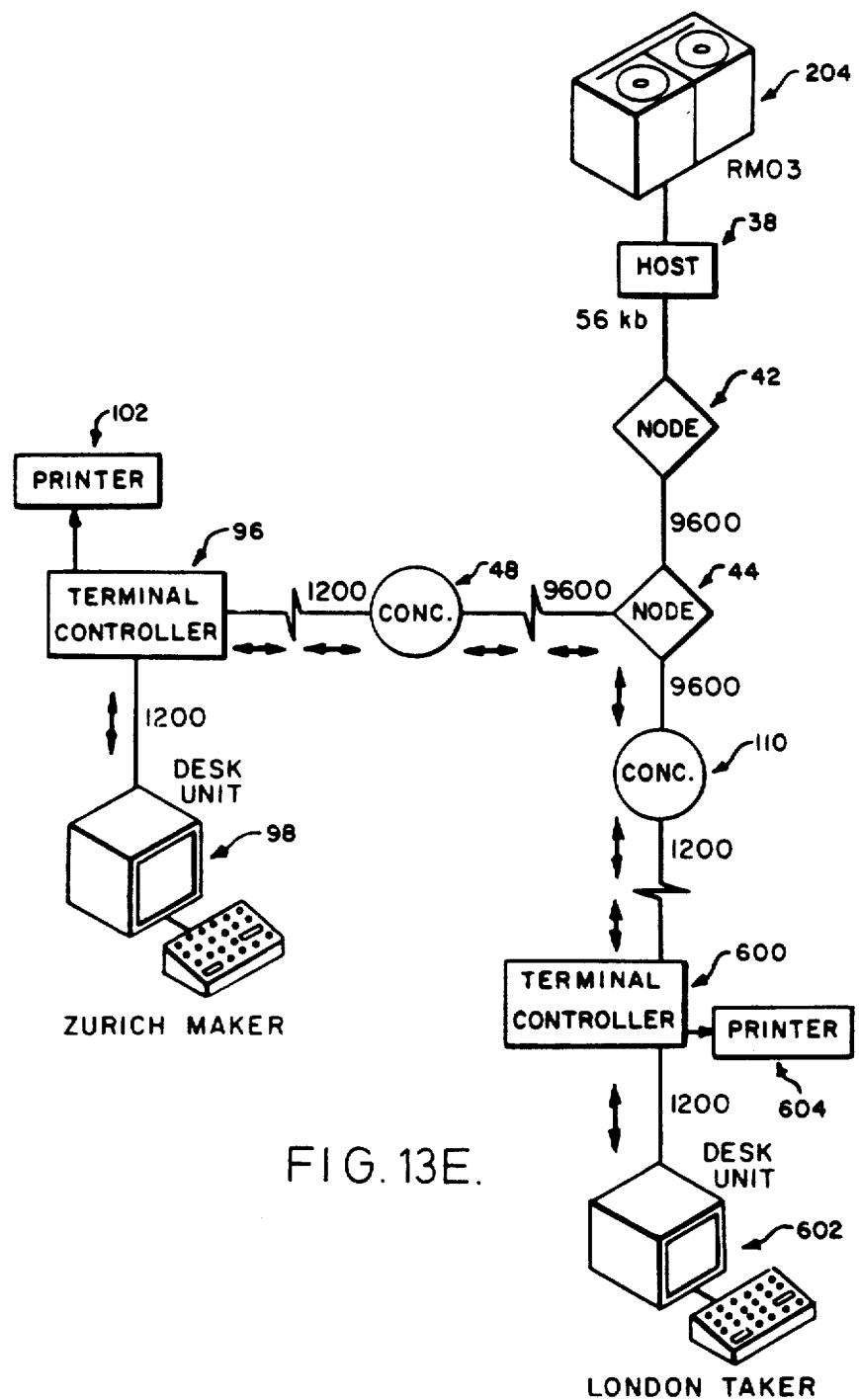
Figure 13F:
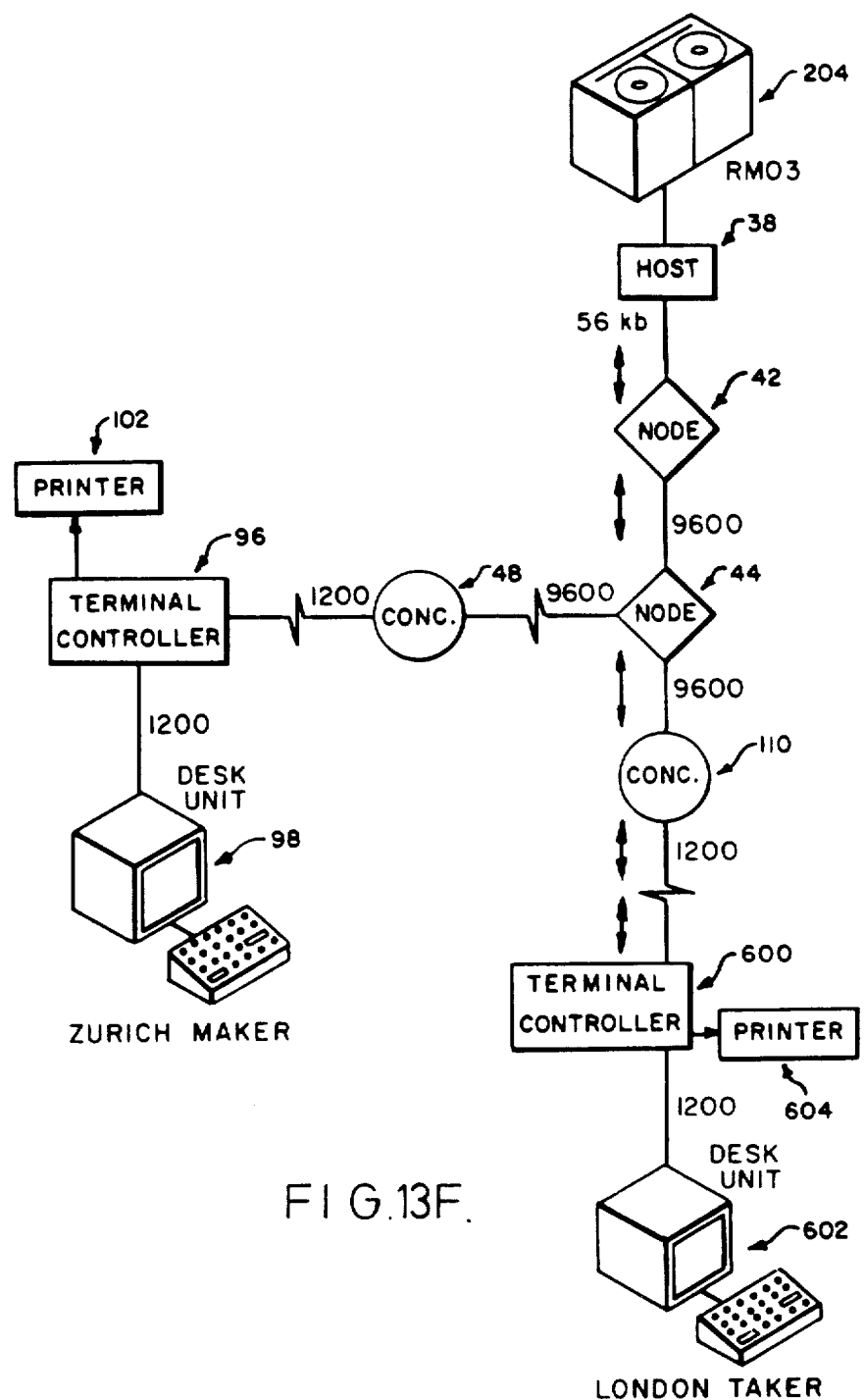
Figure 13G:
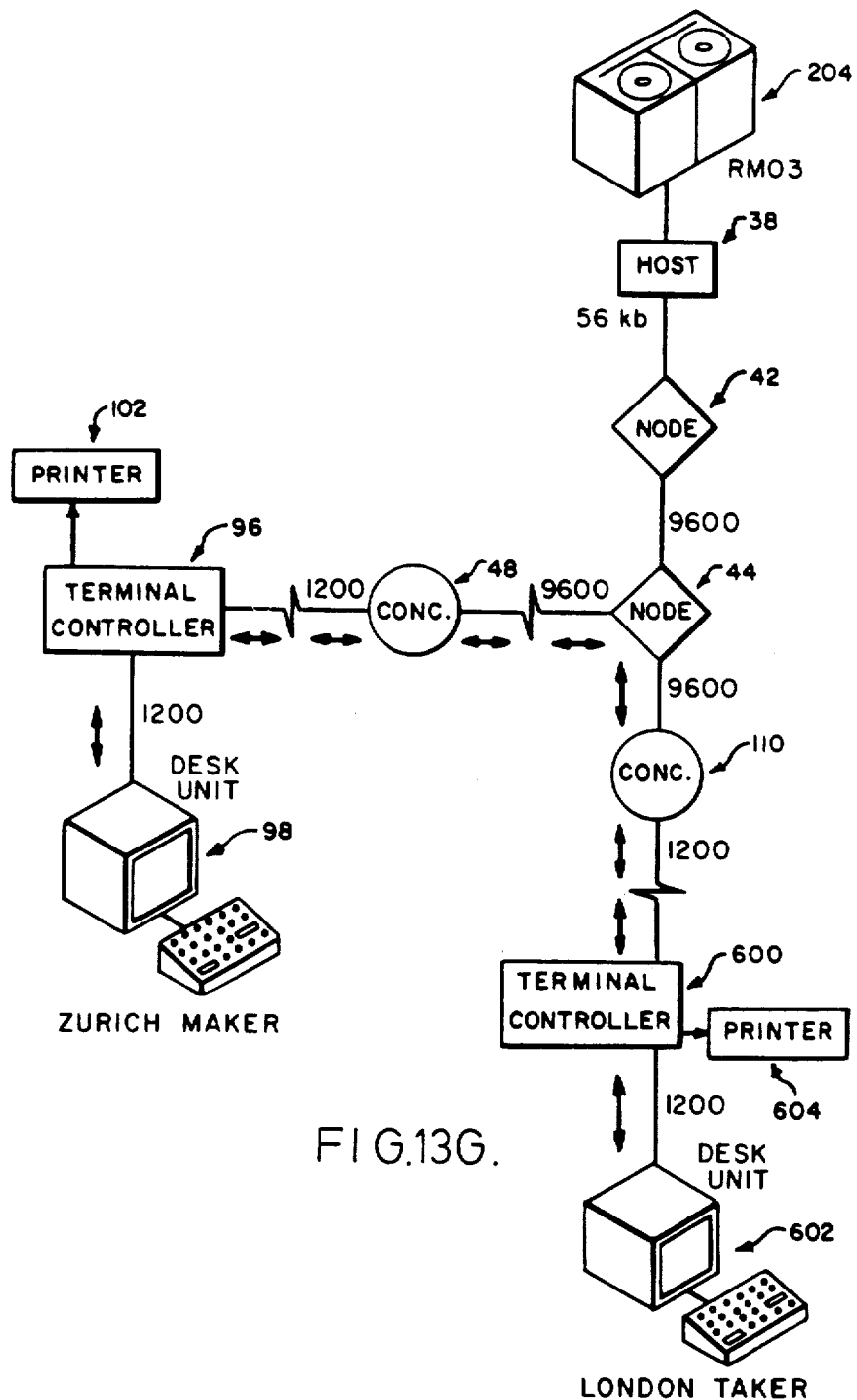
Figure 13H:
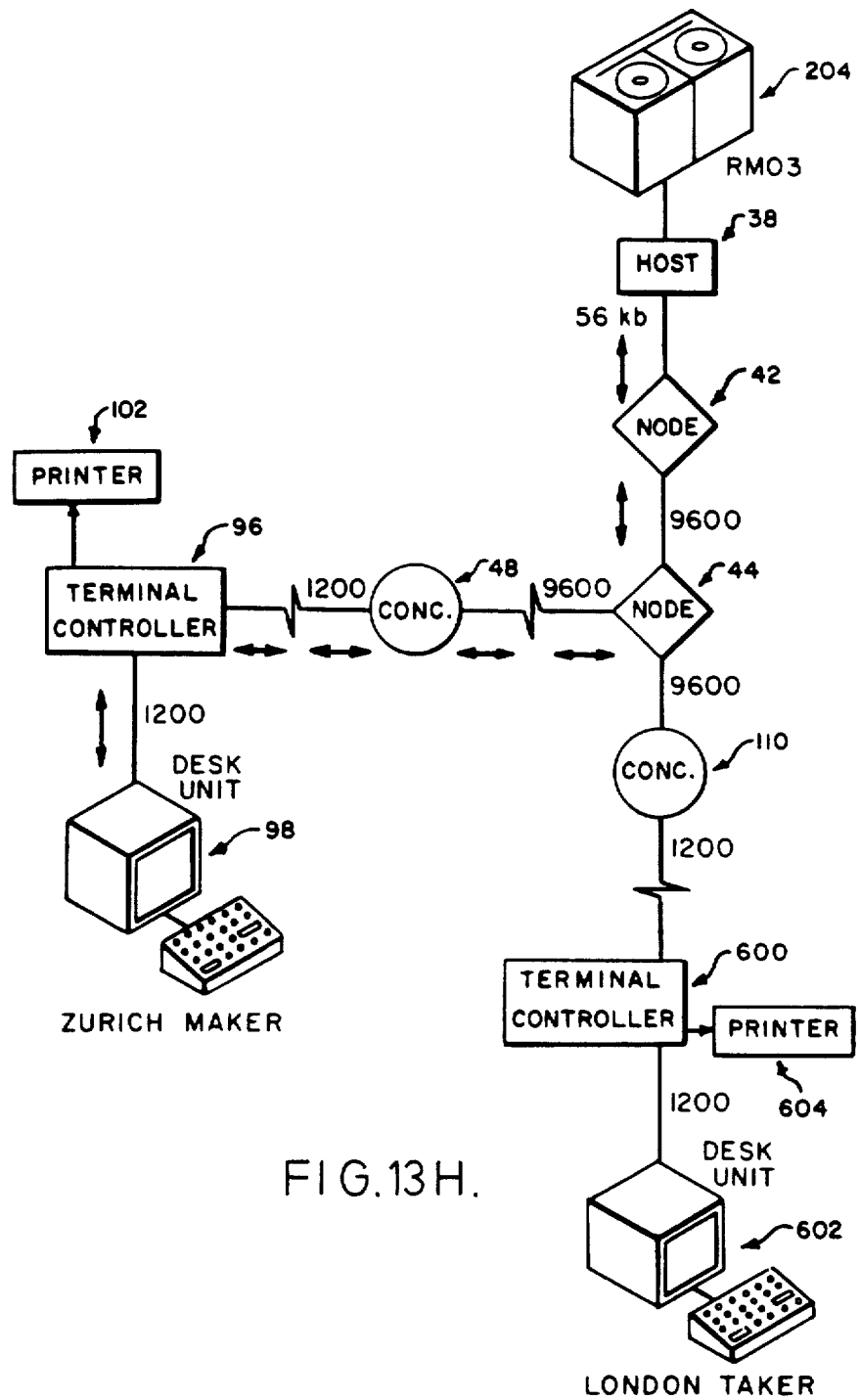
Figure 13I:
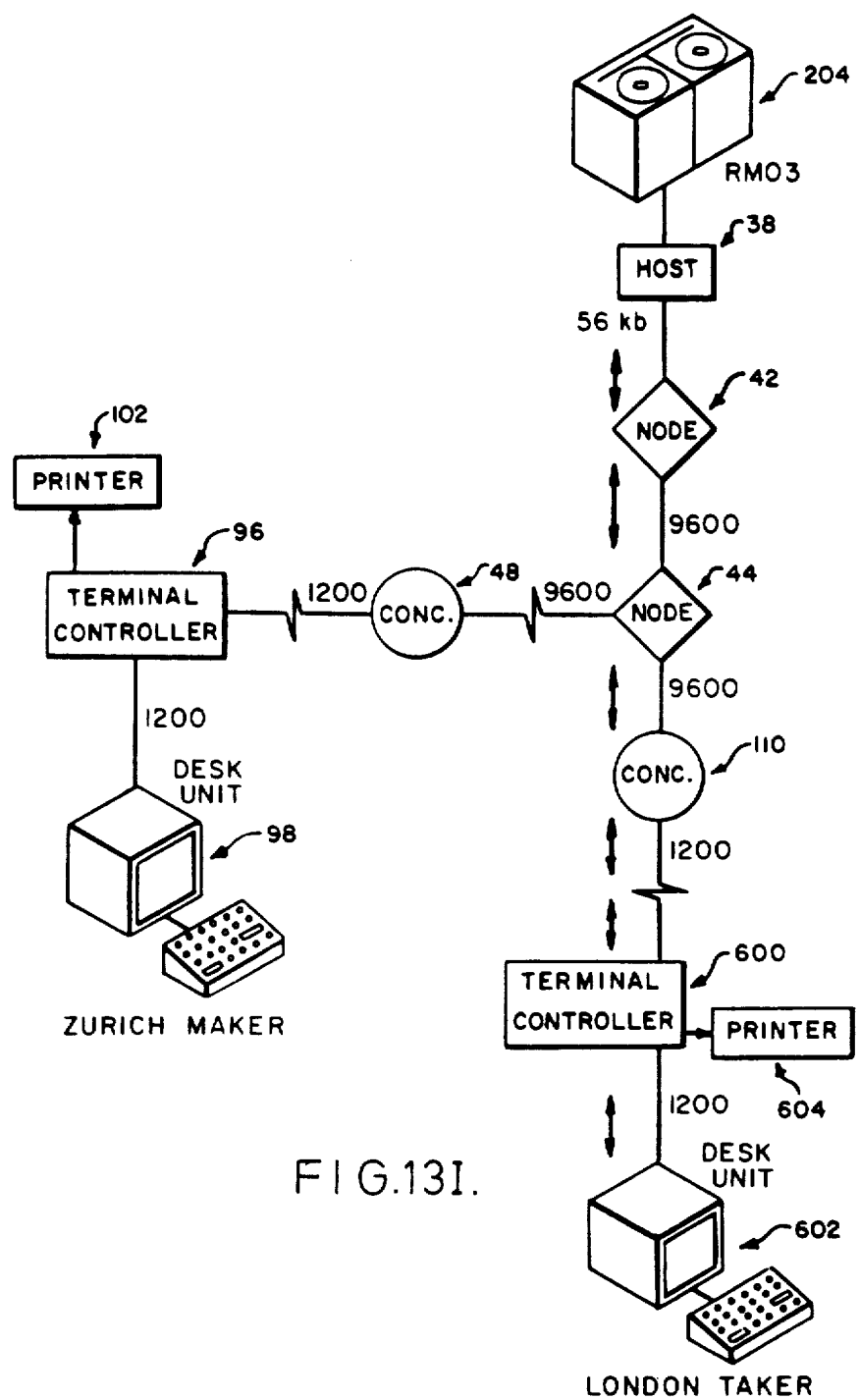
Figure 13J:
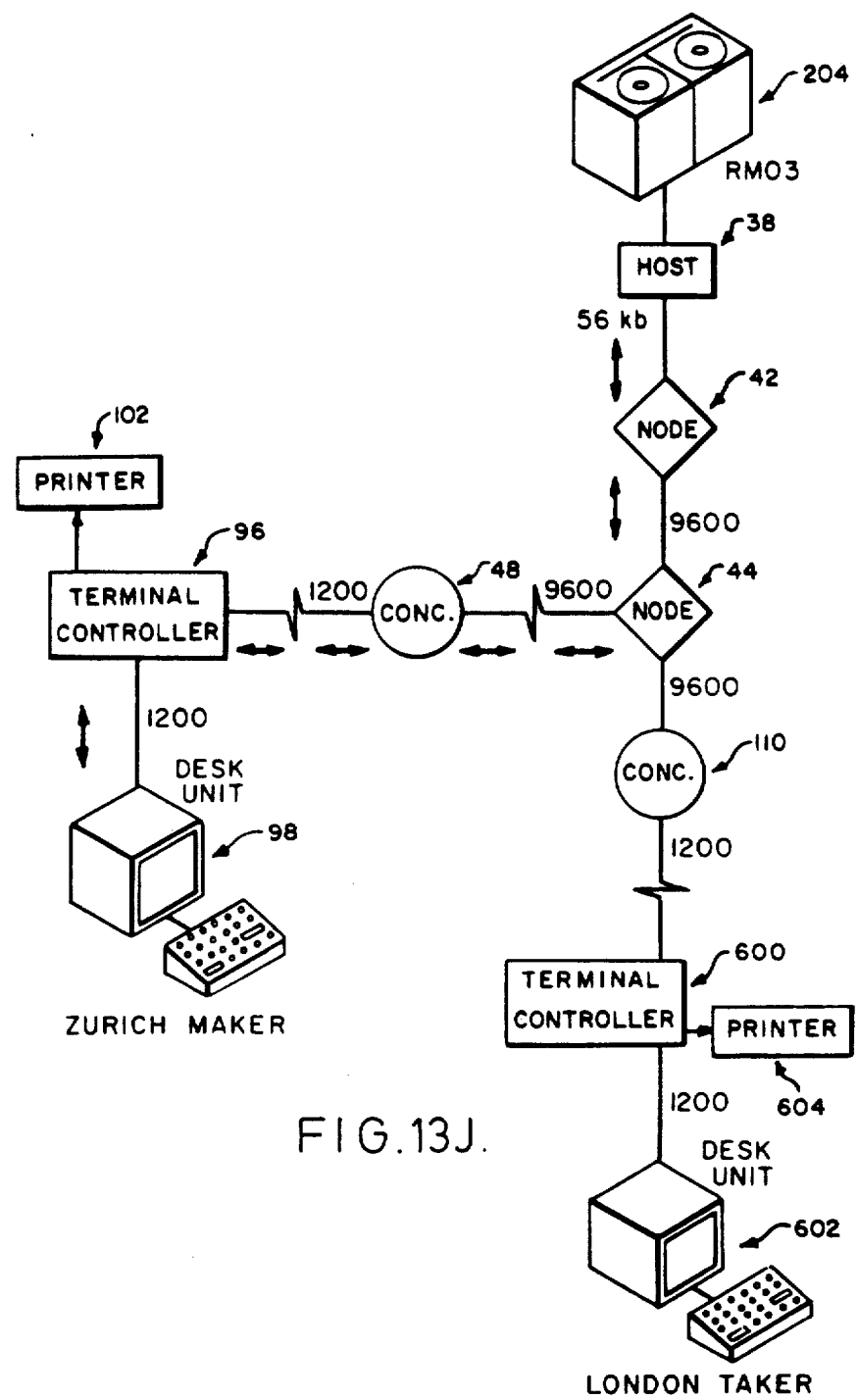
Figure 13K:
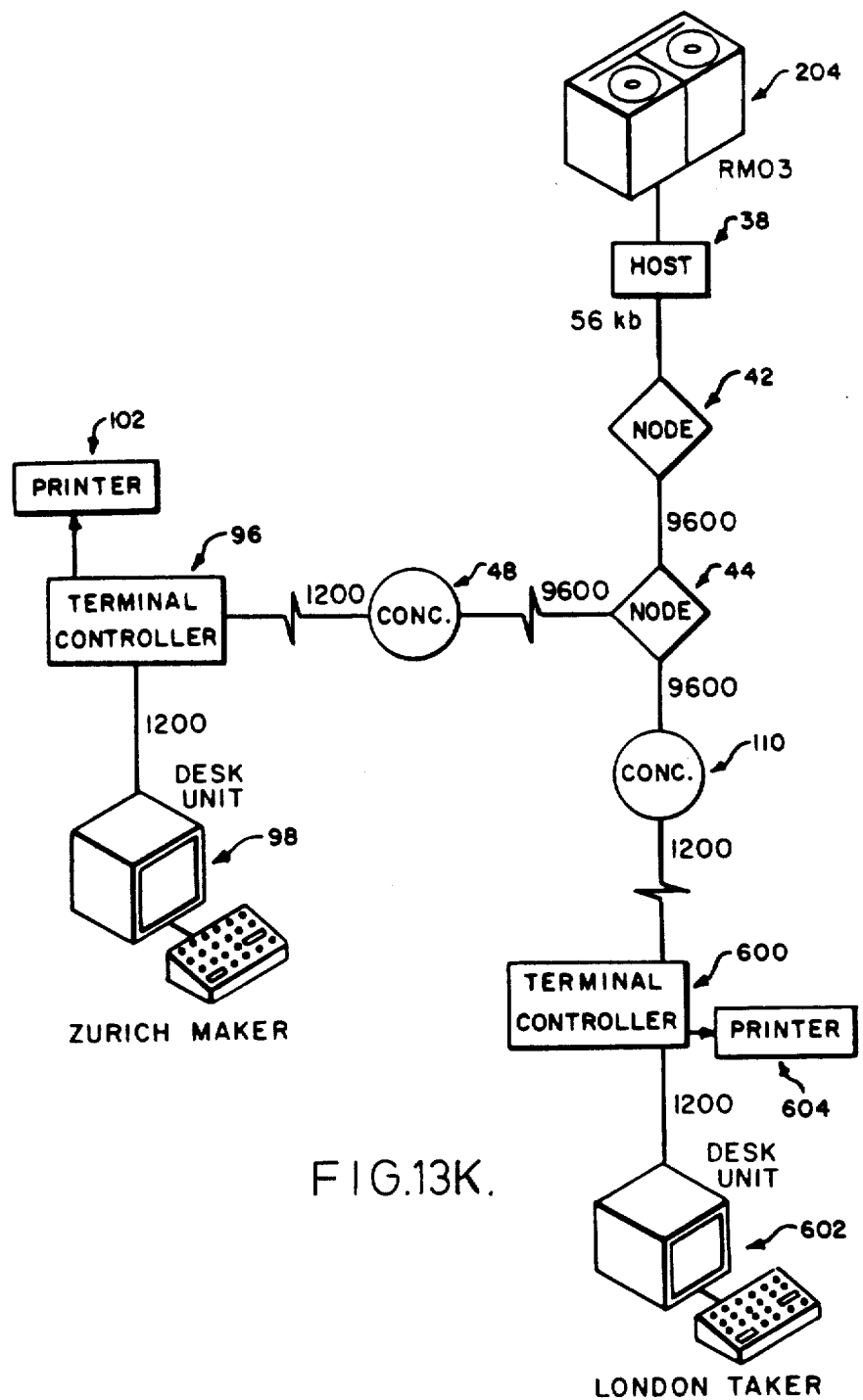
Figure 13L:
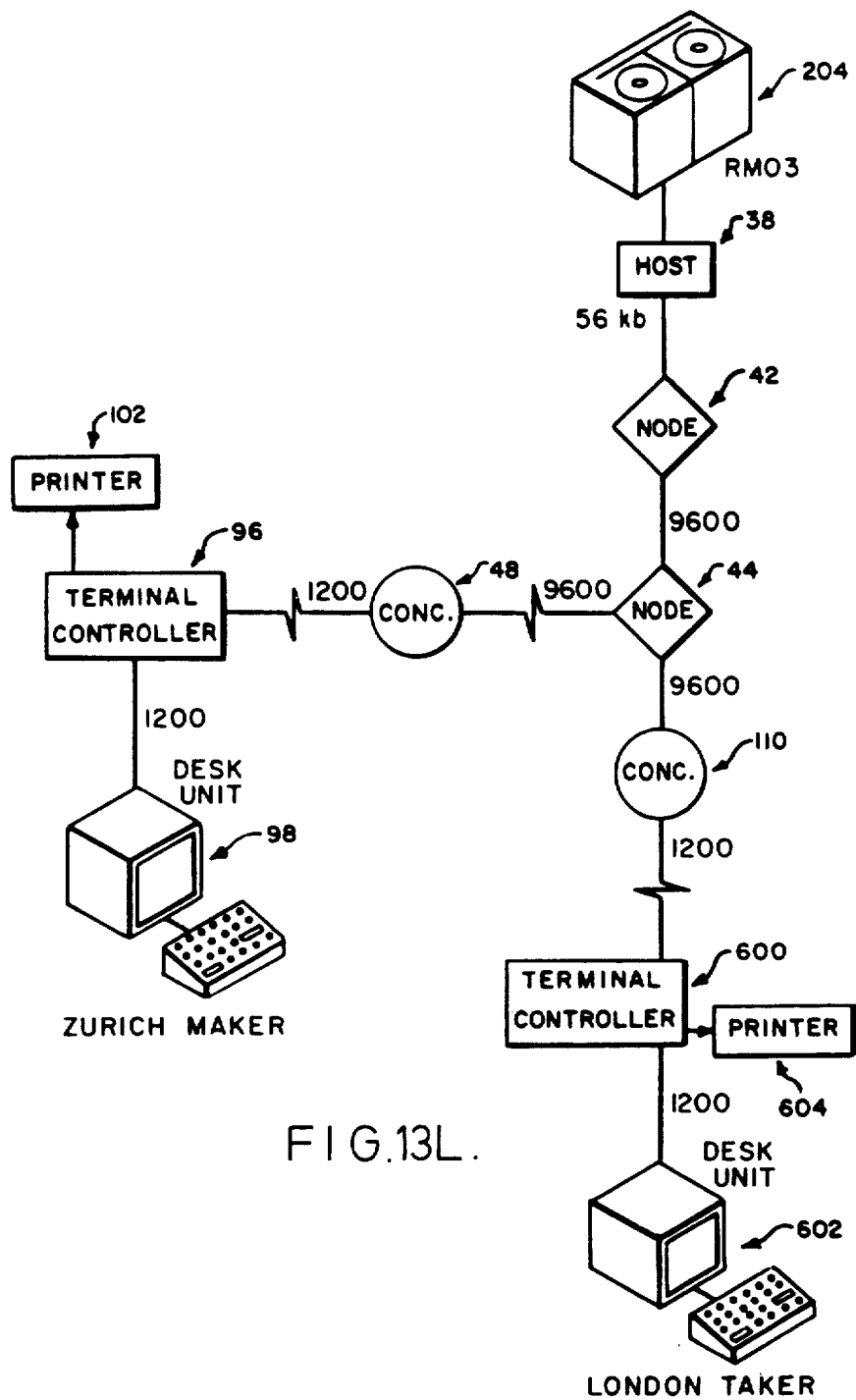
Figure 13M:
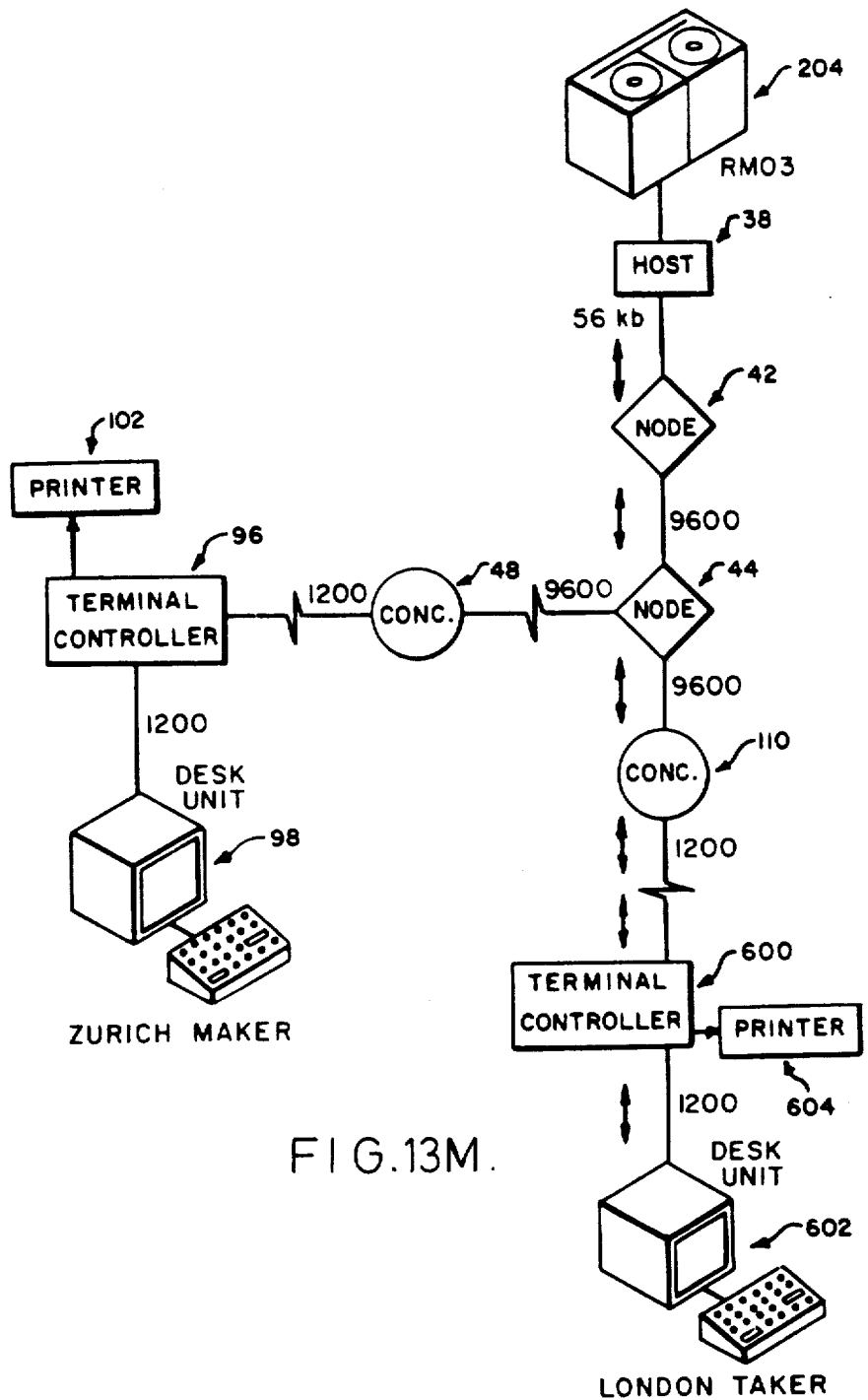
Figure 13N:
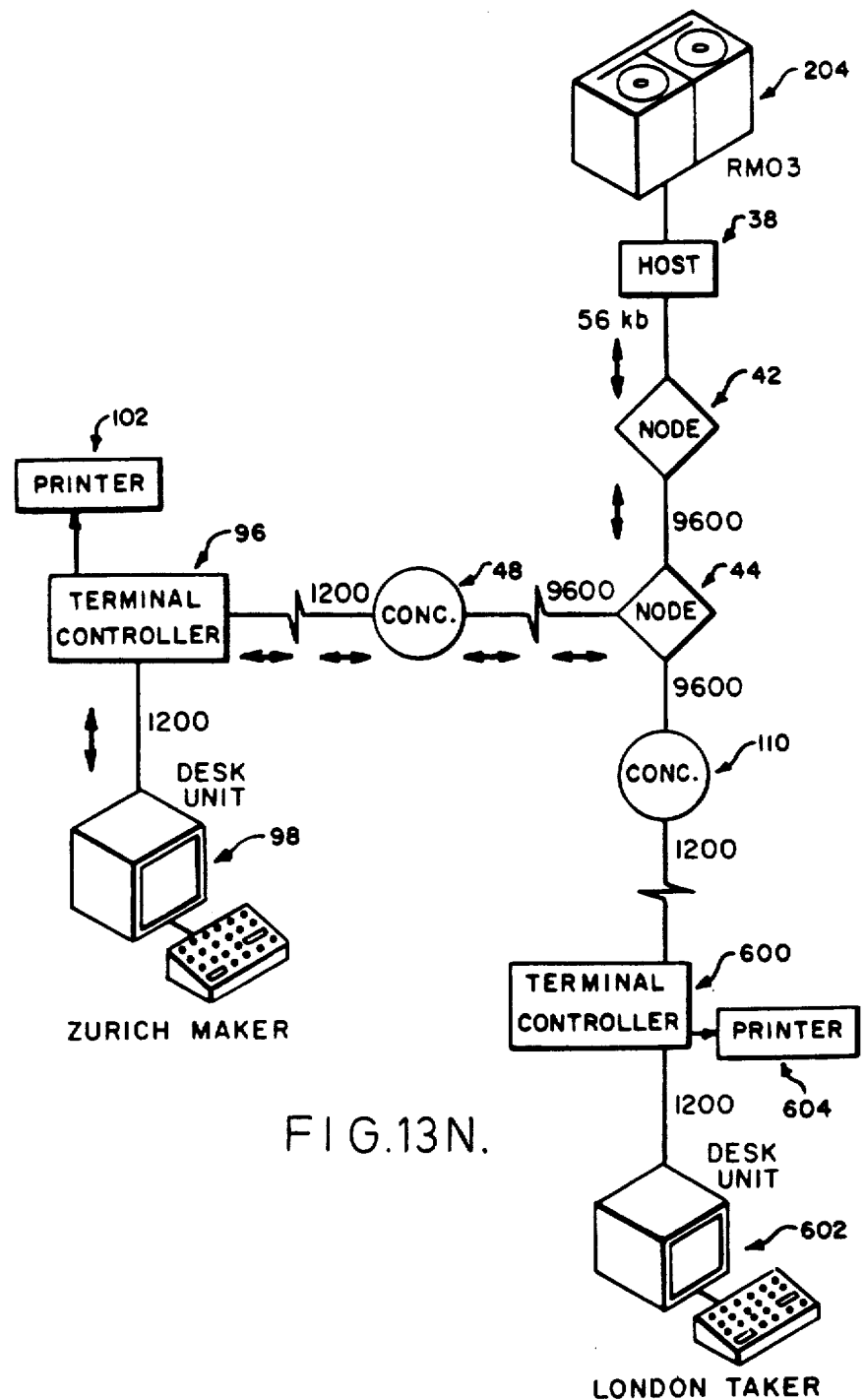
Figure 130:
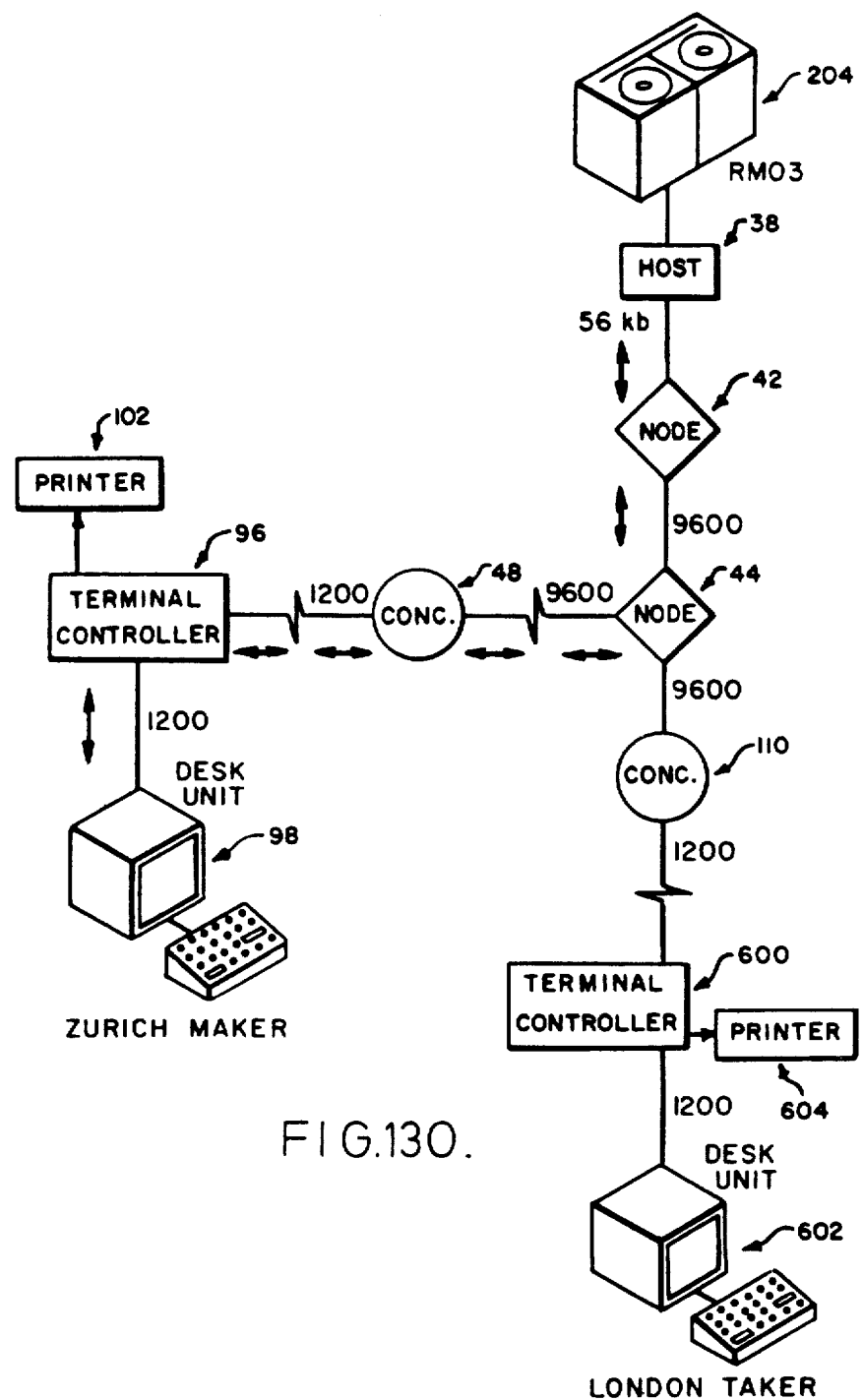
Figure 13P:
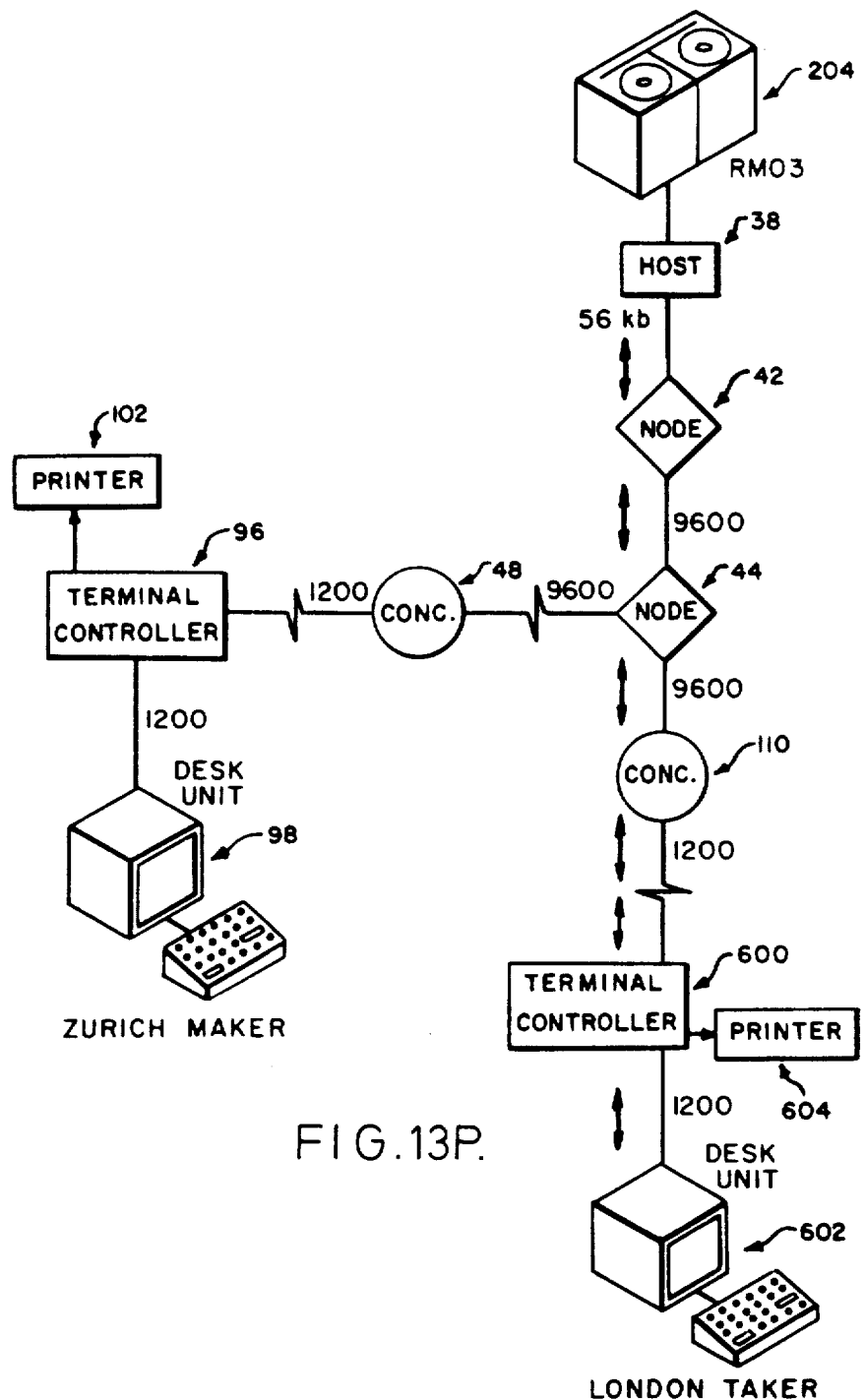

Referring now to FIGS. 13A through 13P, a typical conversational signal path for conducting a conversational video communication in the prior system is shown. FIGS. 13A through 13F relate to the setting up of a call including both the aforementioned CALL LIST and CALL INHIBIT functions of the prior system in which access to the SUBSCRIBER FILE 1000 of the host computer 38 is required. FIGS. 13G through 13I relate to the ending of a call, and FIGS. 13J through 13P relate to the leaving of a message which is the aforementioned left message. For purposes of FIGS. 13A through 13P, it shall be assumed that the transaction relates to money market dealing and that the calling party is located in Zurich at keystation 98 and is known as the Zurich maker and the called party is located in London at keystation 602 and is known as the London taker. In the prior system, when user 98 enters a contact request, as was previously mentioned, the message with the current insert line is transmitted to his terminal controller 96, therefrom to the concentrator computer 48, and therefrom through the computer nodes 44 and 42 to the host computer 38. The insert line is then interpreted and if the address is a single character it is preferably expanded, as was previously mentioned, by accessing the address abbreviations from storage. If the address constitutes a list of subscribers, then this list is preferably held in core (see FIG. 17) while the subscribers are contacted in turn to determine the first free subscriber in the list, termed CALL LIST or CONTACT LIST, which will be described in greater detail hereinafter with reference to FIGS. 14–18 and 20 for the prior system, and with respect to FIGS. 22–33 with respect to the improved system 30 of the present invention in which the terminal controller handles these functions. Contact is then established with the first free subscriber if the caller 98 is not inhibited; i.e. is not contained in the INHIBIT LIST of the called subscriber, as will be described in greater detail hereinafter with reference to FIGS. 14–17, 19 and 21 for the prior system, and with respect to FIGS. 34–43 with respect to the improved system 30 of the present invention in which the terminal controller also handles these functions. In the prior system, if the address references a CALL LIST, such as CONTACT LIST 12 or L 12 of FIG. 20, then the LIST is brought into core for appropriate action. Thus, in the aforementioned prior system, the host computer 38, which is also associated with the called party in the example of FIGS. 13A through 13P, checks to see if there is room in the called subscriber's queue, whether the called subscriber is a specific subscriber or the first free subscriber in a CALL LIST, and that the caller 98 is not inhibited. If the call can be queued, the terminal controller 96 is given an audit number for the call and the interest message which was input by the caller 98. When the terminal controller 96 receives this message it preferably clears the conversation area 502, assuming it is the first conversation, in the display 76 of the caller 98 to enable display of the conversational video communication and referably places the heading on the first line and the interest message, if any, on the second line. If the call can be queued in the prior system, then the host computer 38 sends details of the call to the connected terminal controller 600 for the called subscriber at which user 602 is located. This message preferably includes an audit number to reference the call and the time and date of the call. Upon receipt at terminal controller 600, the call is preferably given a reference letter and displayed in the incoming calls queue in the incoming calls area 500 of the display 76 of user 602. If user 602 accepts the call, the call is removed from the calls queue on controller 600 and the controller 600 asks its concentrator computer 110 for a connection to terminal controller 96. Terminal controller 96 then validates the acceptance of the call and replies to terminal controller 600. If the call can be established, this reply preferably includes the associated identification of user 98. When the call has been established or rejected, controller 68 sends a message to host computer 38 stating the call's audit number, whether it has been established or rejected, and the current number of free keystations associated with terminal controller 600. In response, host computer 38 sends a message to delete this call with this audit number from all terminal controllers associated with the subscriber at which terminal controller 600 is located. With respect to the aforementioned incoming calls area 500, this is maintained by the terminal controller 600, for example, which performs a number of functions on it including display of the last call on the last two lines, display of the number of calls, display of a flashing asterisk and sounding a buzzer to mark a new call, display of calls in order, removing accepted calls, display of a message indication such as *MORE* if not all calls can be displayed and the scrolling of the calls area, all of which are previously described.

Once the call has been established between the Zurich maker 98 and the London taker 602, conversational video text is sent in packets at prescribed intervals with each packet including a sequence number within the respective terminal controller 600 or 96 period of control. Packets are also preferably sent at intervals in each direction to confirm the link between users 98 and 602. If a text packet arrives out of sequence, the receiving controller 96 or 600 obtains control by preferably sending a communication failure message specifying the line and column of the last character correctly received with the conversation beyond this point being delayed and a suitable message being added, with the party whose controller 96 or 600 detected the error then being left in control to resume the conversation. If the communication is somehow broken, controller 96 or 600 treats this as an abnormal end of the conversation. When control is handed over at the end of a messge, the packet includes the line number in the conversation to ensure that the line numbers are synchronized. The conversational video text is preferably held in data buffers in each controller 96 and 600 and is used to support the display 76 as well as being queued for printing on printers 102 and 604, respectively, at the end of the call. It should be noted that because the display is a 64 character display, text beyond column 64 would not be displayed, although it could be printed. As was previously mentioned, the party receiving a line of conversational video text may interrupt its receipt before this line has been completed by the originator. This interrupt function can preferably only be actioned from the keyboard 72 of the party receiving the line of text. As previously mentioned, the depression of the interrupt key on this keyboard sends an interrupt message to the party originating the line of text, specifying the line number in the call, and the last character in the line received. The user who has initiated this interrupt message then rejects any further input for the call and awaits a response to its request which response causes a message *INTERRUPT* to be displayed on the next line and gives the interrupting party control over the conversation. Assuming that user 602 has initiated an interrupt message, then controller 96 which receives this interrupt will remove any text in its conversation after the point specified, will add the aforementioned interrupt message indicator on a new line, and will reply to terminal controller 600 accepting the interrupt.

Referring now to FIGS. 13G through 13I, the sequence of ending a call shall now be described. Assuming that user 98 now wishes to end the call, and is in control of the conversational video communication, the user 98 depresses the END CONTACT key on his keyboard 72, thus sending an end contact message via terminal controller 96 to terminal controller 600. If, in the above example, user 602 has not just interrupted the conversation, then this end contact message is accepted, an indication message such as the word *END* is added to the display of user 602 in the conversation area being employed, 502 or 504, and a reply is sent via the concentrator computers 110 and 48, ending the logical link between users 98 and 602. If, however, the user 98 is not in control at the time he wishes to end the call, pressing the end contact key will cause an interrupt, followed in the same message by a request to end the call. When the end of call has been acknowledged, the controller associated with the party who has initiated the end of call message, reports to the host computer 38, giving direction as to the number of associated keystations now free and, if desired, additional call statistics. The other party to the conversation retains the call text on his display 76 until he also presses the end contact key, whereupon his associated terminal controller reports the same type of information to the host computer 38. It should be noted that preferably each controller, 96 and 600 preferably queues the text of the call for printing to printers 102 and 604, respectively, as soon as the end contact message has been actioned at that particular controller 96 or 600.

Referring now to FIGS. 13J and 13P, the sequence for leaving a message, if an attempt has been made to set up a call and the called party is busy or off the system, is illustrated. In addition, as previously mentioned, a message may also be left if a call has been queued and has not been accepted. When the message has been inserted on the user insert line of the calling party and the TRANSMIT key on his keyboard is depressed, a left message message could be sent to the host computer 38 and thereafter any acceptance of the call will be refused. Host computer 38 reads the left messsage data block for the subscriber and, if there are less than a predetermined number of left messages held, such as 20, or if one of the previous left messages can be deleted, it places the new left message in storage 204. This left message is then sent to the appropriate terminal controller, such as terminal controller 600, for printing at printer 604 and will include the total number of left messages for the subscriber at which terminal controller 600 is located, with this number being flashed on all screens associated with that subscriber. A reply is then sent to the originating user 98 for display as well as being printed on printer 102 associated with terminal controller 96. The display area can then be cleared by pressing the END CONTACT key which causes the printing of the message on printer 102 and the clearing of the display of user 98.

Referring now to FIGS. 13A and 13C, and particularly to FIGS. 14A through 14C, 15A through 15B, and 16 through 21, the previously mentioned CALL or CONTACT LIST function and INHIBIT LIST function of the aforementioned prior conversational video system in which access to the SUBSCRIBER FILE 1000 of the host computer 38 is required in connection with each contact request shall now be described in greater detail. As previously mentioned, FIGS. 13A-13F relate to the setting up of a call, by way of example, between a Zurich maker and a London taker. In this regard, FIG. 13A, as will be explained in greater detail hereinafter with reference to FIGS. 14-18 and 20, illustrates the initiation of a CONTACT REQUEST or call, where, as previously stated, if the ADDRESS is a single character it is expanded by accessing the ADDRESS abbreviations from disk, while if the ADDRESS constitutes a list of subscribers in accordance with the CALL LIST or CONTACT LIST function in the prior system, it causes the list to be held in core while the subscribers are contacted in turn so as to establish conversational contact with the first free subscriber in the CALL LIST. For purposes of explaining this CONTACT LIST function, it is assumed that the London taker 602 has its corresponding keystation identification code contained in a CONTACT LIST which had been created by the Zurich maker 98 and that the London taker 602 is the first free subscriber in that CONTACT LIST. As will also be explained hereinafter, the Zurich maker 98, could have created a CONTACT LIST from his keyboard at any time prior to the initiation of the call to the London taker 602. In the following example, it is also assumed that the London taker 602 has not created an INHIBIT LIST containing the keystation identification code of the Zurich maker 98 which, as will be explained in greater detail hereinafter with reference to FIGS. 14 through 17, 19 and 21 for the prior system, would cause caller 98 to be inhibited and would prevent or inhibit the completion of the call to the London taker 602 by the Zurich maker 98. FIG. 13C illustrates the checking, in the prior system, by the host computer 38 to see if calls from the Zurich maker 98 have been inhibited by the London taker 602 as well as the checking to see if there is room in the subscriber's queue of the London taker 602, with the result of this investigation, as previously mentioned, being sent back to the terminal controller 96 associated with the Zurich maker 98. Thus, as previously mentioned, if the call can be queued, the terminal controller 96 will be given an audit number for the call and any interest message, which, when the controller 96 receives this message, will cause the area for the display of the call to be cleared and will place the heading on the first line.

Figure 14A:
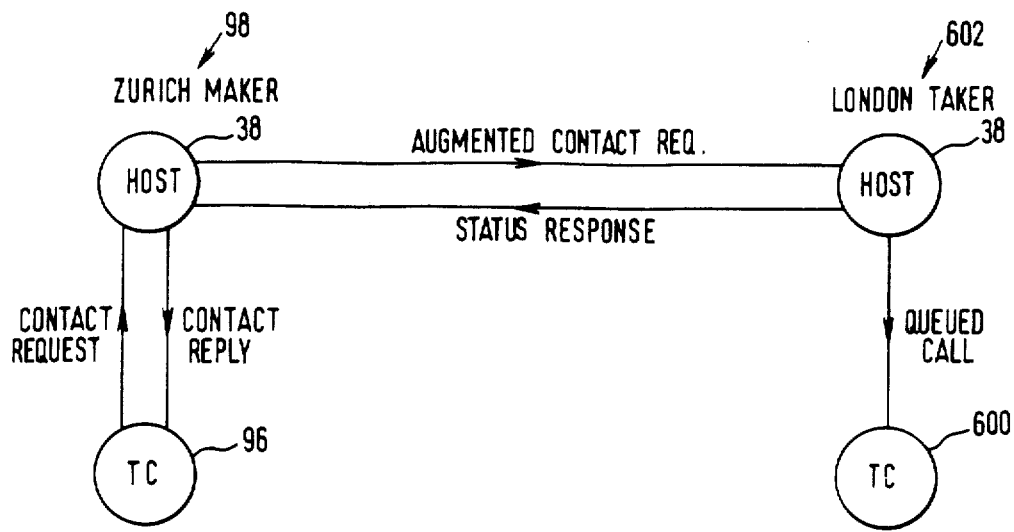
FIGS. 14A-14C are diagrammatic illustrations of the exchange of data records in the system of FIG. 1 during a typical conversation.
Figure 14B:
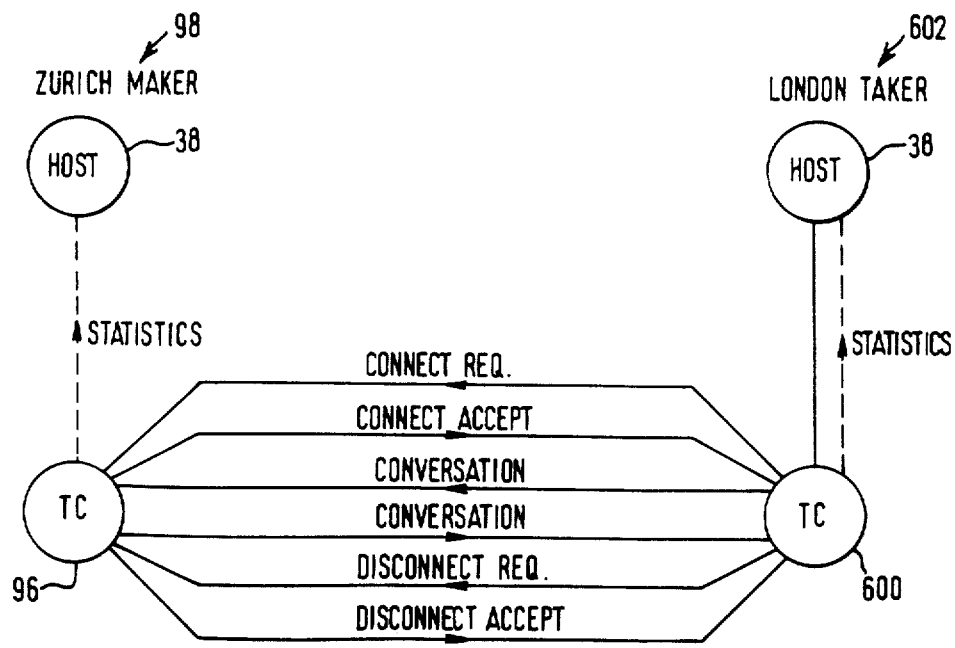
Figure 14C:
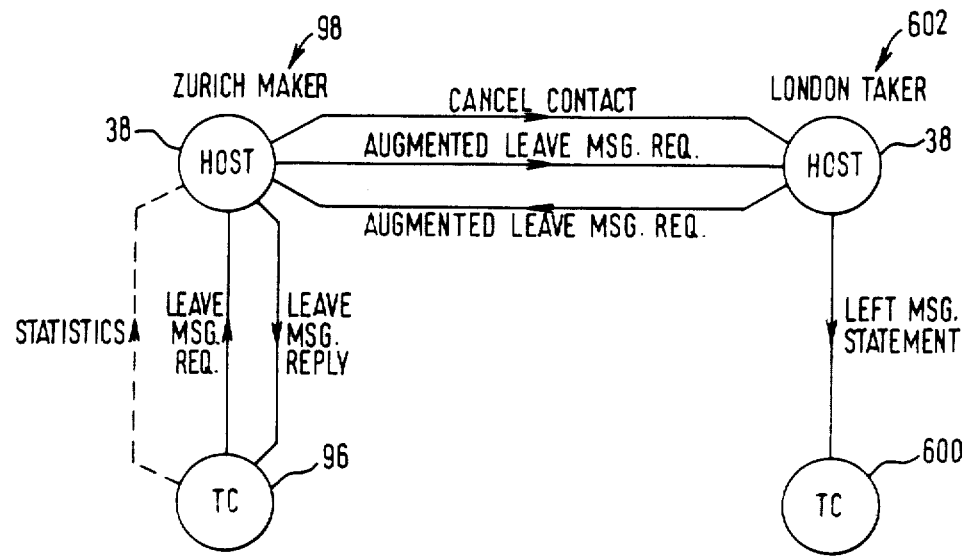

As was previously discussed with respect to the setting up of a conversation, a conversation starts when one subscriber, the Zurich maker 98 in the above example, requests a contact with another subscriber, the London taker 602 by way of example, by an entry at his desk unit via his keyboard. In the prior system, this causes the maker's terminal controller 96 to send a CONTACT REQUEST to the host computer 38 supporting the maker 98 in the above example. The CONTACT REQUEST, as mentioned above, may contain either the mnemonic of the taker 602, a one character abbreviation of the mnemonic or a CONTACT LIST identifier such as L12 indicating CONTACT LIST 12 which is illustrated in FIG. 20. If the request contains an abbreviation, then the ADDRESS ABBREVIATION PAGE in the SUBSCRIBER FILE 1000 (FIG. 17) of the maker 98 is examined and the mnemonic of the taker 602 obtained. If, instead, the request contains a CONTACT LIST identifier, then the CONTACT LIST of the maker 98 in the prior system is located on the SUBSCRIBER FILE 1000 and processing continues with the first subscriber on the CONTACT LIST. In this regard, the host computer 38 in the prior system examines its table of conversations subscribers, known as the SUBSCRIBER TABLE 1002, and obtains the ADDRESS on the network 30 of the host computer 38 which is currently supporting the taker 602. In the example of FIGS. 13A through 13P it is assumed that the same host computer 38 and the same node 44 supports the maker 98 and the taker 602. The host computer 38 then passes what is termed an Augmented CONTACT REQUEST to the host computer 38 associated with the taker 602, which in this instance is the same host computer and, therefore, merely involve a signal transfer within the host computer 38, which examines the status of the taker 602 and, if the taker 602 is not busy, that is if the queue of taker 602 is not full, sends a QUEUED CALL RECORD to the terminal controller 600 associated with the taker 602. If, however, the taker 602 is busy, that is not free, or if the maker 98 is on the inhibited subscriber list OR INHIBIT LIST of the taker 602 which, in the prior system, is stored in the SUBSCRIBER FILE 1000, then the contact is rejected, that is the call is inhibited. In this regard, if the CONTACT REQUESTS originated from a CONTACT LIST of the maker 98, then the taker 602 must be free. As will be explained hereinafter, if the taker 602 is not free, then, in the prior system, the host computer 38 will continue to sequentially proceed through the CONTACT LIST in the same manner until a free taker is located, in which instance contact will be completed with the first free taker. Preferably, a STATUS RESPONSE RECORD is sent back to the maker's 98 host computer 38 indicating the sucess or otherwise of the initiated CONTACT REQUEST. If the original request is not from a CONTACT LIST, the host computer 38 of the maker 98 informs the maker's terminal controller 96 of the result of the CONTACT REQUEST by passing a CONTACT REPLY to the controller 96. The exchange of records in the aforementioned prior system, assuming the taker 602 was not busy, up to this point, is illustrated by way of example in FIG. 14A. If, however, in the prior system, the original request by the maker 98 was from a CONTACT LIST previously created by the maker 98, then if the STATUS RESPONSE received by the host computer 38 associated with the maker 98 indicates an unsuccessful request, then the next subscriber on the CONTACT LIST will be selected until the CONTACT LIST is exhausted and a CONTACT REPLY is sent to the originating terminal controller 96. When the taker 602 accepts the contact, his controller 600 sends a CALL ACCEPTED RECORD to the host computer 38 associated with his controller 600. The taker's controller 600 then connects to the maker's controller 96 and the textual data video conversation takes place. When the conversation ends, the controller owned by the subscriber who ends the conversation, either controller 96 or 600 in the above example, requests a disconnection from the other controller. If STATISTICS RECORDS are being kept, then, after the disconnection has been accepted, each controller would send a STATISTICS RECORD to its associated host computer 38, such as shown in dotted lines in FIG. 14B. By way of example, the above exchange of records in the aforementioned prior system from acceptance of the contact to the point of disconnection is illustrated in FIG. 14B. Of course, as previously mentioned, prior to the call being accepted, the maker 98 may decide to cancel the CONTACT REQUEST and optionally leave a message with the taker 602. If the maker 98 decides to do this, his controller 96 would send a LEAVE MESSAGE RECORD to the supporting host computer 38 associated with the taker 602 and, if desired, a STATISTICS RECORD. The host computer 38 associated with the maker 98 will then preferably send a CANCEL CONTACT RECORD and an AUGMENTED LEAVE MESSAGE REQUEST to the taker's host computer 38. It will also preferably write the message to the taker's LEFT MESSAGE PAGE in the SUBSCRIBER FILE 1000, send a left message statement to the taker's controller 600 and an AUGMENTED LEAVE MESSAGE REPLY to the maker's associated host computer 38 which will then send a LEAVE MESSAGE REPLY to the maker's originating controller 96. This exchange of records is illustrated in FIG. 14C.

As was previously mentioned, subscribers in the aforementioned prior system are preferably allocated an area of the SUBSCRIBER FILE 1000 in each of the host computers 38 where they may be supported. In this area they may set up pages of information which they can have displayed on their desk unit and which they may amend from their keyboard. The pages stored may contain, by way of example, up to 100 subscribers from whom the page owner wishes to inhibit contact requests in what is termed an INHIBIT LIST, up to 26 abbreviations each related to a SUBSCRIBER MNEMONIC or ADDRESS, up to 1000 characters of text abbreviations which are used during a conversation and are, therefore, expanded into text by the associated terminal controller, up to 14 message pages which a subscriber may make available for viewing to other subscribers on an associated CONTACT LIST in what may be referred to as a CONTACT LIST PAGE, 14 CONTACT LISTS, each CONTACT LIST containing up to 20 SUBSCRIBER MNEMONICS, with these CONTACT LISTS being associated with a contact list message page as well as being usable to request contacts to the first free subscriber on the CONTACT LIST as mentioned above, and up to 20 Left Messages. It should be noted that the above parameters are merely given by way of example.

Figure 15A:
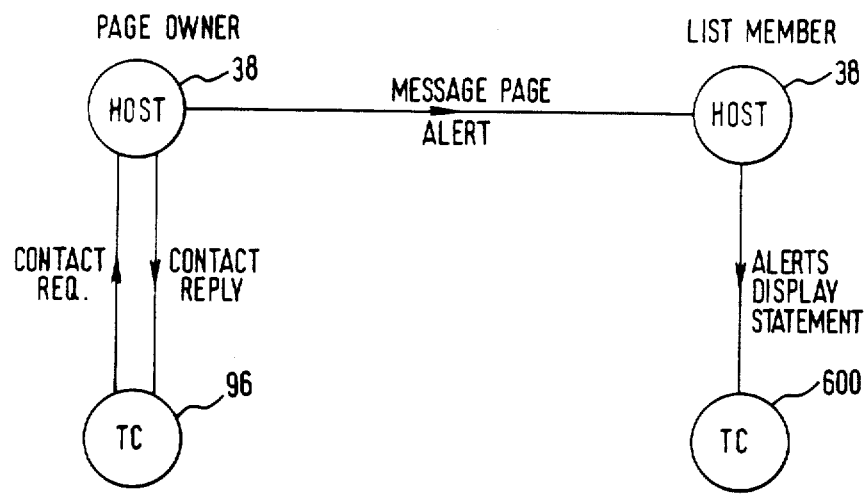
FIGS. 15A-15B are diagrammatic illustrations of the exchange of data records in the system of FIG. 1 during the provision of a subscriber page to subscribers on the CALL LIST.
Figure 15B:
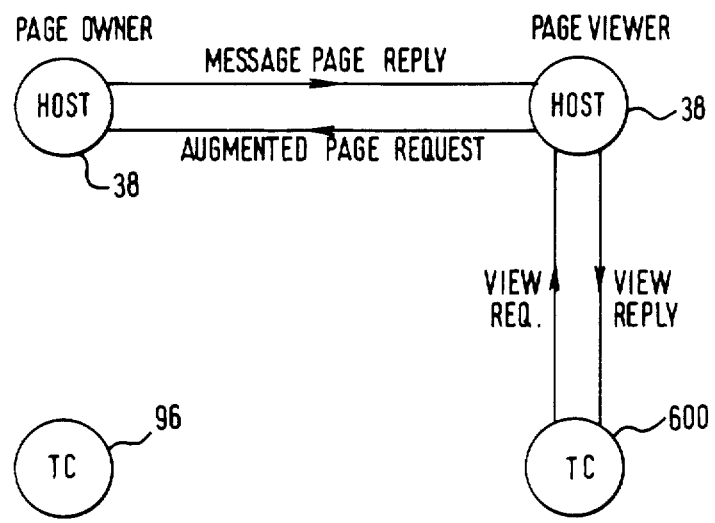

The owning subscriber keystation, that is the one which created the aforementioned lists, messages or pages, can view any of these pages and can preferably insert entries to these pages and cancel entries in all pages as well as, of course, being able to cancel entire pages. As will be described in greater detail hereinafter with reference to FIGS. 22-43, this view function is employed in the improved system 30 of the present invention to set-up local INHIBIT LIST and CONTACT LIST tables at the originating subscribers terminal controller. In this regard, when an amendment to the TEXT ABBREVIATIONS PAGE has been completed, this amended page would be sent to the page owner's terminal controller, 96 for example, since expansion of the abbreviation during a conversation takes place in the terminal controller. As was previously mentioned with reference to the prior system, an originating subscriber can send a CONTACT LIST PAGE or SUBSCRIBER PAGE simultaneously to all subscribers on a given CONTACT LIST. This may be accomplished by sending a CONTACT LIST PAGE calling signal or CONTACT REQUEST from the terminal controller 96 to the host computer 38 which contains the page identifier. The host computer 38 will then send a CONTACT REPLY to the originating controller 96 and will then send to the host computer, 38 in the above example, of each member of the CONTACT LIST an ALERT RECORD which will then be passed on to each associated terminal controller 600 owned by each CONTACT LIST member. The alert will then appear on the display screen of each desk unit associated with the terminal controller 600. The above exchange of records is illustrated in FIG. 15A. A member of the CONTACT LIST wishing to view this ALERTED PAGE which has been transmitted by the page owner indicates this on his keyboard at the keystation associated with terminal controller 600 which causes a VIEW REQUEST RECORD to be sent from controller 600 to the associated host computer 38 which, in turn, in the prior system, sends an AUGMENTED PAGE REQUEST to the page owner's host computer 38 which retrieves the page from the SUBCRIBER FILE 1000 and a MESSAGE PAGE REPLY is returned to the CONTACT LIST member's host computer 38. The host computer 38 then passes on the page contents in a VIEW REPLY. The above exchange of records is illustrated in FIG. 15B.

Figure 16:
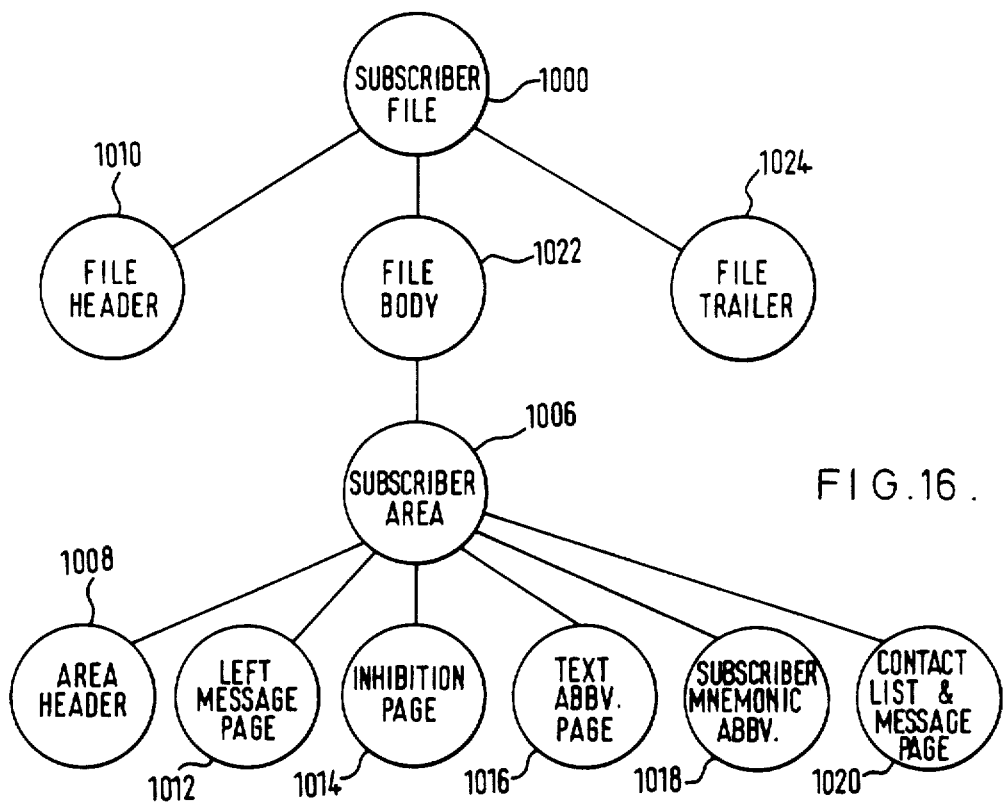
FIG. 16 is a diagrammatic illustration of the structure of the Subscriber File in the system of FIG. 1.
Figure 17:
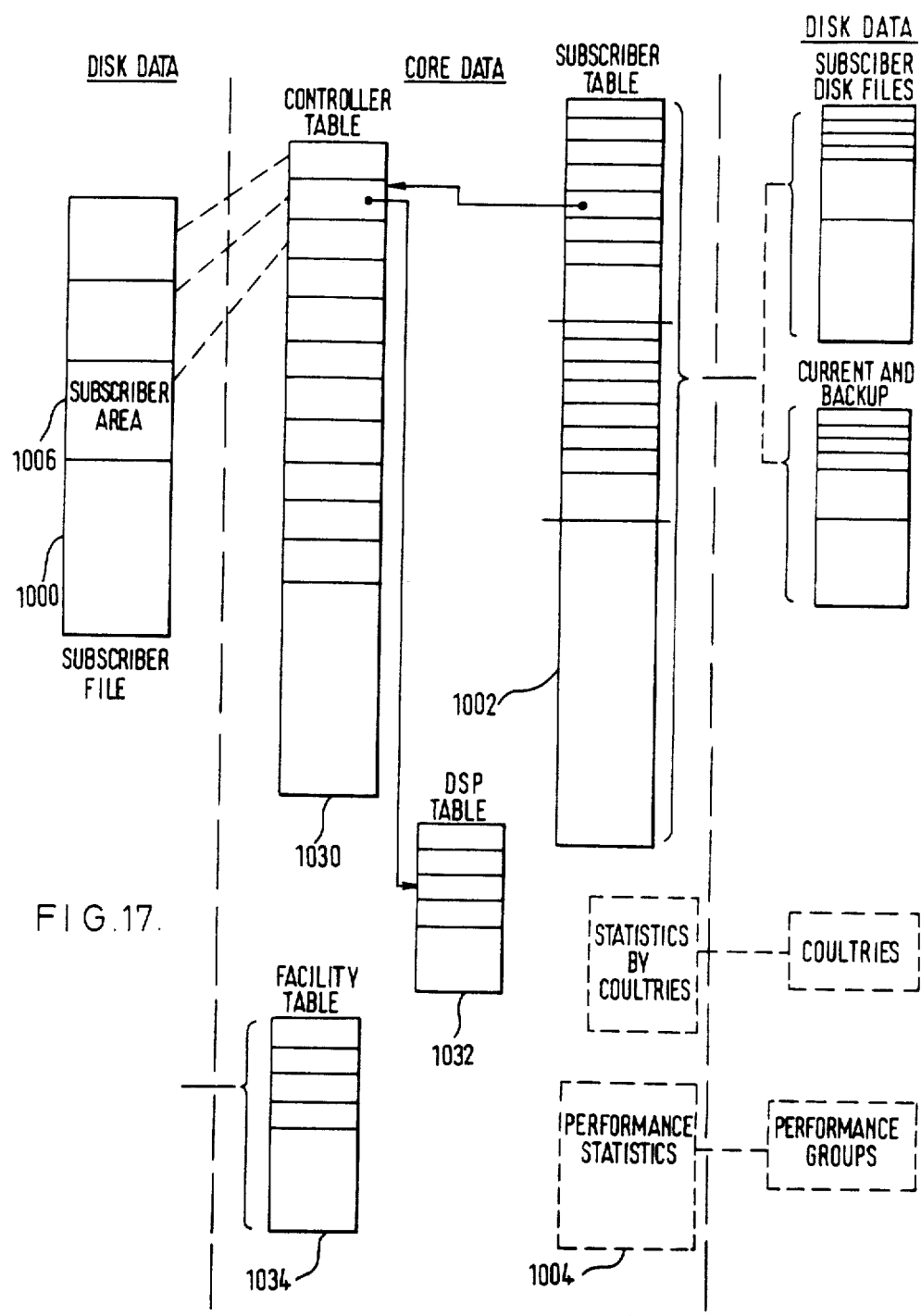
FIG. 17 is a diagrammatic illustration of the main data structure in the host computer portion of the system of FIG. 1.

In order to facilitate the understanding of the prior system, a brief word about file organization of the SUBSCRIBER FILE 1000 previously referred to above, will be provided below with reference to FIGS. 16 and 17. Thus, the static information retained by the prior system may preferably be stored in two files, the SUBSCRIBER FILE 1000 and the SUBSCRIBER TABLE FILE 1002 with, if desired, an additional PERFORMANCE STATISTICS FILE 1004 also being provided for retaining performance statistics. These files 1000, 1002 and 1004 are illustratively represented in FIG. 17 with as previously mentioned, the SUBSCRIBER FILE being given reference numeral 1000 the SUBSCRIBER TABLE being given reference numeral 1002 and the optional PERFORMANCE STATISTIC FILE being given reference numeral 1004. Each file 1000, 1002, 1004 preferably contains in its header an indicator which is used during initialization to discover whether the file 1000, 1002, 1004 has been previously used by the system or has been created by the file generator and is, therefore, what would be termed empty. Preferably a check that the same versions of the file 1000, 1002, 1004 are being used is also performed during initialization by comparing the dates and times from the file headers. For purposes of the explanation herein of the prior system, the most pertinent file is the SUBSCRIBER FILE 1000 which is also shown in greater detail in FIG. 16. All static data related to the subscribers supported by the host computer 38 are preferably stored in the SUBSCRIBER FILE 1000 with each subscriber being allocated a SUBSCRIBER AREA 1006 in which the tables or pages of information which a particular subscriber owns are stored. The first block of the SUBSCRIBER FILE 1000, as will be described hereinafter, preferably contains a header record with each SUBSCRIBER AREA 1006 preferably containing an AREA HEADER RECORD 1008 followed by the subscriber owned pages. With respect to the FILE HEADER RECORD 1010, this record 1010 preferably contains the dates and times when the subscriber pages stored in the SUBSCRIBER FILE 1000 were last updated and a bit map showing which SUBSCRIBER AREAS 1006 in the SUBSCRIBER FILE 1000 are unused. By way of example, the bit map may allow for 504 SUBSCRIBER AREAS 1006. Each AREA HEADER RECORD 1008 preferably contains the dates and times when the subscriber pages associated with that SUBSCRIBER AREA 1006 were last amended. As was previously mentioned, a particular SUBSCRIBER AREA 1006 in the prior system contains the subscriber owned pages associated with the subscriber associated with a given SUBSCRIBER AREA 1006, such as the aforementioned LEFT MESSAGE PAGE 1012, INHIBIT PAGE 1014, TEXT ABBREVIATION PAGE 1016, SUBSCRIBER MNEMONIC ABBREVIATION PAGE 1018, and the subscriber CONTACT LIST and MESSAGE PAGES 1020. The LEFT MESSAGE PAGE 1012 contains messages left for the owning subscriber by other subscribers who have attempted to contact him with the oldest message being removed from the LEFT MESSAGE PAGE 1012 when the new message is received. The page owner may view the LEFT MESSAGE PAGE 1012 and cancel individual or all messages on the LEFT MESSAGE PAGE 1012, with each message added to this page 1012 preferbly being assigned a number. The INHIBIT PAGE 1014 is the subscriber created page in which the page owner may set up a list consisting of the mnemonics of, by way of example, up to 100 subscribers from which he does not wish to receive any CONTACT REQUESTS, as previously mentioned. The mnemonics are preferaby stored in sequence and the page owner can view the page, insert mnemonics and cancel individual or all mnemonics on this page 1014. The TEXT ABBREVIATIONS PAGE 1016 contains text abbreviations which are used by the desk units during conversations and is, therefore, preferably stored in both the host computer 38 and the owning subscriber's terminal controller 96 or 600. This TEXT ABBREVIATIONS PAGE 1016 is preferably down-line loaded to the associated terminal controller 96 or 600 after each set of amendments to the page as well as when the terminal controller 96 or 600 signs on to the system. Each record in the TEXT ABBREVIATIONS PAGE 1016 would preferably consist of an abbreviation of, by way of example, up to 6 characters and text of up to 60 characters with a storage capacity, by way of example, of up to 1000 characters of abbreviation and text. Again, the page owner may view the TEXT ABBREVIATION PAGE 1016, insert new abbreviations and cancel individual or all abbreviations. With respect to the SUBSCRIBER MNEMONIC ABBREVIATIONS PAGE 1018, when requesting a contact, a subscriber may use an abbreviation rather than the other subscriber's mnemonic. As such, subscribers may set up their own tables of abbreviations which are contained in the SUBSCRIBER MNEMONIC ABBREVIATIONS PAGE 1018 and the page owner may view this page 1018, insert new abbreviations and cancel individual or all abbreviations on this page 1018. By way of example, each abbreviation is of one character and the mnemonic associated with the abbreviation may include two characters indicating a particular desk unit or dealer. Lastly, with respect to the CONTACT LISTS and MESSAGE PAGES 1020 in the prior system, as was previously mentioned, each subscriber may set up MESSAGE PAGES and associated CONTACT LISTS with the owning subscriber being able to make a MESSAGE PAGE available to all subscribers on a particular CONTACT LIST or to request a contact with the first free subscriber on the CONTACT LIST. Preferably, in the prior system, each MESSAGE PAGE and CONTACT LIST is contained within a disk block and a subscriber may, by way of example, set up up to 1 pages and CONTACT LISTS. These CONTACT LISTs and MESSAGE PAGES may be viewed by the owning subscriber and amended independently. Preferably the MESSAGE PAGE consists of texts which will fit into the display area of a desk unit with the CONTACT LIST preferably, by way of example, consisting of up to 20 SUBSCRIBER MNEMONICS. It should be further noted with reference to FIG. 16, that the SUBSCRIBER FILE 1000 also preferably conventionally contains a FILE BODY 1022 which incorporates a number of the aforementioned SUBSCRIBER AREAS 1066 and a FILE TRAILER 1024 to complete the SUBSCRIBER FILE 1000. Similarly, with reference to FIG. 17, assuming that more than one terminal controller is supported by the host computer 38, the host computer 38 also preferably contains a CONTROLLER TABLE 1030 as well as other appropriate tables and files. FIG. 17, as was previously mentioned illustrates the main data structures in the host computer 38. With respect to FIG. 17, the information held on file for each subscriber supported by the host computer 38 in the prior system preferably includes the subscriber short name, the subscriber's 20 character answerback code, the subscriber's queue limit, the subscriber's ADDRESS abbreviation table, the subscriber's INHIBIT table which states from whom he will not accept calls, the subscriber's user abbreviation table for loading into the associated terminal controller 96 or 600, up to 20 messages left for the subscriber and 15 blocks each containing a CONTACT LIST and a MESSAGE PAGE. In addition, other core tables are also maintained in the host computer 38 such as the DSP TABLE 1032 which preferably contains information on the logical links to each concentrator 48, 110, by way of example, used to link a supported terminal controller 96, 600, the FACILITY TABLE 1034 which contains information on each conversational facility, the aforementioned SUBSCRIBER TABLE 1002 which contains an ordered list of all subscribers in the system 30 and contains their state and the ADDRESS of the host computer currently supporting them, and the CONTROLLER TABLE 1030 which contains dynamic information on each terminal controller which may be supported. The information contained in the CONTROLLER TABLE 1030 may preferably include the route to the concentrator and the terminal controller, the status of the terminal controller, the queue limit for the subscriber, the current number of free desk units for a particular terminal controller and the length of the calls queue, the current conversation audit number for the particular terminal controller and a link to other terminal controllers for the same subscriber. As was also previously mentioned, if desired, other tables may be employed to collect statistics 1004 for accounting. In addition, as was previously mentioned with respect to the description in detail of the terminal controller 96 or 600, the controller holds the text of any current conversation and is responsible for printing this text as well as also containing information on the route set up to the other terminal controller in each call. In addition, the terminal controller preferably holds the user abbreviation table for the subscriber and the 20 character answerback code used by the subscriber.

Figure 18:
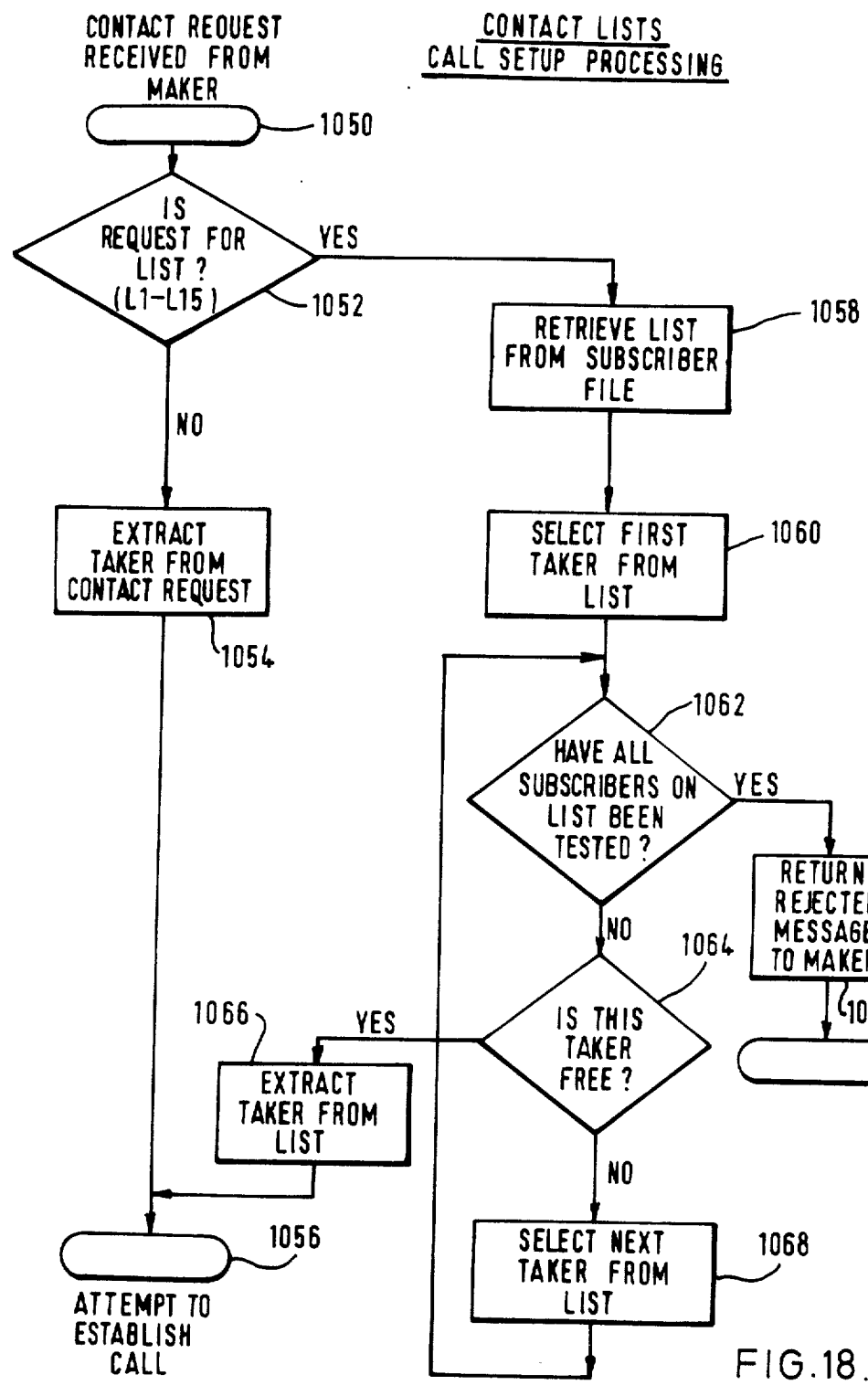
FIG. 18 is a logic flow diagram of the condition responsive message routing logic portion of the system of FIG. 1 in connection with the establishment of a conversation in response to a CONTACT REQUEST from a maker utilizing the CALL LIST facility of the aforementioned copending U.S. patent applications in which access to the SUBSCRIBER FILE in the host computer is required.
Figure 19:
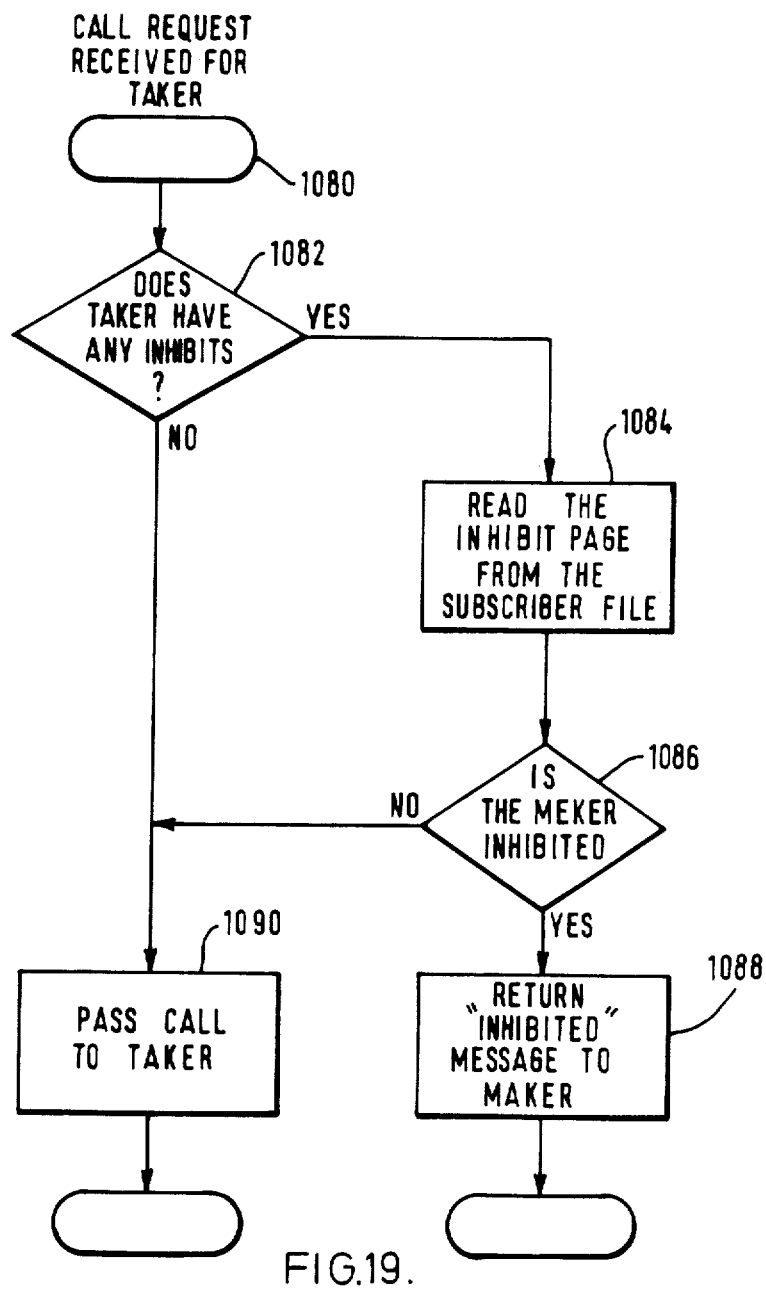
FIG. 19 is a logic flow diagram of the condition responsive message routing logic portion of the system of FIG. 1 in connection with the establishment of a conversation in response to a CONTACT REQUEST received for a taker utilizing the INHIBIT LIST facility of the aforementioned copending U.S. patent applications in which access to the SUBSCRIBER FILE in the host computer is required.

Referring now to FIG. 18, a logic flow diagram of the condition responsive message routing logic portion of the prior system in connection with the establishment of a conversation in response to a CONTACT REQUEST from a maker utilizing the aforementioned CALL LIST facility or feature of the prior system is shown. Thus, in the prior system, when a user enters a CONTACT REQUEST, the message with the current insert line is sent over the logical link to the host computer 38 supporting the subscriber which interprets this insert line. This is illustratively represented by reference numeral 1050 in FIG. 18. In the prior system, if the ADDRESS is a single character, it is expanded by accessing the ADDRESS ABBREVIATIONS PAGE from the disk file. In the prior system, if the ADDRESS constitutes a CONTACT LIST of subscribers it causes the CONTACT LIST to be held in core while the subscribers are contacted in turn whereas if the ADDRESS references a CONTACT LIST the CONTACT LIST is brought into core for action. This determination as to whether the request is for a CONTACT LIST is represented by reference number 1052 in FIG. 18. If the request is not for a CONTACT LIST, then the host computer 38 extracts the takers ADDRESS from the CONTACT REQUEST, looks up the ADDRESS of the subscriber-in the SUBSCRIBER TABLE and sends a message to the supporting host computer for this subscriber which message includes a location of the requesting terminal controller and may preferably include the time of contact. This process is unaffected even if the same host computer supports both subscribers as in the above example. This procedure is represented by reference numerals 1054 and 1056 in FIG. 18. If however, the CONTACT REQUEST is for a CALL LIST, then, in the prior system, the CALL LIST is retrieved from the SUBSCRIBER FILE and the host computer selects the first taker from the CALL LIST and attempts to establish a call. If this taker is not free, then the host computer 38 selects the next taker from the CALL LIST and continues this procedure, sequentially going through the CALL LIST until all subscribers have been tested in an effort to establish a call with the first free subscriber on the CALL LIST. If there are no free subscribers on the CALL LIST, then a rejected message is returned to the maker. This procedure is represented by reference numerals 1058, 1060, 1062, 1064, 1066, 1056, 1068 and 1070 in FIG. 18. As was previously mentioned, the taker's host computer will check if there is room in the called subscriber's queue and that the call is not inhibited. The result of this investigation, as was previously mentioned, is sent back to the maker's host computer and therefrom to the associated terminal controller where, if the call can be queued, the terminal controller will be given an audit number for the call and the interest message. When the terminal controller receives this message, it will clear the area for the display of the call and place the heading on the first line and the interest message, if any, on the second line. By way of example, a typical CALL LIST or CONTACT LIST display which may appear at the owning subsubscriber's terminal in the prior system is illustrated in FIG. 20.

If, however, the caller is inhibited, whether the caller is contained on a CONTACT LIST request or on a direct request, then the call will not be completed, as previously mentioned. A typical INHIBIT PAGE 1014 display which may be viewed at the owning subscriber's terminal in the prior system is illustrated, by way of example, in FIG. 21. With respect to the operation of the prior system with respect to the set up of a call regarding the use of the INHIBIT PAGE, reference is made to FIG. 19 which is a logic flow diagram of the condition responsive message routing logic portion of the prior system in connection with the establishment of a conversation in response to a CONTACT REQUEST received for a taker utilizing the INHIBIT LIST facility or feature of the prior system. Thus, in the prior system, the host computer 38 receives the CALL OR CONTACT REQUEST for the taker, determines from the SUBSCRIBER TABLE 1002 the location of the host computer 38 associated with that taker, and transmits the CONTACT REQUEST to that host computer. The taker's host computer then reads the INHIBIT PAGE 1014 of the taker from the SUBSCRIBER FILE 1000 to determine whether the maker is inhibited. If the maker is inhibited, that is if the makers identification code appears on the INHIBIT PAGE of the taker, then an INHIBITED MESSAGE is returned to the host computer associated with the taker. If it is a CONTACT LIST call, then the host computer will proceed, as previously mentioned with reference to FIG. 18, to contact the next subscriber on the CONTACT LIST since an inhibited subscriber is considered not free. However, if it is not a CONTACT LIST call, then the INHIBITED MESSAGE will be passed on to the terminal controller of the maker which will, in turn, cause a display at the maker's keystation of the message "INHIBITED". If the caller or maker is not inhibited, then the call will be passed on to the taker. This procedure is represented by reference numerals 1080, 1082, 1084, 1086, 1088 and 1090 in FIG. 19.

By way of example, a typical CONTACT LIST and MESSAGE PAGE table in the prior system is illustrated below in Table C.

TABLE C

| | CONTACT LIST and MESSAGE PAGE (Computer PDP-11; Table Size: 512 bytes) | | |
|---|---|---|---|
| Location | Type | Description or Cross X-Ref | Null Value |
| 1-4 | 4 BYTES | Owning SUBSCRIBER MNEMONIC | high value |
| 5 | BYTE | Current Amending DU | 0 |
| 6 | BYTE | Spare | — |
| 7-12 | 6 BYTES | Date/Time of last update to this page | bin 0 (6) |
| 13 | BYTE | Number of entries in CONTACT LIST | 0 |
| 14 | BYTE | Number of bytes used in CONTACT LIST | 0 |
| 15-16 | INT | Number of bytes used in Send Message | 0 |
| 17 | BYTE | Availability (of SM page) flag | 0 |
| 18-97 | 4 BYTES | CONTACT LIST (20 subscriber mnemonics) | Space (80) |
| 93-512 | 415 | Send Message | Space |

TABLE C-continued

| | CONTACT LIST and MESSAGE PAGE (Computer PDP-11; Table Size: 512 bytes) | | |
|---|---|---|---|
| Location | Type | Description or Cross X-Ref | Null Value |
| | BYTES | | (415) |

In addition, a typical INHIBIT LIST PAGE table in the prior system is illustrated below in Table D.

TABLE D

| Location | Type | Description or Cross X-Ref | Null Value |
|---|---|---|---|
| 1-4 | 4 BYTES | Owning Subscriber mnemonic | High Value |
| 5 | BYTE | Desk Unit Code | 0 |
| 6 | BYTE | Spare | — |
| 7-12 | 6 BYTES | Date/Time of last update | Bin 0 (6) |
| 13-14 | INT | Number of subscribers on list | 0 |
| 15-414 | 4 BYTES × 100 | Subscriber mnemonic × 100 X (400) | Space |

It should be noted that a CONTACT LIST may be specified on a user insert line, for example CNV CNTCT ABCD, BCDE, CDEF INTEREST MSG. In the above user insert line, the subscriber is dynamically creating a CONTACT LIST as opposed to referring to a CONTACT LIST previously stored in memory in the host computer 38 in the prior system. Alternatively, the subscriber can specify the use of one of his up to 14, by way of example, prestored CONTACT LISTS in which instance, the CONTACT LIST would be specified by L, followed by the CONTACT LIST number, for example CNV CNTCT L12. Thus, as previously mentioned, the subscriber can create a CALL or CONTACT LIST at any time up until the call is actually initiated and the CONTACT LIST may come from a prestored CONTACT LIST in memory or may be dynamically created at the time the call is to be initiated. In addition, as was also previously mentioned, the subscriber may send a page to the various subscribers on the CONTACT LIST, such as by entering such a request, represented by P followed by the number of the CONTACT LIST to be used, such as for example CNV CNTCT P12. Thus, the user insert line can be used to attempt to establish a call using the CONTACT LIST feature.

Referring now to FIGS. 22–47, the presently preferred CONTACT LIST, DUAL CONTACT LIST, INHIBIT LIST, and DEAL KEY FUNCTIONS of the improved system 30 of the present invention shall now be described in greater detail. Initially referring to FIGS. 22-33, the improved CONTACT LIST FUNCTIONS of the improved system 30 of the present invention shall now be described in greater detail hereinafter including the establishment of a CONTACT LIST by the subscriber, the processing of a CONTACT or CALL LIST within the terminal controller in connection with the establishment of a conversation, the user insertion of an INTEREST MESSAGE to the subscriber's CALL or CONTACT LIST, the processing of a SKIP SUBSCRIBER CONTACT LIST REQUEST within the terminal controller in connection with the establishment of a conversation, and the processing of a DUAL CONTACT LIST REQUEST. As was previously mentioned, in the prior system referred to above, the CONTACT LISTS were held in the host computer 38 with only the list identifier for example L12, being transmitted in the CONTACT REQUEST. This would then require an access to the SUBSCRIBER FILE 1000 to retrieve the CONTACT LIST before processing could continue. As will be described in greater detail hereinafter, no such access to the SUBSCRIBER FILE 1000 is required in the improved system 30 of the present invention to process a CONTACT REQUEST. As was previously mentioned, the improved CONTACT LIST function of the system 30 of the present invention enables an INTEREST MESSAGE to be associated with each CONTACT LIST, a named subscriber to be skipped within each LIST during the placement of the call, and two contacts in two conversation areas CN1 and CN2 to occur in response to the placement of a single DUAL CONTACT LIST call. With respect to the association of an INTEREST MESSAGE with each CONTACT LIST, preferably an INTEREST MESSAGE of up to fourteen characters by way of example may be held within the CONTACT LIST. The INTEREST MESSAGE generally follows the list of subscribers and is separated therefrom by an asterisk. The INTEREST MESSAGE is preferably displayed and stored in the four character format of the existing LIST. For each four characters used for the INTEREST ESSAGE, the number of subscribers allowed in the CONTACT LIST is reduced by one. Thus, by way of example, if a CONTACT LIST can contain up to nine subscribers without any INTEREST MESSAGE, then a fourteen character INTEREST MESSAGE would limit the subscriber content of that CONTACT LIST to up to five subscribers. With respect to the processing of a SKIP SUBSCRIBER CONTACT LIST, that is the skipping of a subscriber in a given CONTACT LIST call, which will be described in greater detail hereinafter with reference to FIG. 30, if the CONTACT LIST, by way of example, is given reference L1 and a calling subscriber wishes to skip subscriber ABCD who is a member of that LIST during the placement of a CONTACT LIST call, then the subscriber presses his CONTACT key followed by the list identifier L1 followed by an asterisk and then the subscriber nmenonic for the subscriber to be skipped, in this instance, ABCD. Thus, the CONTACT REQUEST looks as follows:

CONTACT L1 * ABCD.

In response to this CONTACT REQUEST, as will be described in greater detail hereinafter, the improved system 30 of the present invention scans CONTACT LIST L1 for the first free subscriber, ignoring subscriber ABCD.

With respect to the aforementioned improved DUAL CONTACT or DUAL CALL LIST function of the improved system 30 of the present invention, this DUAL CONTACT LIST function will be described in greater detail hereinafter with reference to FIGS. 31 and 32. Suffice it to say that the command is the list identifier followed by the plus symbol. Thus the subscriber depresses the CONTACT key on his keyboard and then the list identifier such as L1 in the above example and the plus symbol so that the DUAL CALL LIST CONTACT REQUEST message looks as follows:

CONTACT L1+.

As will be described in greater detail hereinafter, the use of this DUAL CALL LIST which permits two contacts to be made from a CONTACT LIST in response to placement of a single call, requires that the two conversations areas CN1 and CN2 of the originating subscriber's desk unit be free. If not, then the contact will be rejected. The subscriber's terminal controller, such as controller 68, checks that there are two free conversations areas on the subscriber's desk unit. If so a normal CONTACT LIST call is made for the first conversations area and a call is set up with the first free subscriber on the CONTACT LIST. When this is accomplished, the terminal controller, such as controller 68, then rescans the CONTACT LIST with respect to the second conversations area on the desk unit, omiting or skipping the subscriber contacted in the first conversations area CN1, and sets up the second call in the second conversations area CN2 with the next free subscriber on the CONTACT LIST. If a subscriber cannot be contacted on either of these passes, a NO-CONTACT RESPONSE is given.

Figure 27:
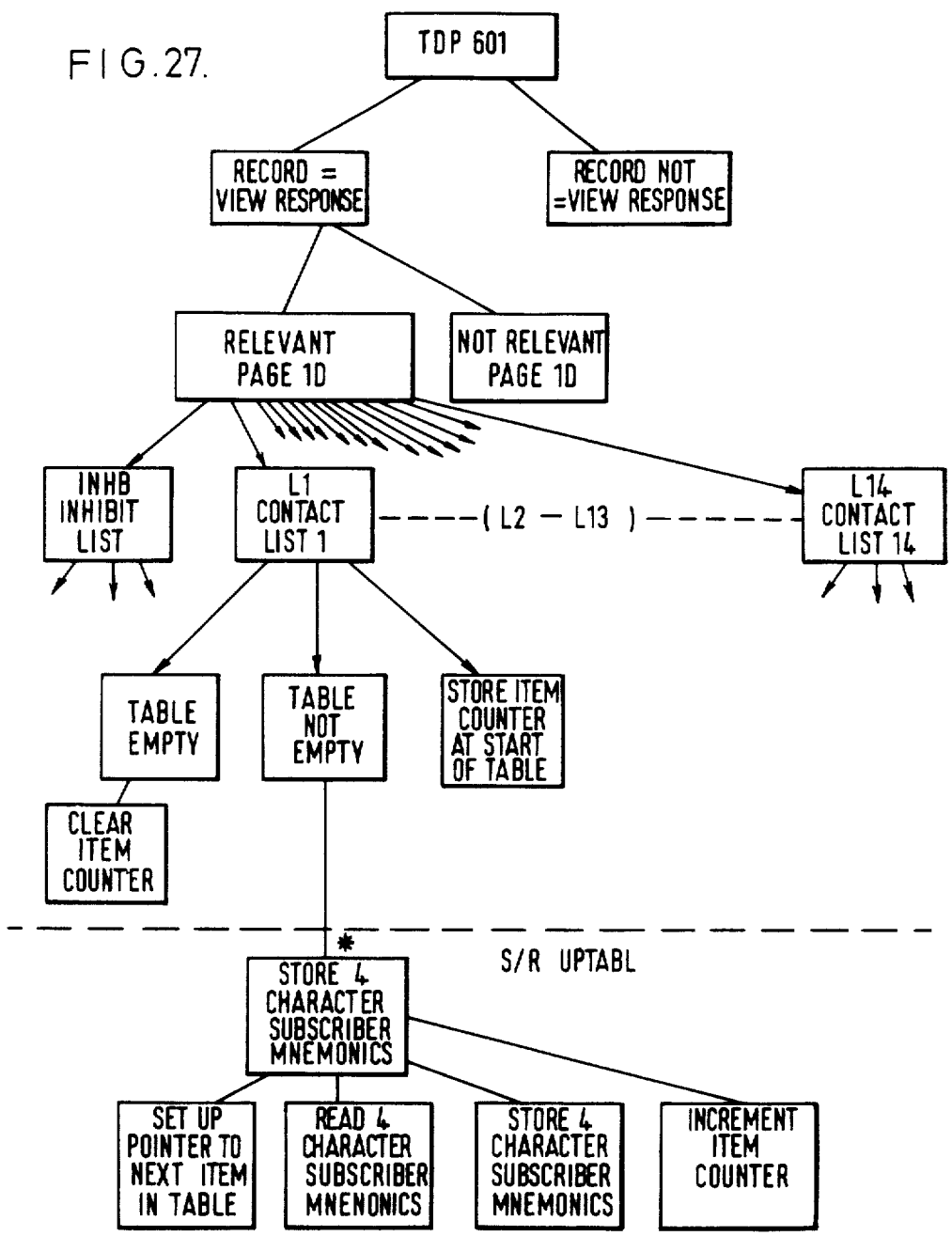
FIG. 27 is a logic flow diagram of the condition responsive message routing logic portion of a typical keystation terminal controller portion of the improved system of the present invention in connection with the setting up of local tables within the terminal controller in response to a VIEW RESPONSE request in connection with the improved CALL LIST facility of the present invention with respect to the set-up of subscriber-created CALL LIST tables, with the same diagram also being applicable as a logic flow diagram of the condition responsive message routing logic portion of the terminal controller in connection with the setting up of local tables within the terminal controller in response to a VIEW RESPONSE request in connection with the improved INHIBIT LIST facility of the present invention with respect to the set-up of subscriber created INHIBIT LIST tables.

As will be described in greater detail hereinafter with reference to FIGS. 22-32, the presently preferred improved system 30 of the present invention keeps local copies of the subscriber created CONTACT LISTS which are stored in the host computer 38 in the associated terminal controller, for example 68, of the originating subscriber. In order to accomplish this, the originating subscriber is required to view his CONTACT LIST pages after setting them up or making any changes or amendments to them with the VIEW RESPONSE REQUEST being used to set up the local CONTACT LIST tables in the assocated terminal controller 68 by way of example. Thereafter, on making a subsequent CONTACT REQUEST that specifies the name of a CONTACT or CALL LIST, the terminal controller 68 accesses the appropriate locally stored CONTACT LIST table, copies out the contents of the CONTACT LIST into a buffer, separated by commas, including the INTEREST MESSAGE if specified, and then sends the content to the buffer and to the host computer 38 where it is handled in the same way as the aforementioned dynamic list call described with respect to the prior system. Suffice it to say at this point that the CONTACT LIST tables in the terminal controller 68 are set up by capturing data from a VIEW RESPONSE RECORD as a result of a VIEW REQUEST MESSAGE. The message supervisor in the terminal controller 68 control program enumerated in TABLE A calls a routine to check for a VIEW RESPONSE RECORD, and if found, further checks for the page names of the tables. If a relevant page name is found, than that table is updated. This procedure is illustrated in FIG. 27 and will be described in greater detail hereinafter with respect thereto. By way of example, there may be fourteen tables in the terminal controller 68 for CONTACT LISTS, with each table being capable of holding nine subscriber mnemonics or, as previously mentioned, the equivalent mix of subscriber mnemonics and an INTEREST MESSAGE. As will be further described with reference to FIG. 29, before building a CONTACT REQUEST MESSAGE for output as a result of the operator pressing the TRANSMIT key while in the conversation mode in the improved system 30 of the present invention, a CONTACT LIST handling routine illustrated in FIG. 29 is entered to check for a CONTACT LIST REQUEST. If no such request is found, the routine exits and processing continues as normal. However if a valid CONTACT LIST RE- QUEST is found, then the request message will be expanded to contain all of the subscriber's mnemonics as set up in the corresponding CONTACT LIST, separated by commas, and with the INTEREST MESSAGE appended, if present.

Figure 22:
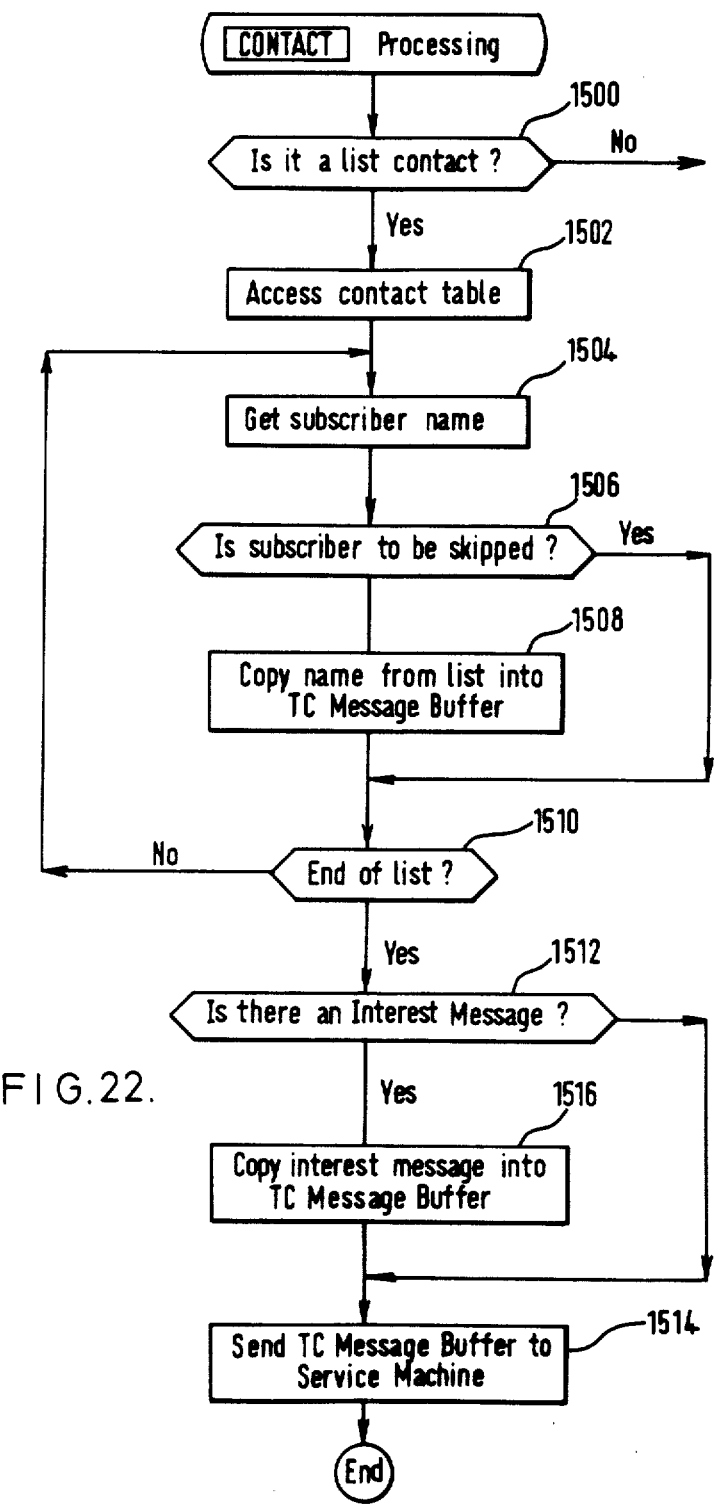
FIG. 22 is a logic flow diagram of the condition responsive message routing logic portion of a typical keystation terminal controller portion of the improved system of the present invention in connection with the processing of a CONTACT or CALL LIST within the terminal controller in connection with the establishment of a conversation in response to a CONTACT REQUEST from a maker utilizing the improved CALL LIST facility of the present invention.

Referring now to FIG. 22, a logic flow diagram of the condition responsive message routing logic portion of a typical keystation terminal controller 68 of the improved system 30 of the present invention is shown in connection with the processing of a CONTACT or CALL LIST within the terminal controller 68 in connection with the establishment of a conversation in response to a CONTACT REQUEST from a maker 98 utilizing the improved CONTACT or CALL LIST function of the present invention. By way of example, each CONTACT LIST table which is set up may have the following table structure as illustrated below in Table E.

TABLE E

Data specification of tables
Field: 6
Addr: 0501
For each table, the following structure prevails:

| WORD | DESCRIPTION | TYPE |
| --- | --- | --- |
| 0 | Total no. of items in table | Ascii |
| 1 | 1st & 2nd bytes of 1st subs. | Packed-word |
| 2 | 3rd & 4th bytes mnemonics | word |
| 3 | 2nd subs. mnemonics | Packed-word |
| 4 | | word |
| 5 | 3rd subs. mnemonics | Packed-word |
| 6 | | word |
| . | . | |
| . | . | |
| . | . | |
| — | nth sub. mnemonics | | where n = maximum no. allocated to each table.

As shown and preferred in FIG. 22, in the processing of a CONTACT LIST REQUEST in the terminal controller 68, a determination is first made as to whether or not it is a CONTACT LIST REQUEST. This is represented by reference numeral 1500 in FIG. 22. If it is a CONTACT LIST REQUEST, then the CONTACT LIST table or tables locally stored in the terminal controller 68 by way of example is accessed. This is represented by reference numeral 1502 in FIG. 22. The subscriber name is then retrieved, as represented by reference numeral 1504, and a determination is made as to whether or not the subscriber is to be skipped, as represented by reference numeral 1506. If the subscriber is to be skipped, then processing continues with the next subscriber in the CONTACT LIST. If the subscriber is not to be skipped, then the subscriber name is copied from the CONTACT LIST into the terminal controller MESSAGE buffer, as is represented by reference numeral 1508. A determination is then made as to whether or not the end of the CONTACT LIST has been reached, which is represented by reference numeral 1510. If the end of the CONTACT LIST has not been reached then the processing continues with the next subscriber on the CONTACT LIST. If the end of the CONTACT LIST has been reached, then a determination is made as to whether or not there is an INTEREST MESSAGE included with the selected CONTACT LIST. This is represented by reference numeral 1512. If there is no INTEREST MESSAGE to be included, then the REQUEST is sent from the terminal controller MESSAGE buffer to the host computer 38, as is represented by reference numeral 1514 and the CONTACT LIST processing is complete. An attempt is then made to set up a call in the normal manner. If there is an INTEREST MESSAGE, then the INTEREST MESSAGE is first copied into the terminal controller MESSAGE buffer, as represented by reference numeral 1516, and then the INTEREST MESSAGE, along with the CONTACT REQUEST which is contained in the terminal controller MESSAGE buffer is sent to the host computer for processing in the normal manner to set up a call.

Referring now to FIGS. 23-26 and 33, the various sample types of video displays which may appear on the display portion of a typical originating subscriber in connection with the improved CALL LIST or CONTACT LIST and DUAL CONTACT LIST facility of the improved system 30 of the present invention is shown. Thus, FIGS. 23-25 relate to the set-up of a typical subscriber created CALL LIST table, with FIG. 25 relating, for purposes of illustration, to the insertion of an INTEREST MESSAGE to a subscriber created CALL LIST or CONTACT LIST.

FIG. 23 is a diagrammatic illustration of the resultant video display viewed by the originating subscriber in response to a VIEW RESPONSE REQUEST when the CALL LIST TABLE for CONTACT LIST L1 is empty. FIG. 24 is a diagrammatic illustration of this video display after 5 subscriber mnemonics, CTRL, FGRL, CTRP, CTRG and FGRP, have been inserted in CONTACT LIST L1, FIG. 25 is a diagrammatic illustration of this video display for a different subscriber created CONTACT LIST L2 having 4 subscriber created mnemonics, CLTL, CRTL, CRLL and CTLL, and a subscriber created INTEREST MESSAGE * SPO T DM PLS, with all characters after the asterisk comprising the INTEREST MESSAGE. FIG. 26 diagrammatically illustrates the originating subscriber's video display when a single CONTACT LIST call has been placed to the first free subscriber in CONTACT LIST L2 who, in this example, has subscriber mnemonic CLTL, with the INTEREST MESSAGE contained in CONTACT LIST L2 being the first line of the video conversational textual data conversation between the maker and CLTL who is the taker, with the maker now awaiting a reply to the INTEREST MESSAGE. As shown and preferred in FIG. 26, since this represents only a single video conversation, it is displayed in the first conversation area CN1 of the screen. FIG. 33, however, diagrammatically illustrates the above situation when a DUAL CONTACT LIST CALL has been placed to the first two free subscribers in CONTACT LIST L2 which, in this example, happen to have the subscriber mnemonics CLTL and CRTL, respectively, with each receiving the same subscriber created interest message contained in the CONTACT LIST L2. The first line of the video conversation to subscriber CLTL, who was the first free subscriber to be contacted using CONTACT LIST L2, which is the above INTEREST MESSAGE, appears in the first conversation area, CN1, of the screen, and the first line of the video conversation to subscriber CRTL, who was the second free subscriber to be contacted using CONTACT LIST L2, which is the same INTEREST MESSAGE, appears in the second conversation area, CN2, of the screen. As described herein, the acceptance of such a DUAL CONTACT LIST call requires both conversation areas CN1 and CN2 to be FREE.

Figure 28:
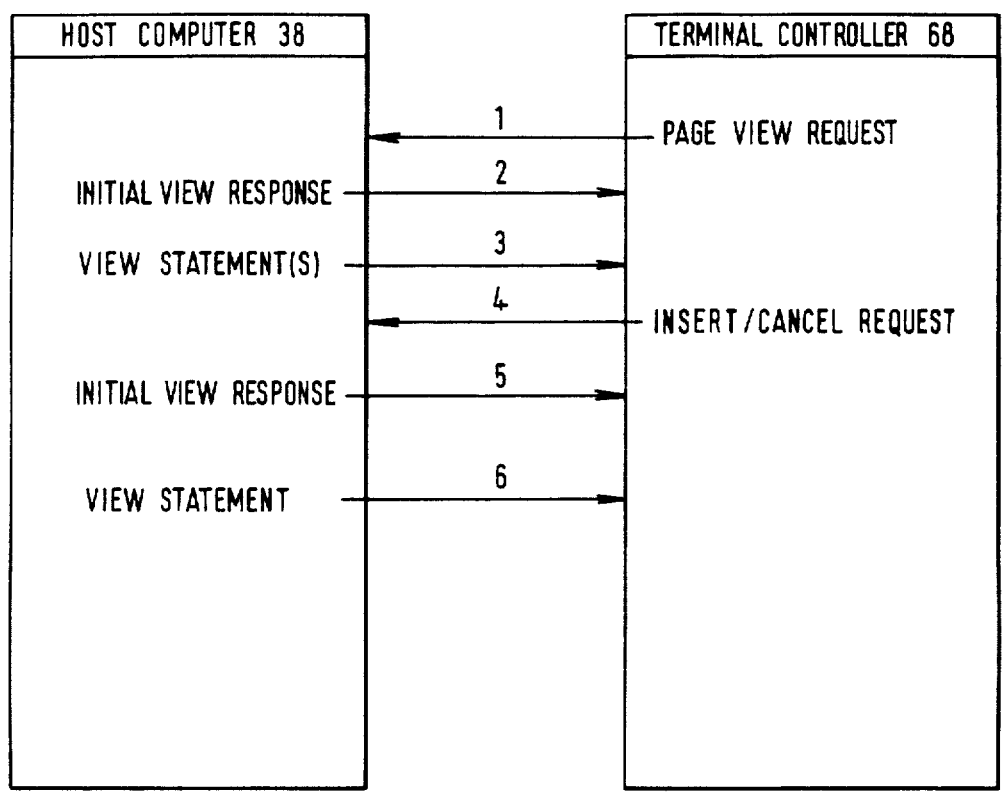
FIG. 28 is a diagrammatic illustration of the logical flow of messages in the improved system of the present invention with respect to the set-up of local CONTACT LIST tables in a typical keystation terminal controller.
Figure 29:
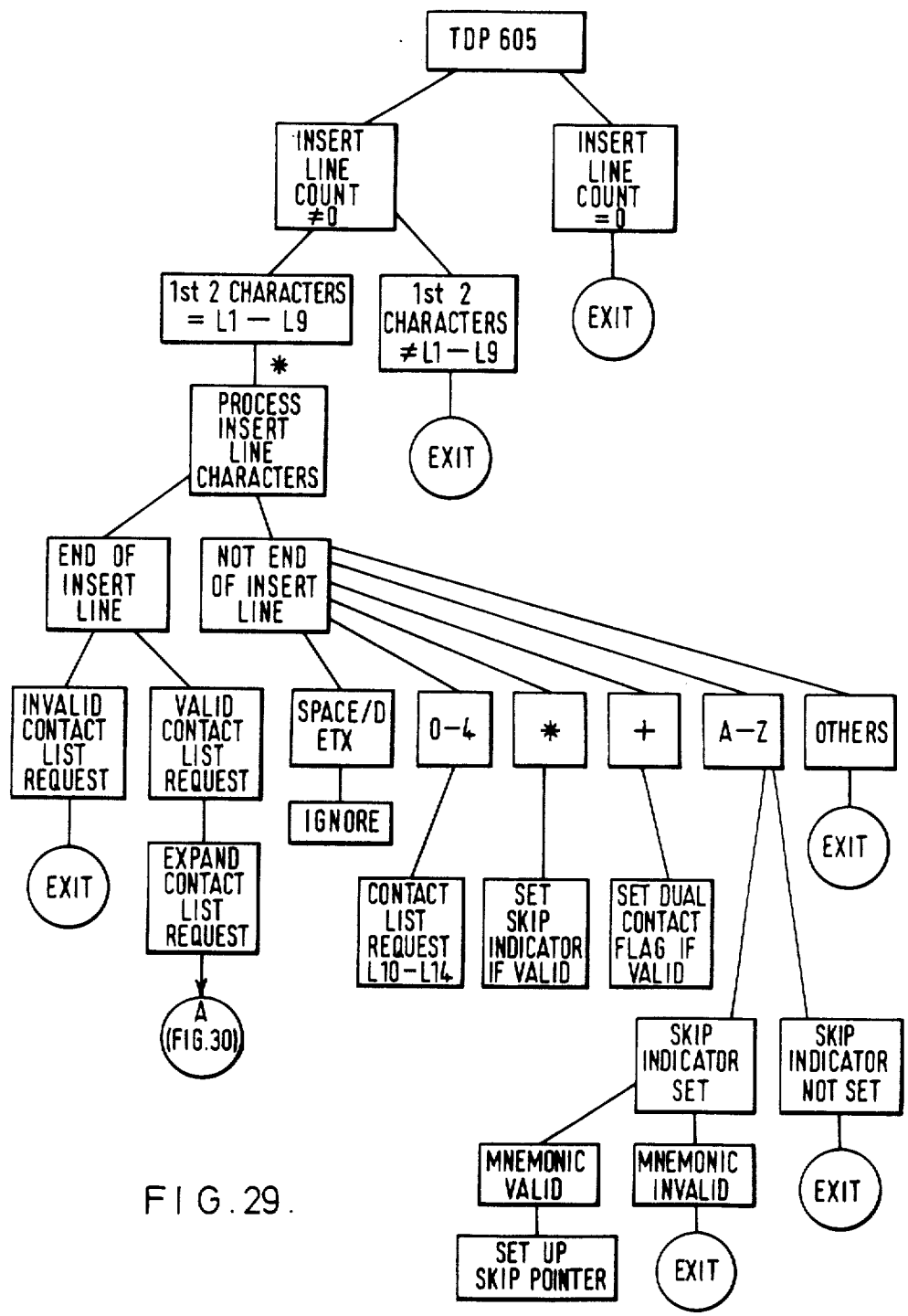
FIGS. 29-32, taken together, comprise a logic flow diagram of the condition responsive message routing logic portion of a typical keystation terminal controller portion of the improved system of the present invention in connection with: the processing of a CONTACT REQUEST in the terminal controller of the present invention in connection with the checking for a CONTACT LIST request; the processing of a SKIP SUBSCRIBER CONTACT LIST request within the terminal controller in connection with the establishment of a conversation in response to a CONTACT REQUEST from a maker utilizing the improved CONTACT or CALL LIST facility of the present invention; and the processing of a DUAL CONTACT LIST request within the terminal controller in connection with the establishment of a conversation in response to a CONTACT REQUEST from a maker utilizing the improved DUAL CONTACT or CALL LIST facility of the present invention.

Referring now to FIGS. 27 and 28, these diagrams relate to the set-up of subscriber created CALL LIST or CONTACT LIST tables, with FIG. 27 being a logic flow diagram of the condition responsive message routing logic portion of a typical keystation terminal controller, such as controller 68, in connection with the setting up of local subscriber-created CALL LIST tables within the terminal controller 68 in response to a VIEW RESPONSE request in connection with the improved CALL LIST facility of the improved system 30 of the present invention, and with FIG. 28 being a diagrammatic illustration of the logical flow of messages in the improved system 30 of the present invention in connection with the set-up of these local CALL LIST tables. It should be noted, as will be described hereinafter, that with respect to FIG. 27, the same logic flow diagram applies to the set-up of subscriber created INHIBIT LIST tables with appropriate modification relating to applicable terminology. Moreover, the terminology of FIG. 27 refers to that employed in the annexed terminal controller control program listing of Table A, with TDP 601 being the aforementioned subscriber-created table, whether CONTACT LIST or INHIBIT LIST, subroutine known as UPTABL. As was previously mentioned, this subroutine TDP 601 checks for a VIEW RESPONSE record, and if found, further checks for the page names of the tables, with that table being updated if a relevant page name is found. Thus, this subroutine is called to read and store the subscribers' mnemonics from the VIEW RESPONSE record into the local or internal tables of the terminal controller. In accomplishing this, the UPTABL subroutine first sets up pointers to the next item in the table and then reads in 4 characters of subsubscribers' mnemonics, shipping space and tab characters, and stores them. An item counter is then preferably incremented. This subroutine UPTABL then ends on one of the following conditions, either the end of the VIEW RESPONSE data or the end of the terminal controller local or internal table. As shown by way of example in FIG. 27, there are altogether 15 such tables in the terminal controller, one INHIBITS TABLE, INHB, and up to 14 subscriber-created CONTACT LISTS L1-L14, which are set-up by this subroutine. The balance of the flow diagram is self-explanatory and need not be explained further.

The logical flow of messages between the host computer 38 and a typical terminal controller 68 in connection with the aforementioned set-up of a local CONTACT LIST table is diagrammatically illustrated in FIG. 28. Thus, as illustrated in FIG. 28, the terminal controller 68 requests the table, such as CONTACT LIST L1. As a result of this VIEW RESPONSE request, the terminal controller 68 receives an initial VIEW RESPONSE from the host computer 38, which contains the heading line of the table together with some data, and subsequent VIEW STATEMENT(S), which contains only data if there is an overflow in the INITIAL VIEW RESPONSE. As further illustrated in FIG. 28, the terminal controller 68 may create and/or amend the table by sending an insert and/or cancel request to the host computer 38 which results in the aforementioned INITIAL VIEW RESPONSE and subsequent VIEW STATEMENT(S) from the host computer 38.

Figure 30:
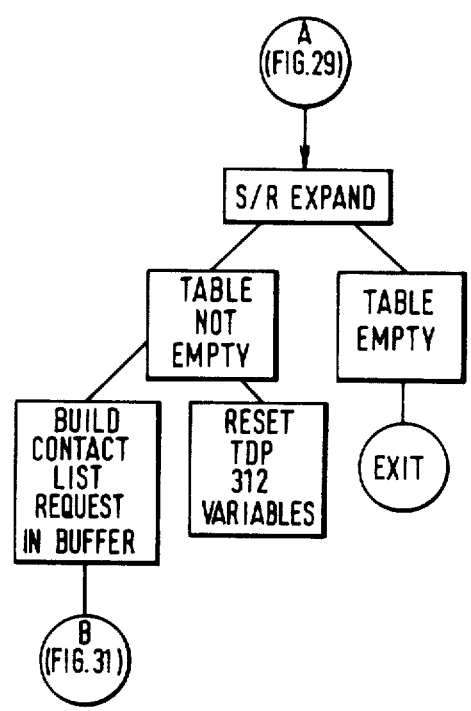
Figure 31:
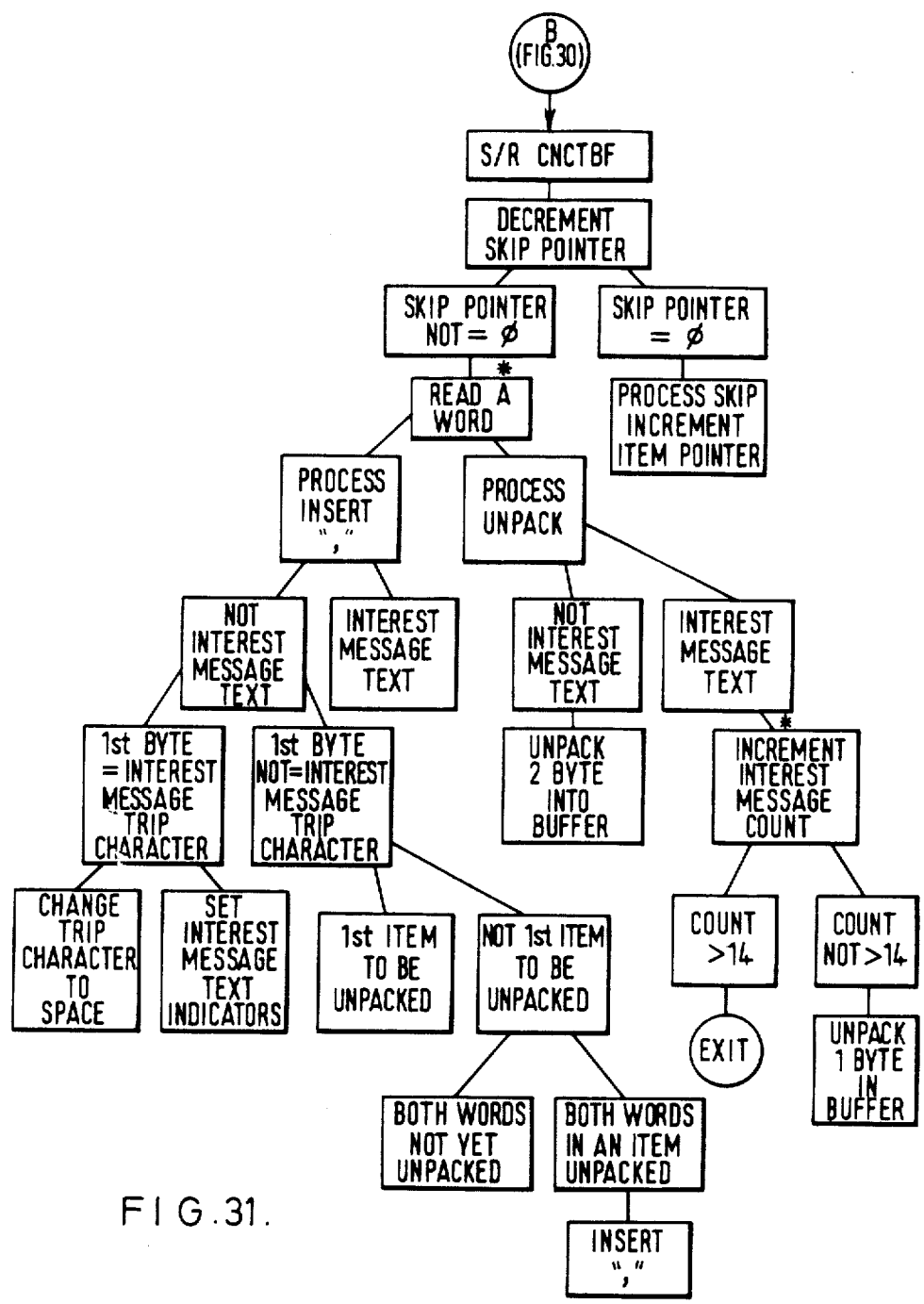

Referring now to FIGS. 29-32, these figures, when taken, together, comprise a logic flow diagram of the condition responsive message routing logic portion of a typical keystation terminal controller, such as controller 68, in connection with the processing or handling of various types of CONTACT LIST requests such as the checking for such a request, the processing of a SKIP SUBSCRIBER CONTACT LIST request, and the processing of a DUAL CONTACT request. As was previously mentioned with respect to FIG. 27, the terminology of FIGS. 29-32 refers to that employed in the annexed terminal controller control program listing of Table A, with TDP 605, TDP 312, and TDP 60A referring to subroutines in the control program listing of Table A. FIGS. 29-31 essentially relate to subroutine TDP 605 while FIG. 32 essentially relates to subroutine TDP 60A. Subroutine TDP 605, which relates to CONTACT LIST REQUEST handling or processing, is called from the CONTACT REQUEST handler TDP 312 before building the output request message. The insert line buffer is searched for a valid CONTACT LIST REQUEST. As soon as an invalid character is found, the search will stop and the subroutine TDP 605 will return to continue with normal CONTACT REQUEST handling. If a valid CONTACT LIST REQUEST is found, a subroutine EXPAND (FIG. 30) will be called to expand the CONTACT LIST REQUEST into a dynamic CONTACT using data from the corresponding CONTACT LIST table. The above portion of TDP 605 is illustrated in FIG. 29. This subroutine TDP 605 is also called to do a second CONTACT REQUEST in connection with the aforementioned DUAL CONTACT request feature of the present invention, with TDP 605 using the subscriber mnemonics set-up by subroutine TDP 60A illustrated in FIG. 32 to set-up the SKIP pointer for use when building the second dynamic CONTACT REQUEST.

As shown in FIG. 30, the aforementioned subroutine EXPAND exits if the CONTACT LIST table is empty. However, if the CONTACT LIST table is not empty, then it calls another subroutine CNCTBF to build the CONTACT LIST REQUEST message and resets the output buffer field and address variables in TDP 312 before returning to allow the expanded request buffer CTBUFF to be picked up when outputting.

As shown in FIG. 31, the subroutine CNCTBF reads two consecutive words from the CONTACT LIST table and builds a dynamic CONTACT REQUEST in the CONTACT LIST output buffer CTBUFF. Before reading each item from the CONTACT LIST table, the SKIP pointer is decremented. If the SKIP pointer becomes zero, then the next item of the CONTACT LIST is to be skipped. The item pointer will be incremented and the new item pointed to will read in. This subroutine CNCTBF inserts commas between successive subscribers' mnemonics, changes INTEREST MESSAGE TRIP character ("*") into a space, and transates the INTEREST MESSAGE to 14 characters if necessary.

Figure 32:
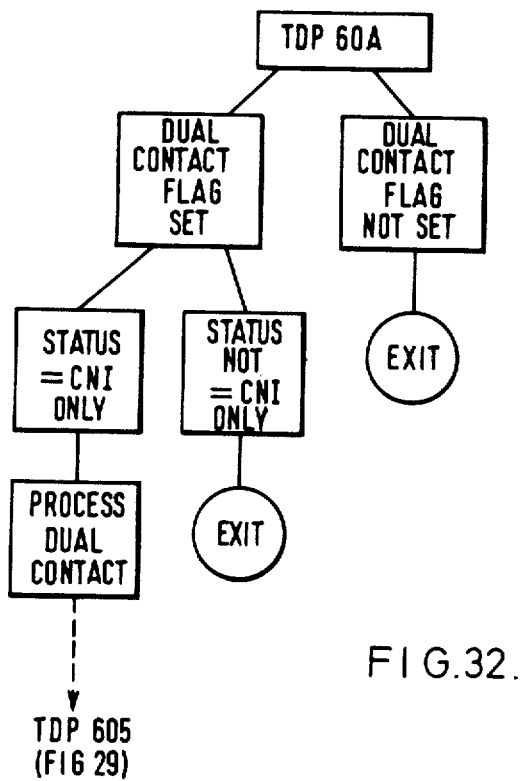

As was previously mentioned, FIG. 32 relates to subroutine TDP 60A which is the DUAL CONTACT handling routine. This subroutine TDP 60A is called on a CONTACT REPLY being received to test if the DUAL CONTACT flag is set. If it is set and the second coversation area, CN2, is free, the subscriber mnemonic of the CONTACT REPLY just received will be set up as the mnemonic to be skipped. An indicator is set to indicate this as the second CONTACT REQUEST in a DUAL CONTACT REQUEST. Another subroutine TDP 235 will then be entered to output the CONTACT REQUEST in the insert line, which subsequently calls subroutine TDP 311, the CONTACT REQUEST subroutine, and then TDP 605 to output the same CONTACT LIST request but skipping the subscriber whose CONTACT REPLY has just been received.

Referring now to FIGS. 27 and 34-43, the improved INHIBIT LIST FUNCTION of the improved system 30 of the present invention in which locally held INHIBITS LIST TABLES stored at the originating subscriber's associated terminal controller, such as controller 68, are employed in the processing of a call to determine whether or not the taker, such as taker 602, has inhibited calls from the maker, such as maker 98, will be described. As will be described in greater detail hereinafter, the presently preferred INHIBIT LIST FUNCTION of the improved system 30 of the present invention enables a call to be "dropped" on INHIBIT detection without any operator intervention. The dropping of the call is simulated by auto-accepting the inhibited call in what is termed a pseudo-accept function, locally dequeueing it and performing the necessary housekeeping functions associated with accepting a call. Before describing FIGS. 34-43 in greater detail, it is believed that some overall comments about the INHIBIT LIST processing in the terminal controller such as controller 68, should be described. Thus, the INHIBIT LIST processing in the terminal controller 68 can be divided into the areas of INHIBIT LIST table set up, maker's INHIBIT LIST operation, and taker's INHIBIT LIST operation. With respect to the INHIBIT LIST table set up in the terminal controller 68, this function is illustrated in FIGS. 34 through 36. Thus, it should be noted that the locally held INHIBIT LIST table contains INHIBITED SUBSCRIBER mnemonics, preferably in alphabetical order, and is set up by the subscriber inserting the subscriber mnemonics of the subscribers which he wishes to inhibit from contacting him to an INHIBIT LIST page through the use of the user insert line, viewing this created INHIBIT LIST page in response to a VIEW RESPONSE REQUEST by recalling this page and, thereafter, the INHIBIT LIST page, which is forwarded to the host computer 38, is also locally stored in the originating terminal controller 68. The INHIBIT LIST table can be amended by the subscriber at any time through the use of further inserts or cancellations to the INHIBIT LIST page with the amendment being terminated in the same manner as the original entry of the INHIBIT LIST page through the use of the VIEW function and the subsequent RECALL PAGE function so as to locally store the amended INHIBIT LIST TABLE in the originating controller as well as to forward it to the host computer 38. The above procedure is illustrated in the previously described logic flow diagram of the condition responsive MESSAGE routing logic portion of the terminal controller 68 in FIG. 27, and may readily be understood by one of ordinary skill in the art with respect to the set-up and amendment of the subscriber created INHIBIT LIST TABLE or page by merely substituting the expressions INHIBIT LIST TABLE, INHIBIT LIST page and INHIBIT LIST for the expressions CONTACT LIST TABLE, CONTACT LIST page and CONTACT LIST, respectively, in FIG. 27. Thus, the procedure to set-up and amend a subscriber created INHIBIT LIST TABLE or page is essentially identical to that employed to set-up and amend a subscriber created CONTACT LIST TABLE or page with the primary differences being in the resultant CONTACT LIST or INHIBIT LIST functions as described herein.

FIGS. 34-36 diagrammatically illustrate typical INHIBIT LIST video displays which may appear on the display portion of a typical originating subscriber keystation in response to the set-up of the INHIBIT LIST table and the amendment of this INHIBIT LIST table. With respect to FIG. 34, the viewing of the SUBSCRIBER INHIBITS by the originating subscriber is illustrated with respect to the viewing of the INHIBIT LIST at the time when the INHIBIT LIST table is empty. In the example of FIGS. 34-36, it is assumed that the user's address code is SUBK. Thus, when the user presses the keys CNV, VIEW, the message INHB, and the TRANSMIT key, assuming the INHIBIT LIST table is empty, the display of FIG. 34 would appear on the screen. FIG. 35 is a diagrammatic illustration of this video display with respect to the insertion of subscriber INHIBITS to the INHIBIT LIST table of the subscriber SUBK. Thus, assuming that subscriber SUBK wishes to inhibit calls from subscriber TRBK, then the user inhibits calls from this subscriber, through the use of the user insert function, by pressing the INSRT function key 705, the letters corresponding to the subscriber mnemonic TRBK, and the TRANSMIT key. As a result, the display illustrated in FIG. 35 appears on the screen of the user. If desired, more than one subscriber may be inhibited simultaneously, that is added to the INHIBIT LIST table, through the use of a single user insert function, by, instead of entering one subscribers mnenonic, entering a string of subscriber mnenomic address codes, separated by a comma, prior to pressing the TRANSMIT key. The improved system 30 then accepts the INHIBIT but will not implement or display the INHIBIT instruction until the INHIBIT LIST page to which the entry is being made is recalled by the user or originating subscriber using the RECALL key. Such recall of the INHIBIT LIST page is illustrated in FIG. 36 in the above example in which only subscriber TRBK has been added to the INHIBIT LIST page, with the system 30 then displaying the updated INHIBIT LIST table and implementing the INHIBIT instruction.

Now referring to FIGS. 37-43, the aforementioned maker's INHIBITS operation and taker's INHIBITS operation shall now be described in greater detail hereinafter. With respect to the maker's INHIBITS operation, when a maker, such as maker 98, contacts a terminal controller which has inhibited him, such as terminal controller 600 associated with the London taker 602 in the above example, either an unsuccessful contact or a successful contact occurs. In the instance of an unsuccessful contact, the maker 98 gets a MESSAGE BUSY or OFF SYSTEM on his screen, such as illustrated by way of example in FIG. 38, at which time the maker 98 can end contact or can leave a MESSAGE as in the previously described manner. The BUSY message indicates that the proposed taker 602 is not FREE while the OFF SYSTEM MESSAGE indicates that the proposed taker 602 is turned off. If, however, the proposed taker 602 who has inhibited maker 98 is on-line and is free, which is defined as a successful contact, then the maker 98 will first see the message FREE, such as illustrated in FIG. 39, or QUEUED displayed on his screen which is then overwritten by the message INHIBITED, such as within two seconds, such as illustrated in FIGS. 37 through 39. The change of status is preferably accompanied by a bell alarm to alert the maker 98. No further input from the maker's terminal controller, 96 in this instance, is then possible except for an END CONTACT MESSAGE which clears the conversation area. The change of status to INHIBITED is caused by the receipt of a special connect request with inhibits indication, referred to as CONNECT REQUEST INHIBITED. The maker's terminal controller 96 will then send a CONNECT REPLY INHIBITED message to the taker's terminal controller 600. If the CONNECT REQUEST INHIBITED fails to arrive at the maker's terminal controller 96, such as due to line failure or the incapability of the taker's terminal controller 600 to accept the inhibited call at that time, the message FREE or QUEUED remains on the screen until an END CONTACT or left MESSAGE is done.

Figure 41:
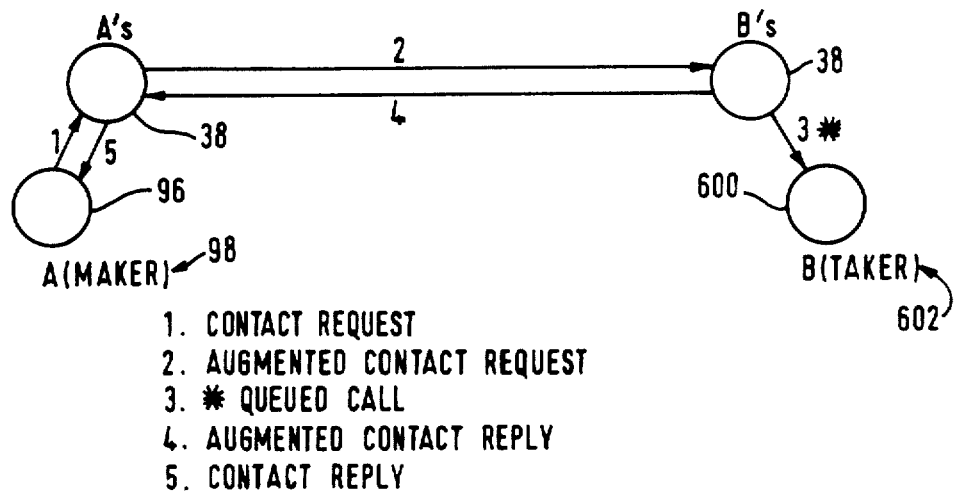
FIGS. 41-43 are diagrammatic illustrations of the exchange of messages in the system of the present invention utilizing the improved INHIBIT LIST facility of the present invention, with FIG. 41 relating to IN-HIBIT message flow, FIG. 43 relating to a PSEUDO-ACCEPT, and with FIG. 43 relating to END CONTACT on an inhibited call.
Figure 42:
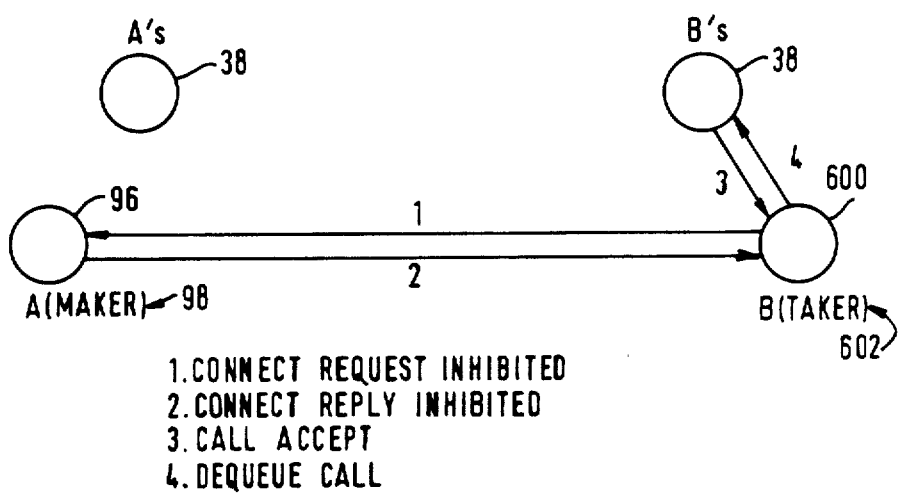
Figure 43:
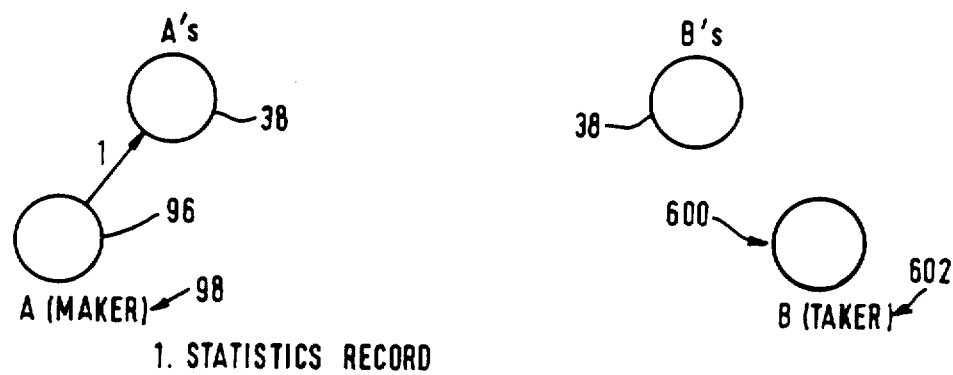
Figure 44:
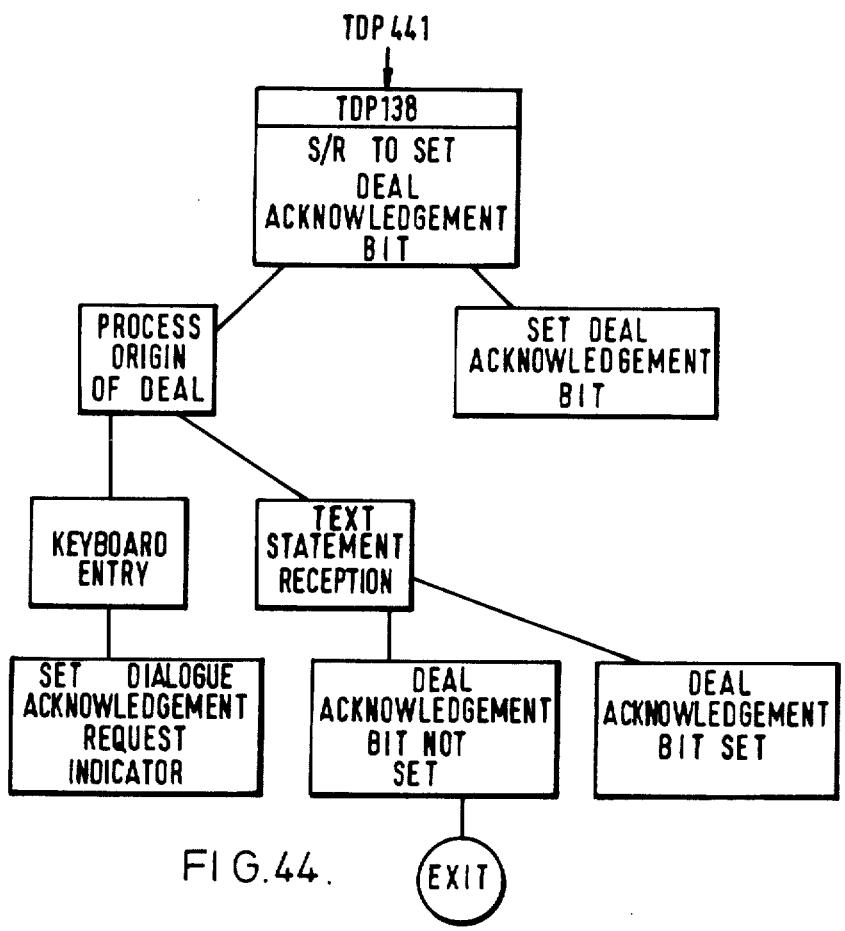
FIGS. 44-45 are logic flow diagrams of the condition responsive message routing logic portion of a typical keystation terminal controller portion of the improved system of the present invention in connection with the improved DEAL KEY facility of the present invention.

With respect to the INHIBITS operation of the taker 602, when a queued call is received, the subscriber's mnemonics of the call is checked against the terminal controller's 96 INHIBITS TABLE. If the queued call is found to be inhibited, an auto-accept or pseudo-accept will be invoked which "drops" the inhibited call. The action of an auto-accept is preferably normally transparent to the subscriber except when the desk unit used for accepting the inhibited call is displaying mode CNV in which instance, a single "T" will preferably be displayed throughout the duration of the auto-accept function, such as approximately two seconds, during which time the subscriber's keyboard will be locked and any input via that keyboard during that time will be ignored. Moreover, should a line failure occur between the terminal controllers 96 and 600 during this time, a time out of the output message, such as for ten seconds, will cause a message "CONNECTION LOST" to be displayed on the MESSAGE line. With respect to the auto-accept or pseudo-accept function regarding an inhibited call, the following occurs. First, the new call is not displayed on the queued calls area. The taker's terminal controller 600 then attempts to send a CONNECT REQUEST INHIBIT message before locally dequeing the call. It first searches for an idle conversation control block to accept the call. If an idle block is not found, no CONNECT REQUEST INHIBITED is sent. The call is then locally dequeued, and a free desk unit record is sent to the host computer 38. If an idle conversation control block is found, it is used to accept the inhibited call. A CONNECT REQUEST INHIBITED message is then sent to the maker's terminal controller 96 and the INHIBITED call is locally dequeued. On receiving the CONNECT REPLY INHIBITED message, a CALL ACCEPTED record is sent to the host computer 38 and the conversation control is cleared. Thus, it is preferably desirable for a subscriber to clear a conversation when it is ended by providing an END CONTACT MESSAGE to release the dialogue port and thus make available idle conversation block in anticipation of a possible inhibited call auto-accept function. FIG. 41 is a diagrammatic illustration of the exchange of messages in the improved system 30 of the present invention with respect to the aforementioned INHIBITS message flow, with FIG. 41 illustrating the initial CONTACT REQUEST from the terminal controller 96 of the maker 98 to the terminal controller 600 of the taker 602. FIG. 42 is a diagrammatic illustration of the exchange of messages in the system 30 of the present invention with respect to the aforementioned PSEUDO-ACCEPT or AUTO-ACCEPT function. FIG. 43 is a diagrammatic illustration of the aforementioned END CONTACT function on an inhibited call, assuming that a STATISTICS RECORD is desired to be sent to the host computer 38.

With respect to the data specification of the INHIBIT LIST table, this is preferably the same type of specification as for the aforementioned CONTACT LIST table which is referred to above in Table E. It should be noted that two controller-to-controller messages are preferably used in the handling of an inhibited call, with these messages being the aforementioned CONNECT REQUEST INHIBITED message and the aforementioned CONNECT REPLY INHIBITED message. These two messages are sub-sets of their original records and retain the original type of values and preferably convey INHIBITS indication by means of a zero desk unit value. A detailed record of structures may be as set forth below, by way of example, in Table F.

TABLE F (I) Connect Request Inhibited

| Purpose: | To indicate to the maker terminal controller that he is being inhibited from contacting the taker terminal controller. |
|---|---|
| Semantic: | I wish to inhibit the call you have placed in my queue. |
| Initiating Event: | Pseudo-accept of a queued call that is being inhibited. |

Contents:

| DESCRIPTION | VALUE | SIZE IN BYTES | TYPE |
|---|---|---|---|
| Length | 28 | 1 | Byte |
| Type | 192 | 1 | " |
| Length of Non-packed data | 6 | 1 | " |
| Validity | zero | 1 | " |
| Maker's desk unit | | | " |
| Taker's conversation reference | | | " |
| Taker's answer back | | 20 | A |
| Taker's TC | 40 | 1 | A |
| Taker's DU | zero | 1 | A |

(ii) Connect Reply Inhibited

| Purpose: | To inform a taker terminal controller of the receipt of a CONNECT REQUEST INHIBITED message so as to allow that controller to delete the inhibited call from his queue properly. |
|---|---|
| Semantics: | Here are the details you require to delete the inhibited call. |
| Initiating Event: | Receipt of a CONNECT REQUEST INHIBITED message |

The content of the above records is preferably as set forth below, by way of example, in TABLE G.

TABLE G

| DESCRIPTION | VALUE | SIZE IN BYTES | TYPE |
|---|---|---|---|
| Length | 42 | 1 | Byte |
| Type | 193 | 1 | " |
| Length of Non-packed data | 10 | 1 | " |
| Validity | zero | 1 | " |
| Taker's desk unit | zero | 1 | " |
| Contact Maker's Status | | | |
| 10 | 1 | Contact Maker's | |
| Country | | 2 | Integer |
| Contact Maker's Audit No. | | | |
| | 1 | Byte Contact | |
| Maker's Terminal Controller | | | |
| 40 | 1 | Ascii Contact Maker's Desk | |
| Unit | | 1 | Byte |
| Time | | 4 | " |
| Date | | 6 | " |

TABLE G-continued

| DESCRIPTION | VALUE | SIZE IN BYTES | TYPE |
| --- | --- | --- | --- |
| Contact Maker's Answerback | | | |
| 20 | | | " |

Summarizing the above Tables F and G, which are self-explanatory, the purpose of the CONNECT REQUEST INHIBITED record is to indicate to the terminal controller 98 of the maker 96 that it is inhibited from contacting the terminal controller 600 of the taker 602. This record is initiated by the pseudo-accept of a queued call that is being inhibited, with the record content indicating that the terminal controller 600 of the taker 602 wishes to inhibit the call placed in its queue. Similarly, the purpose of the CONNECT REPLY INHIBITED record is to inform the terminal controller 600 of the taker 602 of the receipt of a CONNECT REQUEST INHIBITED record. This record is initiated by the receipt of the CONNECT REQUEST INHIBITED record, with the record containing the information necessary to delete the inhibited call. In the above example, by way of example, with respect to a time out such a time out may occur if a connect request inhibits his time out for a period of ten seconds, by way of example, which would cause a FREE desk report to be sent to the host computer 38, the conversation port to be released, and the call dequeued locally.

Referring now to FIGS. 44-47, the improved DEAL KEY function of the improved system 30 of the present invention shall now be described. Initially referring to FIGS. 44 and 45, logic flow diagrams of the condition responsive message routing logic portion of a typical terminal controller in the improved system 30 of the present invention in connection with the processing of the improved DEAL KEY function is shown. Thus, as shown and preferred in the logic flow diagram of FIG. 44, a deal acknowledgment bit is provided in the control indicator word in the text statement record. By way of example, as shown in FIG. 47, this bit is bit 5 of the control indicator word. This bit is set by subroutine TDP 138 illustrated in FIG. 44. This subroutine, which is part of the terminal controller control program exemplified by the control program listing of Table A annexed hereto and employs the same terminology herein, sets up bit 5 of the control indicator word in the text statement record, which is the deal acknowledgment bit, when a transmission is DEAL KEY oriented, either as a direct result of pressing the DEAL KEY 727 or on receiving a text statement with the deal acknowledgment bit set, to which a reply must be sent.

Figure 45:
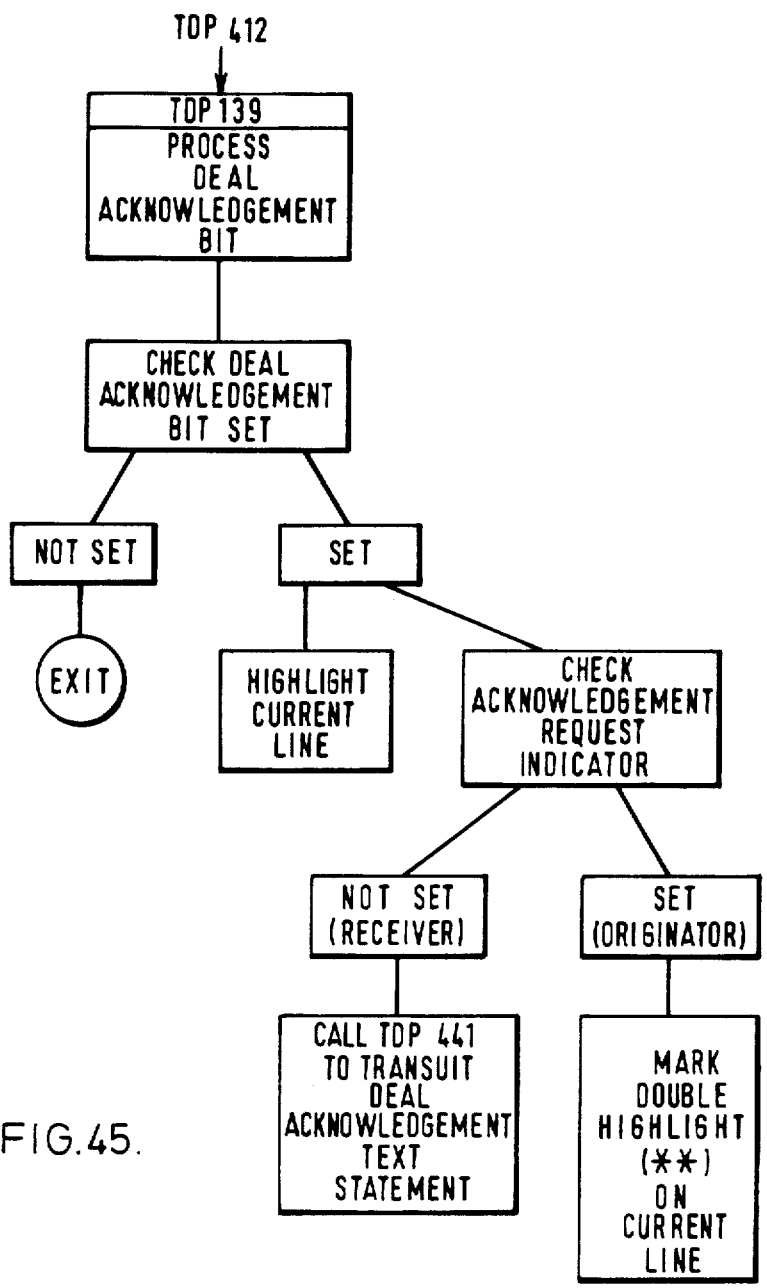

Referring now to FIG. 45, this logic flow diagram illustrates the actual processing of a deal acknowledgment text statement by subroutine TDP139 which is part of the terminal controller control program exemplified by the control program listing of Table A annexed hereto and employs the same terminology as employed herein, with TDP 441 being another subroutine in the terminal controller control program of Table A. This subroutine TDP 139 checks the deal acknowledgment bit on receiving a text statement record. If the bit is set, the current dialogue line of the receiver is highlighted with a single asterisk, and the current dialogue line of the originator of the DEAL KEY transmission is highlighted by double asterisks. The balance of FIGS. 44 and 45 will be readily understood by one of ordinary skill in the art without any further explanations as they are essentially self-explanatory.

Figure 46:
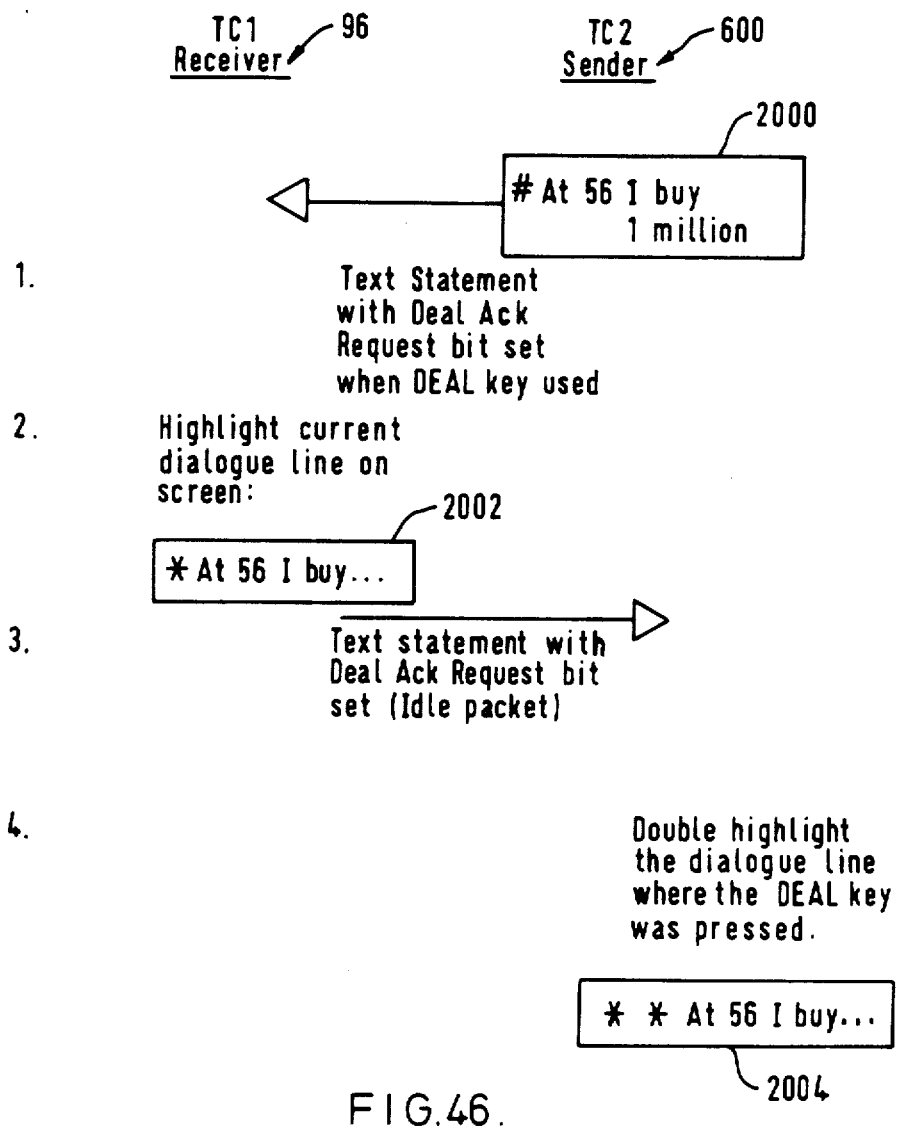
FIG. 46 is a diagrammatic illustration of the order of events relating to a typical DEAL KEY transmission between two subscribers in the improved system of the present invention including the type of typical video display produced thereby the present invention.

As will be noted from the above, the improved DEAL KEY function of the improved system 30 of the present invention, which results from the use of the DEAL KEY 727 on the subscriber's keyboard, provides a dialogue confirmation function whereby a dialogue line is provided and immediately acknowledged at the sender's keystation upon receipt by the receiver's keystation, with the same dialogue line on the originator's or sender's screen being indicated or highlighted by a double asterisk when the acknowledgment is received. Thus, the DEAL KEY function guarantees that the highlighted text has been delivered to the desired receiver. The DEAL KEY function acts like an end line function in that it causes the line of dialogue to be transmitted to the receiving party, moves the cursor on the screen to the beginning of a new line, and retains control of the conversation. As was described in reference to FIGS. 44 and 45, a deal acknowledgement bit is provided in the control indicator word in the text statement record which bit, by way of example, is bit 5. This is illustrated in FIG. 47 which is a diagrammatic illustration of the control indicator word in the text statement record. As was described above with respect to FIG. 44, the deal acknowledgement bit is set up when a transmission is DEAL KEY oriented, either as a direct result of the originator pressing the DEAL KEY 727 or on receiving a text statement with bit 5 of the control indicator word set, to which a reply must be sent. The deal acknowledgement bit, as was described with reference to FIG. 45, is then checked upon receiving a text statement and if the bit is set, the dialogue line of the receiver is highlighted with a single asterisk and the dialogue line of the originator is highlighted with a double asterisk. This is illustrated in FIG. 46 which is a diagrammatic illustration of the order of events relating to a typical DEAL KEY transmission between two subscribers in the improved system 30 of the present invention, assuming that terminal controller 600 is the sender and terminal controller 96 is the receiver. Blocks 2000, 2002 and 2004 in FIG. 46, illustrate the appearance of the dialogue line on the screen, with blocks 2000 and 2004 referring to the screen of the sender 600, with block 2002 referring to the screen of the receiver 96.

Thus, the improved system 30 of the present invention unburdens the host computer and enables the terminal controller to perform many of the tasks previously performed only by accessing the SUBSCRIBER FILE of the host computer as well as providing additional functions which enhance the utilization of the system as a conversational video system, such as DUAL CALL LIST and DEAL KEY as well as the improved CONTACT LIST and INHIBIT LIST functions.

Summarizing the improved conversational video system 30 of the present invention, by the use of this system, it enables, through the use of a video display terminal, subscribers to contact any subscribers throughout a world-wide network, to conduct interactive video conversations with these subscribers, to conduct two such conversations simultaneously with two different subscribers which can be set up with a single call, to obtain supplementary retrievable data which can be displayed during the conducting of such a conversation and which may assist the caller in connection with the conversation, particularly if it is some type of dealing transaction in which such supplementary data may be helpful, it enables a called subscriber to receive a plurality of incoming calls and randomly select any one of these calls irrespective of time of receipt and dependent on certain parameters such as the identity of the caller and the interest message initiated by that caller, it enables hard copy print-out of the video communications, it enables pre-preparation of responses while an incoming message is being received, it enables transmission of the video communication message in short segments facilitating rapid transmission and response without causing excessive load on the packet switching network, it enables rapid subscriber contact through the use of CALL LISTS, it enables a subscriber to screen out unwanted calls through the use of INHIBIT LISTS, and it enables immediate confirmation of message receipt through the use of DEAL KEY. All of the above features help in providing an effective conversational video communication system of the type which will enable rapid subscriber to subscriber communication and completion of dealing transactions in such situations when the system is employed for that purpose.

It is to be noted that as used throughout the specification and claims, the term "keystation" is also meant to refer to "subscriber" which may consist of several terminals all having the same identification code.

It is to be understood that the above described embodiments of the invention are merely illustrative of the principles thereof and that various modifications may be carried out without departing from the spirit and scope of the present invention.

What is claimed is:

1. In a video communication network capable of providing textual data messages to a plurality of subscriber terminals throughout said network, at least a portion of said plurality of subscriber terminals comprising subscriber keystations, each of said subscriber keystations comprising a keyboard means for operator input of textual data messages and associated data control signals to said network via said keyboard means and a video display means for providing a textual video display of at least keyboard generated data input to said network; the improvement comprising at least one message switching interface means for routing video conversational textual data messages throughout said network, a plurality of said keystations being operatively connected to said one message switching interface means, said one message switching interface means comprising message routing logic means and storage means operatively connected to said message routing logic means for providing message routing logic control signals and further comprising display control logic means and local video display storage means for locally storing video conversational textual data for providing a video display thereof to at least a pair of said keystations which are operatively connected together through said one interface means in a completed call in said network, said keyboard means comprising means for providing unique calling signals to said interface means for initiating calls to a designated keystation portion of said plurality of keystations in said network, said one interface means further comprising means for receiving said calling signals provided thereto for completing a call to said designated connected keystation, said message routing logic means comprising means for controlling the routing of said calling signals to said designated keystations to control the completion of said initiated calls, said display control logic means comprising means for providing on said pair of connected keystation video display means a video display of video conversational textual data transmitted between said connected keystations in said network with which said call is completed via said separate keyboard means associated with said pair of connected keystations, said one message switching interface means storage means comprising means for retrievably storing at least one subscriber created contact list for each of said keystations connected to said one message switching interface means, each of a plurality of said keyboard means being capable of providing at least a different one of said subscriber created retrievably stored contact lists to said one message switching interface storage means for each of a corresponding plurality of associated ones of said subscriber keystations whereby a plurality of different unique contact lists may be retrievably stored in said one message switching interface storage means, said contact lists each being capable of comprising a plurality of different unique designated keystation identification codes each of which corresponds to a different keystation in said network, said keystation keyboard means unique calling signal providing means being capable of providing a unique contact list calling signal corresponding to a designated one of said retrievably stored contact lists to said one message switching interface means message routing logic, said message routing logic comprising means capable of retrieving said stored one designated contact list in response to said unique contact list calling signal and sequentially providing a calling signal to each of said keystations designated by said identification codes in said contact list until a call is completed with the first one of said designated keystations which is available, said one message switching interface means comprising at least one host computer network control means and a plurality of keystation terminal controller interface means operatively connected between said keystations and said one host computer network control means with at least one keystation being operatively connected to and associated with one keystation terminal controller interface means for each of said plurality of keystation terminal controller interface means, said host computer network control means comprising said message routing logic means and said storage means operatively connected thereto, each of said keystation terminal controller interface means comprising said display control logic means and said local video display storage means for locally storing video conversational textual data for providing a video display thereof to at least one of said keystations connected to said keystation terminal controller interface means and local storage means for locally retrievably storing a copy of said subscriber created retrievably stored contact lists created by said one associated subscriber keystation and stored in said host computer network control means storage means and local message routing logic means for locally retrieving said locally stored one designated contact list designated by said one associated subscriber keystation unique calling signal providing means and providing a processed contact request calling signal to said host computer network control means message routing logic means for sequentially providing said calling signal to each of said keystations designated by said identification codes in said locally retrieved and processed contact list, said keyboard means providing said unique calling signals to said associated keystation terminal controller interface means, said keystation terminal controller interface means comprising means for providing said calling signal to said one host computer network control means and for receiving said calling signals therefrom for completing a call to said one connected keystation; whereby a single call may be simultaneously initiated by said one associated subscriber keystation to a plurality of predesignated keystations in said locally stored contact list to establish a textual data video conversation with the first free subscriber in said plurality.

2. A video conversational communication network in accordance with claim 1 wherein said local message routing logic means further comprises means responsive to a skip subscriber contact control signal pertaining to designated members of said locally retrieved one designated contact list, said unique calling signal provided by said unique calling signal providing means comprising said skip subscriber contact control signal, said skip subscriber contact control signal designating which member keystations in said one designated contact list said one associated subscriber keystation does not want to complete a call to in response to said unique calling signal, said local message routing logic means responsive means preventing said processed contact request calling signal from being provided for said designated members of said locally retrieved contact list in said unique calling signal; whereby a dynamic selection of a subgroup of predesignated keystations within said plurality thereof may be made by said one associated subscriber keystation when said simultaneous single call contact list call is placed.

3. A video conversational communication network in accordance with claim 2 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

4. A video conversational communication network in accordance with claim 1 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

5. A video conversational communication network in accordance with claim 1 wherein said display control logic means comprises means for providing on said one associated keystation video display means a substantially simultaneous video display of video conversational textual data received from two different designated keystations in said network with which calls are completed for enabling different video conversations to be substantially simultaneously carried out with different keystations on said one associated keystation common video display means using said one associated keystation keyboard means, said unique calling signal provided from said one associated keystation keyboard means comprising a dual contact request control signal pertaining to said locally retrieved one designated contact list for requesting said call to be completed for two different keystations in said locally retrieved one designated contact list, said local message routing logic means further comprising means responsive to said dual contact request control signal for providing said processed contact request calling signal to said host computer network control means message routing logic means for providing said calling signal to each of said keystations designated by said identification codes in said locally retrieved and processed contract list until a call is completed with the first two of said predesignated keystations in said one designated contact list which are available when said one associated keystation is available to complete said two calls; whereby two calls may be simultaneously initiated by said one associated subscriber keystation to a plurality of predesignated keystations in said locally stored contact list to establish a textual data video conversation with the first two free subscribers in said plurality.

6. A video conversational communication network in accordance with claim 5 wherein said local message routing logic means further comprises means responsive to a skip subscriber contact control signal pertaining to designated members of said locally retrieved one designated contact list, said unique calling signal provided by said unique calling signal providing means comprising said skip subscriber contact control signal, said skip subscriber contact control signal designating which member keystations in said one designated contact list said one associated subscriber keystation does not want to complete a call to in response to said unique calling signal, said local message routing logic means responsive means preventing said processed contact request calling signal from being provided for said designated members of said locally retrieved contact list in said unique calling signal; whereby a dynamic selection of a subgroup of predesignated keystations within said plurality thereof may be made by said one associated subscriber keystation when said simultaneous single call contact list call is placed.

7. A video conversational communication network in accordance with claim 6 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

8. A video conversational communication network in accordance with claim 5 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

9. A video conversational communication network in accordance with claim 1 wherein said local message routing logic means comprises a message buffer means for locally storing said identification codes of said keystations to be contacted from said locally retrieved and processed contact list, said processed contact request calling signal being sent from said message buffer means to said host computer network control means.

10. A video conversational communication network in accordance with claim 9 wherein said local message routing logic means further comprises means responsive to a skip subscriber contact control signal pertaining to designated members of said locally retrieved one designated contact list, said unique calling signal provided by said unique calling signal providing means comprising said skip subscriber contact control signal, said skip subscriber contact control signal designating which member keystations in said one designated contact list said one associated subscriber keystation does not want to complete a call to in response to said unique calling signal, said local message routing logic means responsive means preventing said processed contact request calling signal from being provided for said designated members of said locally retrieved contact list in said unique calling signal whereby a dynamic selection of a subgroup of predesignated keystations within said plurality thereof may be made by said one associated subscriber keystation when said simultaneous single call contact list call is placed, said local message routing logic means responsive means preventing storage of said identification codes of said designated members of said one designated contact list in said message buffer means.

11. A video conversational communication network in accordance with claim 9 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

12. A video conversational communication network in accordance with claim 9 wherein said display control logic means comprises means for providing on said one associated keystation video display means a substantially simultaneous video display of video conversational textual data received from two different designated keystations in said network with which calls are completed for enabling different video conversations to be substantially simultaneously carried out with different keystations on said one associated keystation keyboard means, said unique calling signal provided from said one associated keystation keyboard means comprising a dual contact request control signal pertaining to said locally retrieved one designated contact list for requesting said call to be completed for two different keystations in said locally retrieved one designated contact list, said local message routing logic means further comprising means responsive to said dual contact request control signal for providing said processed contact request calling signal to said host computer network control means message routing logic means for providing said calling signal to each of said keystations designated by said identification codes in said locally retrieved and processed contact list until a call is completed with the first two of said predesignated keystations in said one designated contact list which are available when said one associated keystation is available to complete said two calls; whereby two calls may be simultaneously initiated by said one associated subscriber keystation to a plurality of predesignated keystations in said locally stored contact list to establish a textual data video conversation with the first two free subscribers in said plurality.

13. A video conversational communication network in accordance with claim 1 wherein said local storage means comprises means for retrievably storing a plurality of different ones of said contact lists for said one associated keystation, said different ones of said contact lists comprising different groups of said plurality of keystations in said network, each of said different ones of said contact lists being retrievable by said local message routing logic means in response to a different unique contact list calling signal provided from said keyboard means which created said plurality of different ones of such contact lists, whereby a plurality of different contact lists may be selected by a single keystation.

14. A video conversational communication network in accordance with claim 1 wherein said one associated keystation keyboard means further comprises means for providing a message transmission confirmation signal to said one associated keystation terminal controller interface means during a textual data video conversation with another keystation with which said call has been completed, said local message routing logic means providing a video displayable confirmation signal to said local video display storage means for enabling video display thereof in response to receipt of said message transmission confirmation signal by said other keystation while still maintaining control of said textual data video conversation; whereby a sending keystation may receive displayable confirmation of receipt of a textual data video message by a receiving keystation during a textual data video conversation therewith.

15. A video conversational communication network in accordance with claim 14 wherein said local video display storage means comprises means for enabling a video display of said confirmation signal in conjunction with video display of said textual data video message whose receipt is being confirmed.

16. A video conversational communication network in accordance with claim 14 wherein said local message routing logic means further comprises means responsive to a skip subscriber contact control signal pertaining to designated members of said locally retrieved one designated contact list, said unique calling signal provided by said unique calling signal providing means comprising said skip subscriber contact control signal, said skip subscriber contact control signal designating which member keystations in said one designated contact list said one associated subscriber keystation does not want to complete a call to in response to said unique calling signal, said local message routing logic means responsive means preventing said processed contact request calling signal from being provided for said designated members of said locally retrieved contact list in said unique calling signal; whereby a dynamic selection of a subgroup of predesignated keystations within said plurality thereof may be made by said one associated subscriber keystation when said simultaneous single call contact list call is placed.

17. A video conversational communication network in accordance with claim 16 wherein said local video display storage means comprises means for enabling a video display of said confirmation signal in conjunction with video display of said textual data video message whose receipt is being confirmed.

18. A video conversational communication network in accordance with claim 14 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

19. A video conversational communication network in accordance with claim 18 wherein said local video display storage means comprises means for enabling a video display of said confirmation signal in conjunction with video display of said textual data video message whose receipt is being confirmed.

20. A video conversational communication network in accordance with claim 14 wherein said display control logic means comprises means for providing on said one associated keystation video display means a substantially simultaneous video display of video conversational textual data received from two different designated keystations in said network with which calls are completed for enabling different video conversations to be substantially simultaneously carried out with different keystations on said one associated keystation common video display means using said one associated keystation keyboard means, said unique calling signal provided from said one associated keystation keyboard means comprising a dual contact request control signal pertaining to said locally retrieved one designated contact list for requesting said call to be completed for two different keystations in said locally retrieved one designated contact list, said local message routing logic means further comprising means responsive to said dual contact request control signal for providing said processed contact request calling signal to said host computer network control means message routing logic means for providing said calling signal to each of said keystations designated by said identification codes in said locally retrieved and processed contact list until a call is completed with the first two of said predesignated keystations in said one designated contact list which are available when said one associated keystation is available to complete said two calls; whereby two calls may be simultaneously initiated by said one associated subscriber keystation to a plurality of predesignated keystations in said locally stored contact list to establish a textual data video conversation with the first two free subscribers in said plurality.

21. A video conversational communication network in accordance with claim 20 wherein said local video display storage means comprises means for enabling a video display of said confirmation signal in conjunction with video display of said textual data video message whose receipt is being confirmed.

22. A video conversational communication network in accordance with claim 14 wherein said local message routing logic means comprises a message buffer means for locally storing said identification codes of said keystations to be contacted from said locally retrieved and processed contact list, said processed contact request calling signal being sent from said message buffer means to said host computer network control means.

23. A video conversational communication network in accordance with claim 22 wherein said local video display storage means comprises means for enabling a video display of said confirmation signal in conjunction with video display of said textual data video message whose receipt is being confirmed.

24. A video conversational communication network in accordance with claim 1 wherein said one message switching interface storage means further comprises means capable of retrievably storing at least one subscriber created inhibit list for each of said keystations connected to said one message switching interface means, each of a plurality of said keyboard means further being capable of providing at least a different one of said subscriber created retrievably stored inhibit lists to said one message switching interface storage means for each of a corresponding plurality of associated ones of said subscriber keystations whereby a plurality of different unique inhibit lists may be retrievably stored in said one message switching interface storage means, said inhibit lists each being capable of comprising a plurality of different unique designated keystation identification codes each of which corresponds to a different keystation in said network, said local storage means further comprising means for locally retrievably storing a copy of said subscriber created retrievably stored inhibit lists created by said one associated subscriber keystation and stored in said host computer network control means storage means, said local message routing logic means comprising means responsive to a calling keystation keyboard means provided unique calling signal for said one associated keystation for locally retrieving said inhibit list created by said one associated keystation and selectively inhibiting the completion of said call to said one detection of a keystation identification code corresponding to said calling keystation in said locally retrieved inhibit list, whereby a subscriber keystation may selectively prevent the establishment of a video textual data conversation with predefined subscribers in the network.

25. A video conversational communication network in accordance with claim 24 wherein said local message routing logic means further comprises means for providing an inhibit display signal to said calling station display control logic in response to said inhibit list detection of said calling keystation, said calling keystation display control logic providing an inhibit display message video display at said calling keystation in response to said inhibit display signal.

26. A video conversational communication network in accordance with claim 25 wherein the designated keystation content of each of said inhibit lists may be dynamically varied by said keyboard means which created said retrievably stored inhibit list by providing different keystation identification codes associated with said stored inhibit list to said local storage means.

27. A video conversational communication network in accordance with claim 24 wherein the designated keystation content of each of said inhibit lists may be dynamically varied by said keyboard means which created said retrievably stored inhibit list by providing different keystation identification codes associated with said stored inhibit list to said local storage means.

28. A video conversational communication network in accordance with claim 24 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

29. A video conversational communication network in accordance with claim 28 wherein said inhibited contact signal comprises an inhibit display signal, said host computer network control means providing said inhibit display signal to said calling station display control logic in response to said inhibit list detection of said calling keystation, said calling keystation display control logic providing an inhibit display message video display at said calling keystation in response to said inhibit display signal.

30. A video conversational communication network in accordance with claim 24 wherein said local message routing logic means further comprises means responsive to a skip subscriber contact control signal pertaining to designated members of said locally retrieved one designated contact list, said unique calling signal provided by said unique calling signal providing means comprising said skip subscriber contact control signal, said skip subscriber contact control signal designating which member keystations in said one designated contact list said one associated subscriber keystation does not want to complete a call to in response to said unique calling signal, said local message routing logic means responsive means preventing said processed contact request calling signal from being provided for said designated members of said locally retrieved contact list in said unique calling signal; whereby a dynamic selection of a subgroup of predesignated keystations within said plurality thereof may be made by said one associated subscriber keystation when said simultaneous single call contact list call is placed.

31. A video conversational communication network in accordance with claim 30 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

32. A video conversational communication network in accordance with claim 24 wherein said one designated contact list further comprises a subscriber created interest message for provision to said designated one of said keystations with which said call is completed, said local storage means comprising means for locally retrievably storing said interest message with said contact list, said local message routing logic means further comprising means for locally retrieving said locally stored interest message and providing said retrieved interest message along with said processed contact request calling signal for providing said interest message to said predesignated keystation with which said contact list call is completed; whereby said predesignated called keystation may respond to said calling keystation interest message upon completion of said call.

33. A video conversational communication network in accordance with claim 32 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

34. A video conversational communication network in accordance with claim 24 wherein said display control logic means comprises means for providing on said one associated keystation video display means a substantially simultaneous video display of video conversational textual data received from two different designated keystations in said network with which calls are completed for enabling different video conversations to be substantially simultaneously carried out with different keystations on said one associated keystation common video display means using said one associated keystation keyboard means, said unique calling signal provided from said one associated keystation keyboard means comprising a dual contact request control signal pertaining to said locally retrieved one designated contact list for requesting said call to be completed for two different keystations in said locally retrieved one designated contact list, said local message routing logic means further comprising means responsive to said dual contact request control signal for providing said processed contact request calling signal to said host computer network control means message routing logic means for providing said calling signal to each of said keystations designated by said identification codes in said locally retrieved and processed contact list until a call is completed with the first two of said predesignated keystations in said one designated contact list which are available when said one associated keystation is available to complete said two calls; whereby two calls may be simultaneously initiated by said one associated subscriber keystation to a plurality of predesignated keystations in said locally stored contact list to establish a textual data video conversation with the first two free subscribers in said plurality.

35. A video conversational communication network in accordance with claim 34 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

36. A video conversational communication network in accordance with claim 24 wherein said local message routing logic means comprises a message buffer means for locally storing said identification codes of said keystations to be contacted from said locally retrieved and processed contact list, said processed contact request calling signal being sent from said message buffer means to said host computer network control means.

37. A video conversational communication network in accordance with claim 36 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

38. In a video communication network capable of providing textual data messages to a plurality of subscriber terminals throughout said network, at least a portion of said plurality of subscriber terminals comprising subscriber keystations, each of said subscriber keystations comprising a keyboard means for operator input of textual data messages and associated data control signals to said network via said keyboard means and a video display means for providing a textual video display of at least keyboard generated data input to said network; the improvement comprising at least one message switching interface means for routing video conversational textual data messages throughout said network, a plurality of said keystations being operatively connected to said one message switching interface means, said one message switching interface means comprising message routing logic means and storage means operatively connected to said message routing logic means for providing message routing logic control signals and further comprising display control logic means and local video display storage means for locally storing video conversational textual data for providing a video display thereof to at least a pair of said keystations which are operatively connected together through said one interface means in a completed call in said network, said keyboard means comprising means for providing unique calling signals to said interface means for initiating calls to a designated keystation portion of said plurality of keystations in said network, said one interface means further comprising means for receiving said calling signals provided thereto for completing a call to said designated connected keystation, said message routing logic means comprising means for controlling the routing of said calling signals to said designated keystations to control the completion of said initiated calls, said display control logic means comprising means for providing on said pair of connected keystation video display means a video display of video conversational textual data transmitted between said connected keystations in said network with which said call is completed via said separate keyboard means associated with said pair of connected keystations, said separate keyboard means comprising means for providing a message transmission confirmation signal to said one message switching interface means from a sending keystation during a textual data video conversation with another receiving keystation with which said call has been completed, said message routing logic means providing a video displayable confirmation signal to said local video display storage means of said sending keystation for enabling video display thereof in response to receipt of said message transmission confirmation signal by said receiving keystation while still maintaining control of said textual data video conversation; whereby a sending keystation may receive displayable confirmation of receipt of a textual data video message by a receiving keystation during a textual data video conversation therewith.

39. A video conversational communication network in accordance with claim 38 wherein said sending keystation local video display storage means comprises means for enabling a video display of said confirmation signal in conjunction with video display of said textual data video message whose receipt is being confirmed.

40. In a video communication network capable of providing textual data messages to a plurality of subscriber terminals throughout said network, at least a portion of said plurality of subscriber terminals comprising subscriber keystations, each of said subscriber keystations comprising a keyboard means for operator input of textual data messages and associated data control signals to said network via said keyboard means and a video display means for providing a textual video display of at least keyboard generated data input to said network; the improvement comprising at least one message switching interface means for routing video conversational textual data messages throughout said network, a plurality of said keystations being operatively connected to said one message switching interface means, said one message switching interface means comprising message routing logic means and storage means operatively connected to said message routing logic means for providing message routing logic control signals and further comprising display control logic means and local video display storage means for locally storing video conversational textual data for providing a video display thereof to at least a pair of said keystations which are operatively connected together through said one interface means in a completed call in said network, said keyboard means comprising means for providing unique calling signals to said interface means for initiating calls to a designated keystation portion of said plurality of keystations in said network, said one interface means further comprising means for receiving said calling signals provided thereto for completing a call to said designated connected keystation, said message routing logic means comprising means for controlling the routing of said calling signals to said designated keystations to control the completion of said initiated calls, said display control logic means comprising means for providing on said pair of connected keystation video display means a video display of video conversational textual data transmitted between said connected keystations in said network with which said call is completed via said separate keyboard means associated with said pair of connected keystations, said one message switching interface means storage means comprising means for retrievably storing at least one subscriber created inhibit list for each of said keystations connected to said one message switching interface means, each of a plurality of said keyboard means being capable of providing at least a different one of said subscriber created retrievably stored inhibit lists to said one message switching interface storage means for each of a corresponding plurality of associated ones of said subscriber keystations whereby a plurality of different unique inhibit lists may be retrievably stored in said one message switching interface storage means, said inhibit lists each being capable of comprising a plurality of different unique designated keystation identification codes each of which corresponds to a different keystation in said network, said message routing logic means comprising means responsive to a calling keystation keyboard means provided unique calling signal for said designated keystation portion for retrieving said inhibit list created by said designated keystation and selectively inhibiting the completion of said call to said designated keystation when it is free only in response to detection of a keystation identification code corresponding to said calling keystation in said retrieved inhibit list, said one message switching interface means comprising at least one host computer network control means and a plurality of keystation terminal controller interface means operatively connected between said keystations and said one host computer network control means with at least one keystation being operatively connected to and associated with one keystation terminal controller interface means for each of said plurality of keystation terminal controller interface means, said host computer network control means comprising said message routing logic means and said storage means operatively connected thereto, each of said keystation terminal controller interface means comprising said display control logic means and said local video display storage means for locally storing video conversational textual data for providing a video display thereof to at least one of said keystations connected to said keystation terminal controller interface means and local storage means for locally retrievably storing a copy of said subscriber created retrievably stored inhibit lists created by said one associated subscriber keystation and stored in said host computer network control means storage means and local message routing logic means comprising means responsive to said calling keystation keyboard means provided unique calling signal for said one associated keystation for locally retrieving said inhibit list created by said one associated keystation and providing a processed inhibited contact signal to said host computer network control means message routing logic means for selectively inhibiting the completion of said call to said one associated keystation when it is free only in response to detection of a keystation identification code corresponding to said calling keystation in said locally retrieved inhibit list, said keyboard means providing said unique calling signal to said associated keystation terminal controller interface means, said keystation terminal controller interface means comprising means for providing at least said calling signals and said inhibited contact signals to said one host computer network control means and for receiving at least said calling signals and said inhibited contact signals therefrom for at least either completing a call to said one connected keystation or inhibiting said call completion; whereby said one associated keystation may selectively prevent the establishment of a video textual data conversation with predefined subscribers in the network contained in said locally stored inhibit lists created by said one associated keystation.

41. A video conversational communication network in accordance with claim 40 wherein said local message routing logic means further comprises means for providing an inhibit display signal to said calling station display control logic in response to said inhibit list detection of said calling keystation, said calling keystation display control logic providing an inhibit display message video display at said calling keystation in response to said inhibit display signal.

42. A video conversational communication network in accordance with claim 41 wherein the designated keystation content of each of said inhibit lists may be dynamically varied by said keyboard means which created said retrievably stored inhibit list by providing different keystation identification codes associated with said stored inhibit list to said local storage means.

43. A video conversational communication network in accordance with claim 40 wherein the designated keystation content of each of said inhibit lists may be dynamically varied by said keyboard means which created said retrievably stored inhibit list by providing different keystation identification codes associated with said stored inhibit list to said local storage means.

44. A video conversational communication network in accordance with claim 40 wherein said local message routing logic means further comprises means for providing an inhibited contact signal to said calling keystation and a pseudo-accept calling signal to said host computer network control means prior to providing said inhibited contact signal; whereby said call is completed with an available called keystation for enabling provision of said inhibit display signal to said calling keystation.

45. A video conversational communication network in accordance with claim 44 wherein said inhibited contact signal comprises an inhibit display signal, said host computer network control means providing said inhibit display signal to said calling station display control logic in response to said inhibit list detection of said calling keystation, said calling keystation display control logic providing an inhibit display message video display at said calling keystation in response to said inhibit display signal.

* * * * *